(12) United States Patent
Murakami

(10) Patent No.: US 10,003,265 B2
(45) Date of Patent: Jun. 19, 2018

(54) SWITCHING POWER SUPPLY DEVICE

(71) Applicant: Rohm Co., Ltd., Kyoto (JP)

(72) Inventor: Kazuhiro Murakami, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 127 days.

(21) Appl. No.: 14/804,795

(22) Filed: Jul. 21, 2015

(65) Prior Publication Data

US 2016/0028311 A1 Jan. 28, 2016

(30) Foreign Application Priority Data

| Jul. 28, 2014 | (JP) | 2014-152703 |
| Jul. 28, 2014 | (JP) | 2014-152705 |
| Jul. 28, 2014 | (JP) | 2014-152708 |

(51) Int. Cl.
| *H02M 3/158* | (2006.01) |
| *H02M 1/32* | (2007.01) |
| *H02M 3/156* | (2006.01) |
| *H02M 1/00* | (2006.01) |

(52) U.S. Cl.
CPC ............ *H02M 3/1588* (2013.01); *H02M 1/32* (2013.01); *H02M 3/156* (2013.01); *H02M 3/158* (2013.01); *H02M 2001/0032* (2013.01); *H02M 2003/1566* (2013.01); *Y02B 70/16* (2013.01)

(58) Field of Classification Search
CPC ................. H02M 1/083; H02M 3/156; H02M 2005/2935; H02M 3/1588; H02M 2001/009; H02M 3/158; H02M 2001/0032

See application file for complete search history.

(56) References Cited

U.S. PATENT DOCUMENTS

| 8,604,769 | B2 * | 12/2013 | Murakami | H02M 3/156 |
| | | | | 323/284 |
| 8,872,497 | B2 * | 10/2014 | Nakashima | H02M 1/14 |
| | | | | 323/285 |
| 8,907,646 | B2 * | 12/2014 | Lee | H02M 3/158 |
| | | | | 323/284 |
| 9,195,250 | B2 * | 11/2015 | Murakami | G05F 1/618 |
| 9,240,717 | B2 * | 1/2016 | Hara | H02M 3/158 |
| 9,356,510 | B2 * | 5/2016 | Jiang | H02M 3/156 |
| 2006/0208717 | A1 * | 9/2006 | Shimizu | H02M 3/157 |
| | | | | 323/284 |
| 2010/0123446 | A1 * | 5/2010 | Cheng | H02M 3/1588 |
| | | | | 323/288 |
| 2011/0018516 | A1 * | 1/2011 | Notman | H02M 3/1588 |
| | | | | 323/284 |
| 2012/0133344 | A1 * | 5/2012 | Makoto | H02M 3/156 |
| | | | | 323/271 |

(Continued)

FOREIGN PATENT DOCUMENTS

| JP | 2014-075856 | 4/2014 |
| JP | 2014-087159 | 5/2014 |

*Primary Examiner* — Kyle J Moody
(74) *Attorney, Agent, or Firm* — Fish & Richardson P.C.

(57) ABSTRACT

A power control IC has a switching control circuit of a fixed on-period type which generates an output voltage from an input voltage by driving a coil by turning on and off an output transistor according to a result of comparison between a feedback voltage and a reference voltage, and a quieting circuit which forcibly turns on the output transistor by ignoring the result of comparison when, after an on-timing of the output transistor, a predetermined threshold time elapses without the next on-timing coming.

12 Claims, 41 Drawing Sheets

(56) References Cited

U.S. PATENT DOCUMENTS

| | | | | |
|---|---|---|---|---|
| 2014/0146238 A1* | 5/2014 | Murakami | ............... | H04N 5/63 |
| | | | | 348/730 |
| 2015/0326102 A1* | 11/2015 | Radhakrishnan | ....... | H02M 1/00 |
| | | | | 323/271 |
| 2016/0141959 A1* | 5/2016 | Murakami | .......... | H02M 3/1588 |
| | | | | 323/271 |
| 2016/0301309 A1* | 10/2016 | Tateishi | ................ | H02M 3/158 |
| 2016/0322902 A1* | 11/2016 | Tsuruyama | ......... | H02M 3/1588 |

\* cited by examiner

SWITCHING POWER SUPPLY DEVICE

This application is based on the following Japanese patent applications, the contents of which are hereby incorporated by reference:

(1) Japanese Patent Application No. 2014-152703, filed on Jul. 28, 2014
(2) Japanese Patent Application No. 2014-152705, filed on Jul. 28, 2014
(3) Japanese Patent Application No. 2014-152708, filed on Jul. 28, 2014

BACKGROUND OF THE INVENTION

1. Field of the Invention

The present invention relates to switching power supply devices (switched-mode power supply device) of a non-linear control type.

2. Description of Related Art

FIG. 41 is a circuit block diagram showing one conventional example of a switching power supply device. Compared with switching power supply devices of a linear control type (e.g., a voltage mode control type and a current mode control type), switching power supply devices of a non-linear control type (e.g., a fixed on-period type, a fixed off-period type, and a hysteresis-window type) have the advantages of better load response combined with simple circuit configurations.

An example of conventional technology related to what is mentioned above is seen in Japanese Patent Application Publication No. 2014-017859 (hereinafter Patent Document 1).

On the other hand, according to a conventionally proposed function (for saving power under a light load), during the on-period of the synchronous rectification transistor N2, a reverse current toward the synchronous rectification transistor N2 is detected to turn off the synchronous rectification transistor N2. Inconveniently, however, once this power-saving function is activated, it takes time for the feedback voltage FB to fall below the reference voltage REF. This results in a low switching frequency under a light load, possibly causing noise audible to the human ear.

As a solution, according to another conventionally proposed function (for quiet operation), the switching frequency under a light load is kept above the human audible frequency range (roughly 20 Hz to 20 kHz) to suppress audible noise. Conventionally, such quiet operation is achieved in the following manner: when, after an on-timing of the output transistor N1, a predetermined threshold time elapses without the next on-timing coming, the synchronous rectification transistor N2 is forcibly turned on so as to lower the feedback voltage FB down to the reference voltage REF, thereby to invite an on-timing of the output transistor N1.

An example of conventional technology related to what is mentioned above is seen in Japanese Patent Application Publication No. 2014-075856.

Diminished Efficiency During Quiet Operation:

In the conventional quiet operation mentioned above, the synchronous rectification transistor N2 is forcibly turned on so that, as a result of the electric charge stored in the capacitor C1 being dumped to a ground node, the level shift timing of the main comparator is brought forward. This results in diminished efficiency.

Moreover, in the conventional quiet operation mentioned above, while a reverse current is just flowing from the coil L1 toward the synchronous rectification transistor N2, an on-timing of the output transistor N1 comes. Thus, turning the output transistor N1 only once does not allow sufficient energy to be stored in the coil L1, and consequently the feedback voltage FB may not rise above the reference voltage REF. In such a case, even under a light load, the output transistor N1 is held on throughout a plurality of cycles. This causes diminished efficiency.

Overshoot in Output Due to a Sharp Fall in Load:

Moreover, in a switching power supply device 100 of a non-linear control type, an overshoot occurs in the output voltage OUT in response to a sharp fall in load. To cope with it, various methods for suppressing an overshoot have conventionally been proposed.

According to a first conventional method, the output voltage OUT is monitored to check whether or not an overshoot is occurring, and according to the result of the check, an overshoot suppression function is activated. Inconveniently, however, with the first conventional method, the overshoot suppression function is not activated before an overshoot is actually detected. This results in a delay in the overshoot suppression action, diminishing its effect.

Improving the delay in the suppression action mentioned above requires a fast comparator. This invites increased cost and increased current consumption.

According to a second conventional method, when, as the load falls, the synchronous rectification transistor N2 is held on continuously for a predetermined period, an overshoot suppression function is activated. However, in the switching power supply device 100 of a non-linear control type, the switching frequency tends to vary according to operation status, and thus, with the second conventional method, an overshoot suppression function may be activated erroneously. For example, due to a restriction on the minimum on-time, producing a low output voltage OUT from a high input voltage IN causes the switching frequency to be low. This cannot be coped with by the second conventional method.

Diminished Efficiency Under a Light Load, and Erroneous Operation During Switching of Operation Modes:

Patent Document 1 discloses a switching power supply device provided with a sleep mode in which an on-time setting circuit and a reverse current detection circuit of the device are turned on and off as necessary.

To be sure, with the switching power supply device disclosed in Patent Document 1, going into sleep mode helps reduce the power consumption by the on-time setting circuit and the reverse current detection circuit, and this helps improve efficiency under a light load.

However, in the conventional switching power supply device, the highest priority is given to securing safety against, for example, a short circuit between output and ground: an overcurrent protection circuit is kept on all the time even under a light load, and a certain amount of driving current is consumed constantly. Thus, as for efficiency under a light load, there still remains room for further improvement.

Moreover, during switching between operation modes (during transition from normal mode to sleep mode, or during recovery from sleep mode to normal mode), the driving current for sleep target circuits varies greatly. Thus, with the conventional switching power supply device, the variation in current may cause unintended switching operation, possibly leading to increased output ripples.

SUMMARY OF THE INVENTION

In view of the above-mentioned problems encountered by the inventors of the present invention, an object of the present invention disclosed herein is to provide a power control IC that achieves high efficiency during quiet operation, and to provide a switching power supply device and an electronic appliance employing such a power control IC.

To achieve the above object, according to one aspect of the present invention, a power control IC includes: a switching control circuit of a fixed on-period type which is operable to generate an output voltage from an input voltage by driving a coil by turning on and off an output transistor according to a result of comparison between a feedback voltage and a reference voltage; and a quieting circuit which is operable to forcibly turn on the output transistor by ignoring the result of comparison when, after an on-timing of the output transistor, a predetermined threshold time elapses without the next on-timing coming.

In view of the above-mentioned problems encountered by the inventors of the present invention, another object of the present invention disclosed herein is to provide a power control IC that can suppress an overshoot in the output voltage in response to a sharp fall in load, and to provide a switching power supply device and an electronic appliance employing such a power control IC.

To achieve the above object, according to another aspect of the present invention, a power control IC includes: a switching control circuit of a non-linear control type which is operable to generate an output voltage from an input voltage by driving a coil by turning on and off an output transistor according to a result of comparison between a feedback voltage and a reference voltage; a ripple injection circuit which is operable to generate the feedback voltage by adding a ripple voltage imitating a coil current to a division voltage of the output voltage, or to generate the reference voltage by subtracting the ripple voltage from a predetermined constant voltage; and an overshoot suppression circuit which is operable to suppress an overshoot in the output voltage by monitoring the polarity reversal timing of the ripple voltage.

In view of the above-mentioned problems encountered by the inventors of the present invention, yet another object of the present invention disclosed herein is to provide a power control IC that can achieve high efficiency under a light load, and to provide a switching power supply device and an electronic appliance employing such a power control IC.

To achieve the above object, according to yet another aspect of the present invention, a power control IC includes: a gate driver circuit which is operable to drive an output transistor and a synchronous rectification transistor; a reverse current detection circuit which is operable to detect a reverse current toward the synchronous rectification transistor; and an overcurrent protection circuit which is operable to perform overcurrent protection operation when the offset current is higher than a threshold value. Here, the overcurrent protection circuit is turned on and off according to a result of detection of a reverse current.

In view of the above-mentioned problems encountered by the inventors of the present invention, a further object of the present invention disclosed herein is to provide a power control IC that can prevent erroneous operation during switching of operation modes, and to provide a switching power supply device and an electronic appliance employing such a power control IC.

To achieve the above object, according to a further aspect of the present invention, a power control IC includes: a sleep target circuit of which the operation mode is changed selectively between a normal mode and a sleep mode according to a mode change signal; and a mode change control circuit which is operable to mask an output of the sleep target circuit with no delay on transition from the normal mode to the normal mode, and to cease to mask the output of the sleep target circuit with a predetermined delay on recovery from the sleep mode to the normal mode.

Other features, elements, steps, benefits, and characteristics of the present invention will become clear from the following detailed description of its best mode taken in conjunction with the attached drawings.

DETAILED DESCRIPTION OF PREFERRED EMBODIMENTS

Figure 1:
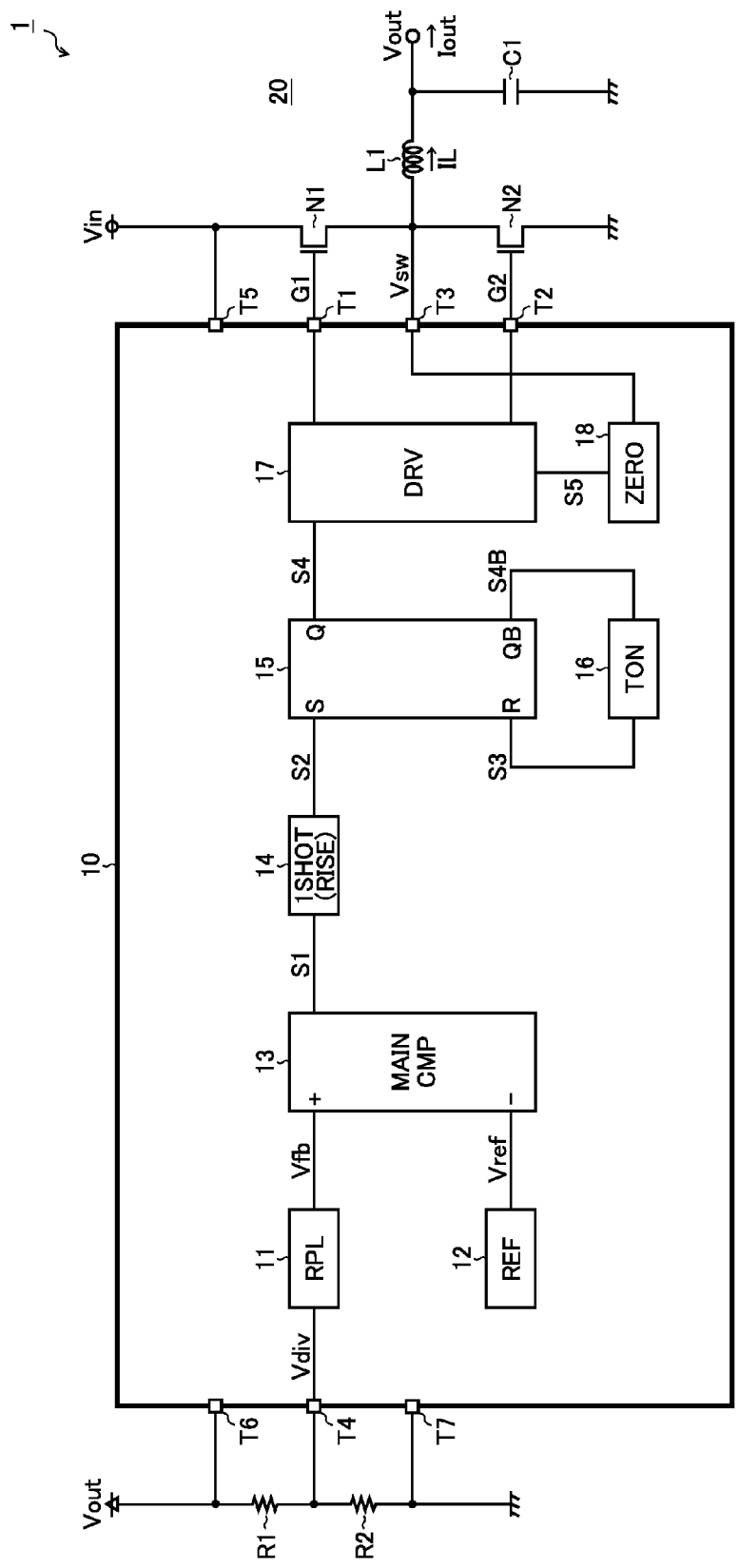
FIG. 1 is a block diagram showing a switching power supply device according to a first embodiment of the present invention.

Switching Power Supply Device:

FIG. 1 is a block diagram showing a switching power supply device according to a first embodiment of the present invention. The switching power supply device 1 according to the first embodiment is a step-down DC/DC converter that produces an output voltage Vout from an input voltage Vin by a non-linear control method (a bottom-detecting, fixed on-period method). The switching power supply device 1 includes a semiconductor device 10 and a switching output stage 20, the latter being formed by various discrete components (N-channel MOS field-effect transistors N1 and N2, a coil L1, a capacitor C1, and resistors R1 and R2) externally fitted to the semiconductor device 10.

The semiconductor device 10 is the main component (a so-called power control IC) that controls the overall operation of the switching power supply device 1 in a centralized fashion. The semiconductor device 10 has, as means for establishing electrical connection with outside the device, external terminals T1 to T7 (an upper gate terminal T1, a lower gate terminal T2, a switch terminal T3, a feedback terminal T4, an input voltage terminal T5, an output voltage terminal T6, and a ground terminal T7). The external terminal T1 is connected to a gate of the transistor N1. The external terminal T2 is connected to a gate of the transistor N2. The external terminal T3 is connected to an application node of a switching voltage Vsw (the connection node between a source of the transistor N1 and a drain of the transistor N2). (Throughout the specification, an "application node" of a given signal/voltage/current denotes a node to which that signal/voltage/current is applied.) The external terminal T4 is connected to an application node of a division voltage Vdiv (the connection node between the resistors R1 and R2). The external terminal T5 is connected to an application node of the input voltage Vin. The external terminal T6 is connected to an application node of the output voltage Vout. The external terminal T7 is connected to a ground node.

Next, the interconnection of the discrete components externally fitted to the semiconductor device 10 will be described. A drain of the transistor N1 is connected to the application node of the input voltage Vin. A source of the transistor N2 is connected to the ground node. The source of the transistor N1 and the drain of the transistor N2 are both connected to a first terminal of the coil L1. A second terminal of the coil L1 and a first terminal of the capacitor C1 are both connected to the application node of the output voltage Vout. A second terminal of the capacitor C1 is connected to the ground node. The resistors R1 and R2 are connected in series between the application node of the output voltage Vout and the ground node.

The transistor N1 is an output transistor which is turned on and off according to a gate signal G1 fed in via the external terminal T1. The transistor N2 is a synchronous rectification transistor which is turned on and off according to a gate signal G2 fed in via the external terminal T2. Instead of the transistor N2, a diode may be used as a rectifying device. The transistors N1 and N2 may be integrated into the semiconductor device 10. The coil L1 and the capacitor C1 function as a rectifier/smoother which rectifies and smooths the switching voltage Vsw having a rectangular waveform which appears at the external terminal T3. The resistors R1 and R2 function as a division voltage generator which divides the output voltage Vout to produce the division voltage Vdiv.

Next, the internal configuration of the semiconductor device 10 will be described. The semiconductor device 10 has integrated into it a ripple injection circuit 11, a reference voltage generation circuit 12, a main comparator 13, a one-shot pulse generation circuit 14, an RS flip-flop 15, an on-period setting circuit 16, a gate driver circuit 17, and a reverse current detection circuit 18.

The ripple injection circuit 11 generates a feedback voltage Vfb (=Vdiv+Vrpl) by adding to the division voltage Vdiv a ripple voltage Vrpl (a pseudo ripple component that imitates a coil current IL passing through the coil L1). Exploiting such a ripple injection technology allows stable switching control even in cases where the output voltage Vout (and hence the division voltage Vdiv) contains a not very large ripple component, and thus allows the use of a capacitor with a low ESR, such as a laminated ceramic capacitor, as the capacitor C1.

The reference voltage generation circuit 12 generates a predetermined reference voltage Vref.

The main comparator 13 generates a comparison signal S1 by comparing the feedback voltage Vfb, which is fed to an inverting input terminal (−) of the main comparator 13, with the reference voltage Vref, which is fed to a non-inverting input terminal (+) of the main comparator 13. The comparison signal S1 is at low level when the feedback voltage Vfb is higher than the reference voltage Vref, and is at high level when the feedback voltage Vfb is lower than the reference voltage Vref.

The one-shot pulse generation circuit 14 generates a one-shot pulse in a set signal S2 by being triggered by a rising edge in the comparison signal S1.

The RS flip-flop 15 sets an output signal S4 to high level at a rising edge in the set signal S2, which is fed to a set terminal (S) of the RS flip-flop 15, and resets the output signal S4 to low level at a rising edge in a reset signal S3, which is fed to a reset terminal (R) of the RS flip-flop 15.

The on-period setting circuit 16 generates a one-shot pulse in the reset signal S3 when, after an inverted output signal S4B (the logically inversion of the output signal S4) of the RS flip-flop 15 is lowered to low level, a predetermined on-period Ton elapses.

The gate driver circuit 17 generates the gate signals G1 and G2 according to the output signal S4 of the RS flip-flop 15, and controls the switching of the transistors N1 and N2 in a complementary (exclusive) fashion. In the present specification, the term "complementary (exclusive)" covers not only the transistors N1 and N2 being turned on and off in a completely opposite manner but also, from the viewpoint of preventing a through current, their being turned on and off with a delay in on/off transition timing (with a simultaneously-off period (dead time) inserted).

The reverse current detection circuit 18 generates a reverse current detection signal S5 by monitoring a reverse current toward the transistor N2 (a coil current IL that passes in the reverse direction from the coil L1 through the transistor N2 to the ground node). The reverse current detection signal S5 is latched at high level (the logic level indicating that a reverse current is being detected) when a reverse current toward the transistor N2 is detected, and is reset to low level (the logic level indicating that a reverse current is not being detected) at a rising edge in the gate signal G1 in the next cycle. As one method of monitoring a reverse current, for example, it is possible to detect, during the on-period of the transistor N2, a zero-cross point in the switching voltage Vsw, that is, the point at which it turns from negative to positive. The gate driver circuit 17 generates the gate signal G2 such that, when the reverse current detection signal S5 is at high level, the transistor N2 is forcibly turned off irrespective of the logic level of the output signal S4.

Incidentally, the reference voltage generation circuit 12, the main comparator 13, the one-shot pulse generation circuit 14, the RS flip-flop 15, the on-period setting circuit 16, the gate driver circuit 17, and the reverse current detection circuit 18 described above function as a switching control circuit of a non-linear control type (in the configuration example under discussion, a bottom-detecting, fixed on-period type) which produces the output voltage Vout from the input voltage Vin by turning the transistors N1 and N2 on and off according to the result of comparison between the feedback voltage Vfb and the reference voltage Vref.

Figure 2:
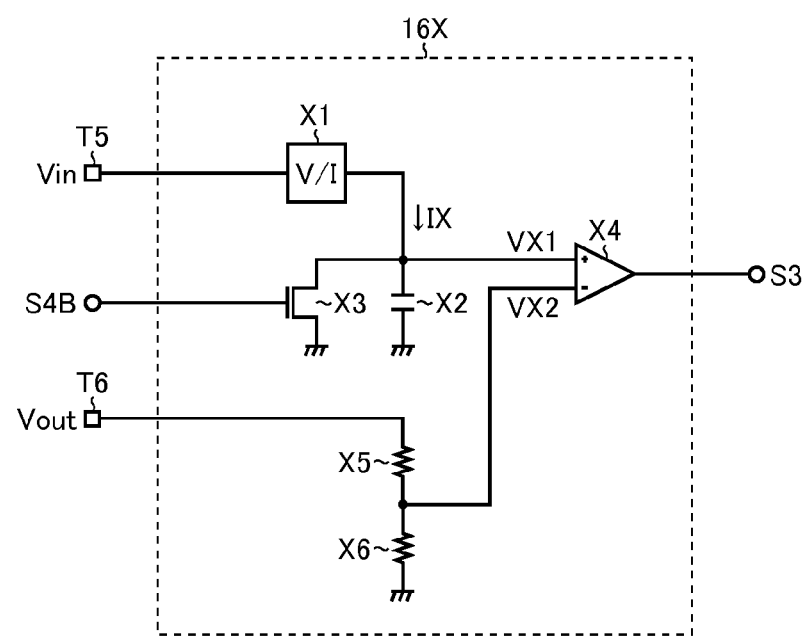
FIG. 2 is a diagram showing a first configuration example of an on-time setting circuit.

On-Period Setting Circuit (1st Configuration Example):

FIG. 2 is a diagram showing a first configuration example of the on-period setting circuit 16. The on-period setting circuit 16X of the first configuration example includes a voltage/current converter X1, a capacitor X2, an N-channel MOS field-effect transistor X3, a comparator X4, and resistors X5 and X6.

The voltage/current converter X1 generates a charge current IX ($=a \times Vin$) by performing voltage/current conversion on the input voltage Vin applied to the external terminal T5. The current value of the charge current IX varies with the voltage value of the input voltage Vin. Specifically, the higher the input voltage Vin is, the higher the charge current IX is; the lower the input voltage Vin is, the lower the charge current IX is.

A first terminal of the capacitor X2 is connected to the voltage/current converter X1. A second terminal of the capacitor X2 is connected to a ground node. When the transistor X3 is off, the capacitor X2 is charged with the charge current IX, and a first voltage VX1 which appears at the first terminal of the capacitor X2 rises. On the other hand, when the transistor X3 is on, the capacitor X2 is discharged via the transistor X3, and the first voltage VX1 falls.

The transistor X3 is a charge/discharge select switch which switches between charging and discharging of the capacitor X2 as the transistors N1 and N2 are turned on and off. A drain of the transistor X3 is connected to the first terminal of the capacitor X2. A source of the transistor X3 is connected to the ground node. A gate of the transistor X3 is connected to an application node of the inverted output signal S4B.

The voltage/current converter X1, the capacitor X2, and the transistor X3 described above constitute a first voltage generation circuit which generates the first voltage VX1 according to the charging and discharging of the capacitor X2.

The comparator X4 generates the reset signal S3 by comparing the first voltage VX1, which is fed to a non-inverting input terminal (+) of the comparator X4, with a second voltage VX2, which is fed to an inverting input terminal (−) of the comparator X4. The reset signal S3 is at high level when the first voltage VX1 is higher than the second voltage VX2, and is at low level when the first voltage VX1 is lower than the second voltage VX2.

A first terminal of the resistor X5 is connected to the external terminal T6, to which the output voltage Vout is applied. A second terminal of the resistor X5 is connected to a first terminal of the resistor X6. A second terminal of the resistor X6 is connected to the ground node. The resistors X5 and X6 constitute a second voltage generation circuit which divides the output voltage Vout to output the second voltage VX2 from the connection node between them.

Figure 3:
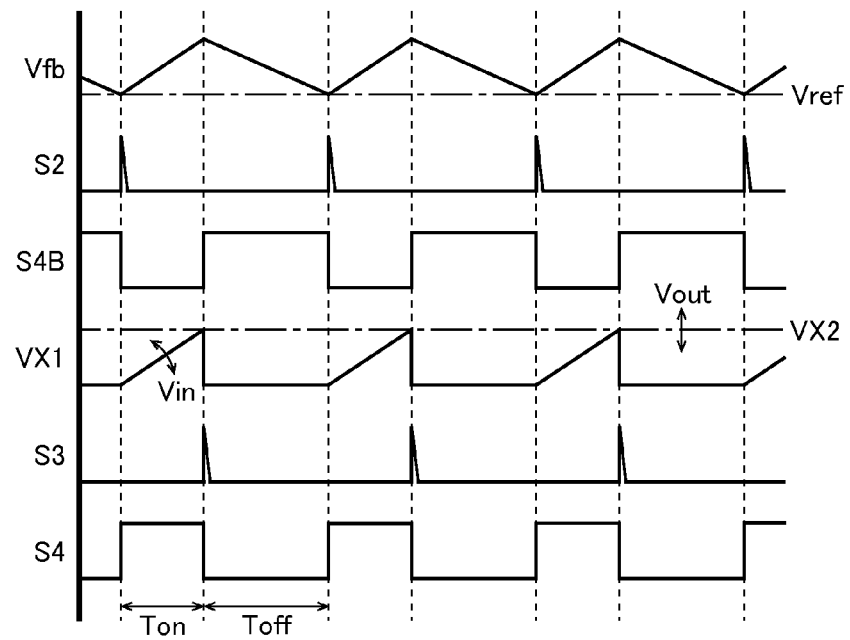
FIG. 3 is a time chart illustrating on-time setting operation in the first configuration example.

FIG. 3 is a time chart illustrating on-period setting operation in the first configuration example. FIG. 3 depicts, from top down, the feedback voltage Vfb, the set signal S2, the inverted output signal S4B, the first voltage VX1, the reset signal S3, and the output signal S4.

During the off-period of the transistor N1, when the feedback voltage Vfb falls down to the reference voltage Vref, the set signal S2 rises to high level, and the output signal S4 turns to high level. Now, the transistor N1 is on, and the feedback voltage Vfb starts to rise back up. At this point, as the inverted output signal S4B turns to low level, the transistor X3 turns off, and thus the capacitor X2 starts to be charged by the charge current IX. As mentioned previously, the current value of the charge current IX varies with the voltage value of the input voltage Vin. Accordingly, the first voltage VX1 rises at a rate of increase (slope) commensurate with the input voltage Vin.

Thereafter, when the first voltage VX1 rises up to the second voltage VX2 (a division voltage of the output voltage Vout), the reset signal S3 rises to high level, and the output signal S4 turns to low level. Now, the transistor N1 is off, and the feedback voltage Vfb starts to fall back down. At this point, as the inverted output signal S4B turns to high level, the transistor X3 turns on. Thus, the capacitor X2 is discharged rapidly via the capacitor X2, and the first voltage VX1 is lowered to low level.

The gate driver circuit 17 generates the gate signals G1 and G2 according to the output signal S4, and uses them to turn the transistors N1 and N2 on and off. As a result, the switching voltage Vsw having a rectangular waveform appears at the external terminal T3. The switching voltage Vsw is rectified and smoothed by the coil L1 and the capacitor C1, and thereby the output voltage Vout is produced. The output voltage Vout is divided by the resistors R1 and R2, and thereby the division voltage Vdiv (and hence the feedback voltage Vfb) is produced. Through such output feedback control, the switching power supply device 1 produces, with a very simple configuration, a desired output voltage Vout from an input voltage Vin.

Here, the on-period setting circuit 16X sets the on-period Ton not at a constant value but at a variable value that varies with the input voltage Vin and the output voltage Vout. Specifically, the higher the input voltage Vin is, the higher (steeper) the on-period setting circuit 16X makes the rate of increase (slope) of the first voltage VX1 to shorten the on-period Ton; the lower the input voltage Vin is, the lower (gentler) the on-period setting circuit 16X makes the rate of increase (slope) of the first voltage VX1 to lengthen the on-period Ton. Moreover, the lower the output voltage Vout is, the lower the on-period setting circuit 16X makes the second voltage VX2 to shorten the on-period Ton; the higher the output voltage Vout is, the higher the on-period setting circuit 16X makes the second voltage VX2 to lengthen the on-period Ton. In other words, the on-period setting circuit 16X sets the on-period Ton at a variable value that is inversely proportional to the input voltage Vin and that is proportional to the output voltage Vout.

With the configuration described above, it is possible to suppress fluctuation of switching frequency without spoiling the benefits of a non-linear control method. It is thus possible to improve output voltage accuracy and load regulation characteristics, and to facilitate coping with EMI (electromagnetic interference) and noise in set design. It is also possible to apply the switching power supply device 1 with no trouble as power supply means in applications where the input voltage varies greatly or where different output voltages are needed.

Figure 4:
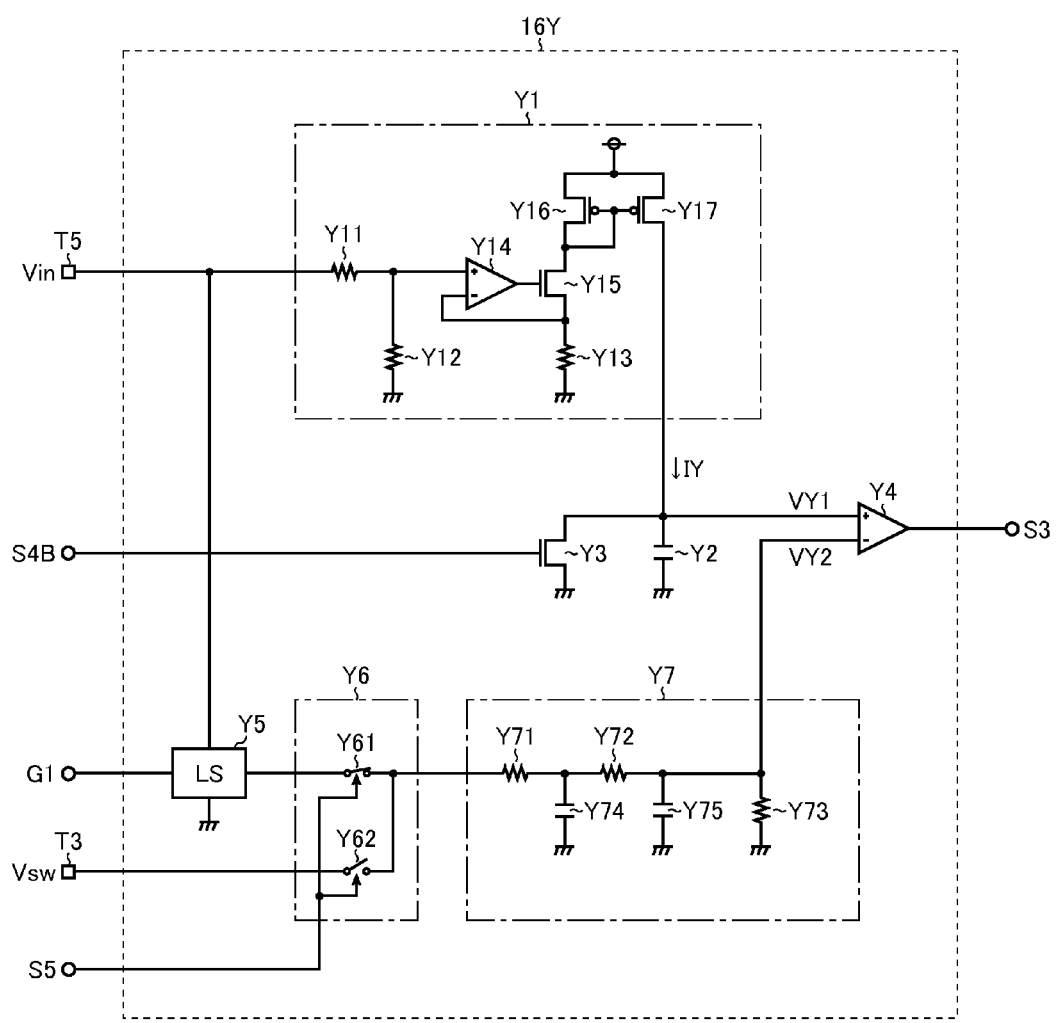
FIG. 4 is a diagram showing a second configuration example of an on-time setting circuit.

On-Period Setting Circuit (2nd Configuration Example):

FIG. 4 is a diagram showing a second configuration example of the on-period setting circuit 16. The on-period setting circuit 16Y of the second configuration example includes a voltage/current converter Y1, a capacitor Y2 (with a capacitance value of CY2), an N-channel MOS field-effect transistor Y3, a comparator Y4, a level shifter Y5, a selector Y6, and a filter Y7. The second configuration example is characterized by having, in place of the resistors X5 and X6 provided in the first configuration example, the level shifter Y5, the selector Y6, and the filter Y7.

The voltage/current converter Y1 is a circuit block which generates a charge current IY (=a×Vin) by performing voltage/current conversion on the input voltage Vin which is applied to the external terminal T5, and includes resistors Y11 to Y13 (with resistance values of RY11 to RY13), an operational amplifier Y14, an N-channel MOS field-effect transistor Y15, and P-channel MOS field-effect transistors Y16 and Y17.

A first terminal of the resistor Y11 is connected to the external terminal T5. A second terminal of the resistor Y11 and a first terminal of the resistor Y12 are both connected to a non-inverting input terminal (+) of the operational amplifier Y14. A second terminal of the resistor Y12 is connected to a ground node. An inverting input terminal (−) of the operational amplifier Y14 is connected to a source of the transistor Y15 and to a first terminal of the resistor Y13. A second terminal of the resistor Y13 is connected to the ground node. An output terminal of the operational amplifier Y14 is connected to the gate of the transistor Y15. A drain of the transistor Y15 is connected to the drain of the transistor Y16. Sources of the transistors Y16 and Y17 are both connected to a supply power node. Gates of the transistors Y16 and Y17 are both connected to a drain of the transistor Y16. A drain of the transistor Y17 is, as an output node of the charge current IY, connected to a first terminal of the capacitor Y2. (Throughout the specification, an "output node" of a given signal/voltage/current denotes a node from which that signal/voltage/current is output.)

As expressed by equation (1) below, the higher the input voltage Vin is, the higher the charge current IY is; the lower the input voltage Vin is, the lower the charge current IY is.

$$IY = \left(\frac{RY12 \cdot RY13}{RY11 + RY12}\right) \cdot Vin \qquad (1)$$

The first terminal of the capacitor Y2 is connected to the voltage/current converter Y1. A second terminal of the capacitor Y2 is connected to the ground node. When the transistor Y3 is off, the capacitor Y2 is charged by the charge current IY, and a first voltage VY1 which appears at the first terminal of the capacitor Y2 rises. On the other hand, when the transistor Y3 is on, the capacitor Y2 is discharged via the transistor Y3, and the first voltage VY1 falls.

The transistor Y3 is a charge/discharge select switch which switches between charging and discharging of the capacitor Y2 as the transistors N1 and N2 are turned on and off. A drain of the transistor Y3 is connected to the first terminal of the capacitor Y2. A source of the transistor Y3 is connected to the ground node. A gate of the transistor Y3 is connected to an application node of the inverted output signal S4B.

The voltage/current converter Y1, the capacitor Y2, and the transistor Y3 described above constitute a first voltage generation circuit which generates the first voltage VY1 according to charging and discharging of the capacitor Y2.

The comparator Y4 generates the reset signal S3 by comparing the first voltage VY1, which is fed to a non-inverting input terminal (+) of the comparator Y4, with a second voltage VY2, which is fed to an inverting input terminal (−) of the comparator Y4. The reset signal S3 is at high level when the first voltage VY1 is higher than the second voltage VY2, and is at low level when the first voltage VY1 is lower than the second voltage VY2. Seeing that the capacitor Y2 starts to be charged at the same time that the transistor N1 turns on, and that the transistor N1 is turned off by being triggered by a rising edge in the reset signal S3, the on-state period Ton is calculated by equation (2) below.

$$Ton = \frac{CY2}{IY} \cdot VY2 \qquad (2)$$

The level shifter Y5 operates by being fed with the input voltage Vin, and shifts the level of the gate signal G1. Specifically, the level shifter Y5 receives the gate signal G1, and outputs a voltage signal that pulsates between the input voltage Vin and a ground voltage GND. The withstand voltage of the components constituting the level shifter Y5 is set appropriately according to the voltage difference between the input voltage Vin and the ground voltage GND.

The selector Y6 is a circuit block which operates according to the reverse current detection signal S5 such that, when no reverse current is being detected, the selector Y6 selects the level-shifted gate signal G1 and, when a reverse current is being detected, the selector Y6 selects the switching voltage Vsw. The selector Y6 includes switches Y61 and Y62. Incidentally, when a reverse current is being detected, the transistors N1 and N2 are both off due to the later described power-saving operation (reverse current shut-out operation) under a light load, and thus the switching voltage Vsw is equal to the output voltage Vout.

The switch Y61 switches the path between an output terminal of the level shifter Y5 and an input terminal of the filter Y7 between a conducting and a cut-off state according to the reverse current detection signal S5. More specifically, the switch Y61 is on when the reverse current detection signal S5 is at low level (the logic level indicating that no reverse current is being detected), and is off when the current detection signal S5 is at high level (the logic level indicating that a reverse current is being detected).

On the other hand, the switch Y62 switches the path between the external terminal T3 and the input terminal of the filter Y7 between a conducting and a cut-off state according to the reverse current detection signal S5. More specifically, the switch Y62 is off when the reverse current detection signal S5 is at low level, and is on when the reverse current detection signal S5 is at high level.

In a configuration where the switching voltage Vsw is fed via the filter Y7 to the comparator Y4, ringing noise that can be contained in the switching voltage Vsw can be eliminated by the filter Y7. This, however, is not meant to limit the configuration of the on-period setting circuit 16Y; also possible is a configuration where, when a reverse current is being detected, the switching voltage Vsw is fed directly to the inverting input terminal (−) of the comparator Y4.

The filter Y7 is a circuit block which generates the second voltage VY2 by smoothing the output of the selector Y6, and includes resistors Y71 to Y73 and capacitors Y74 and Y75. A first terminal of the resistor Y71 is connected to the output terminal of the selector Y6. A second terminal of the resistor Y71 is connected to a first terminal of the resistor Y72 and to a first terminal of the capacitor Y74. A second terminal of the capacitor Y74 is connected to the ground node. A second terminal of the resistor Y72 is connected to an inverting input terminal (−) of the comparator Y4, to a first terminal of the resistor Y73, and to a first terminal of the capacitor Y75. A second terminal of the resistor Y73 and a second terminal of the capacitor Y75 are both connected to the ground node.

Thus, the filter Y7 includes a CR filter circuit composed of the resistors Y71 and Y72 and the capacitors Y74 and Y75. The number of stages (in FIG. 4, two stages) in the CR filter can be increased or decreased as appropriate.

The filter Y7 further includes the resistor Y73, which, along with the resistors Y71 and Y72 constituting the CR filter circuit, constitutes a voltage division circuit. Although FIG. 4 shows, as an example, a configuration where the connection node between the resistors Y72 and Y73 serves as an output terminal of the filter Y7, this is not meant to limit the configuration of the filter Y7; also possible is a configuration where, for example, the resistor Y73 is inserted between the first terminal of the resistor Y71 and the ground node so that the connection node between the resistors Y71 and Y73 serves as the input terminal of the filter Y7.

The level shifter Y5, the selector Y6, and the filter Y7 described above constitute a second voltage generation circuit which, when no reverse current is being detected, generates the second voltage VY2 according to the on-duty of the transistor N1 and, when a reverse current is being detected, generates the second voltage VY2 according to the switching voltage Vsw (and hence the output voltage Vout).

The operation of the on-period setting circuit 16Y configured as described above will now be described in detail, separately for when no reverse current is being detected (in a continuous-current mode) and when a reverse current is being detected (in a discontinuous-current mode).

First, how the on-period setting circuit 16Y operates when no reverse current is being detected (in continuous-current mode) will be described in detail. When no reverse current is being detected (in continuous-current mode), the reverse current detection signal S5 is at low level, and thus the selector Y6 selectively outputs the level-shifted gate signal G1 to the filter Y7. The second voltage VY2 generated in this mode is calculated by equation (3) below. In equation (3), DUTY represents the duty of the switching voltage Vsw, and RON represents the on-state resistance of the transistor N1.

$$VY2 = Vin \times \mathrm{DUTY} = Vin \times \left( \frac{Vout + Iout \cdot RON}{Vin} \right) \quad (3)$$

Hence, substituting equations (1) and (3) in equation (2) noted previously gives equation (4) below, by which the on-period Ton can be calculated.

$$Ton = \frac{CY2}{\left(\frac{RY12 \cdot RY13}{RY11 + RY12}\right) \cdot Vin} \cdot Vin \cdot \left(\frac{Vout + Iout \cdot RON}{Vin}\right) = \quad (4)$$

$$\gamma \cdot \left(\frac{Vout + Iout \cdot RON}{Vin}\right)$$

$$\text{※ } \gamma = \frac{CY2}{\left(\frac{RY12 \cdot RY13}{RY11 + RY12}\right)} \quad (const.)$$

Thus, when no reverse current is being detected (in continuous-current mode), the on-period Ton is set at a variable value that varies with the on-duty (=(Vout+Iout× RON)/Vin) of the transistor N1.

Next, how the on-period setting circuit 16Y operates when a reverse current is being detected (in discontinuous-current mode) will be described in detail. When a reverse current is being detected (in discontinuous-current mode), the reverse current detection signal S5 is at high level, and thus the selector Y6 selectively outputs the switching voltage Vsw (and hence the output voltage Vout) to the filter Y7. Thus, the second voltage VY2 is identical with the switching voltage Vsw (and hence the output voltage Vout), and the on-period Ton is calculated by equation (5) below.

$$Ton = \frac{CY2}{\left(\frac{RY12 \cdot RY13}{RY11 + RY12}\right) \cdot Vin} \cdot Vout = \gamma \cdot \frac{Vout}{Vin} \quad (5)$$

$$\text{where } \gamma = \frac{CY2}{\left(\frac{RY12 \cdot RY13}{RY11 + RY12}\right)} \quad (const.)$$

Thus, when a reverse current is being detected (in light-load mode), the on-period Ton is set at a variable value that varies with the input voltage Vin and the output voltage Vout. This operation for setting the on-period Ton is similar to that in the first configuration example described previously.

As described above, in the second configuration example, the on-period setting circuit 16Y is configured to generate the second voltage VY2, when no reverse current is being detected, according to the on-duty of the transistor N1 and, when a reverse current is being detected, according to the switching voltage Vsw (and hence the output voltage Vout).

With this configuration, it is possible, without being affected by power-saving operation (reverse current shut-off operation) under a light load, to obtain benefits similar to those of the first configuration example described previously (i.e., to suppress fluctuation of switching frequency, to improve output voltage accuracy and load regulation characteristics, and to facilitate coping with EMI and noise in set design).

Moreover, in the second configuration example, the on-period setting circuit 16Y sets the on-period Ton by monitoring the switching voltage Vsw. Thus, as distinct from the first configuration example described previously, there is no need to provide the semiconductor device 10 separately with the external terminal T6 for monitoring the output voltage Vout.

Figure 5:
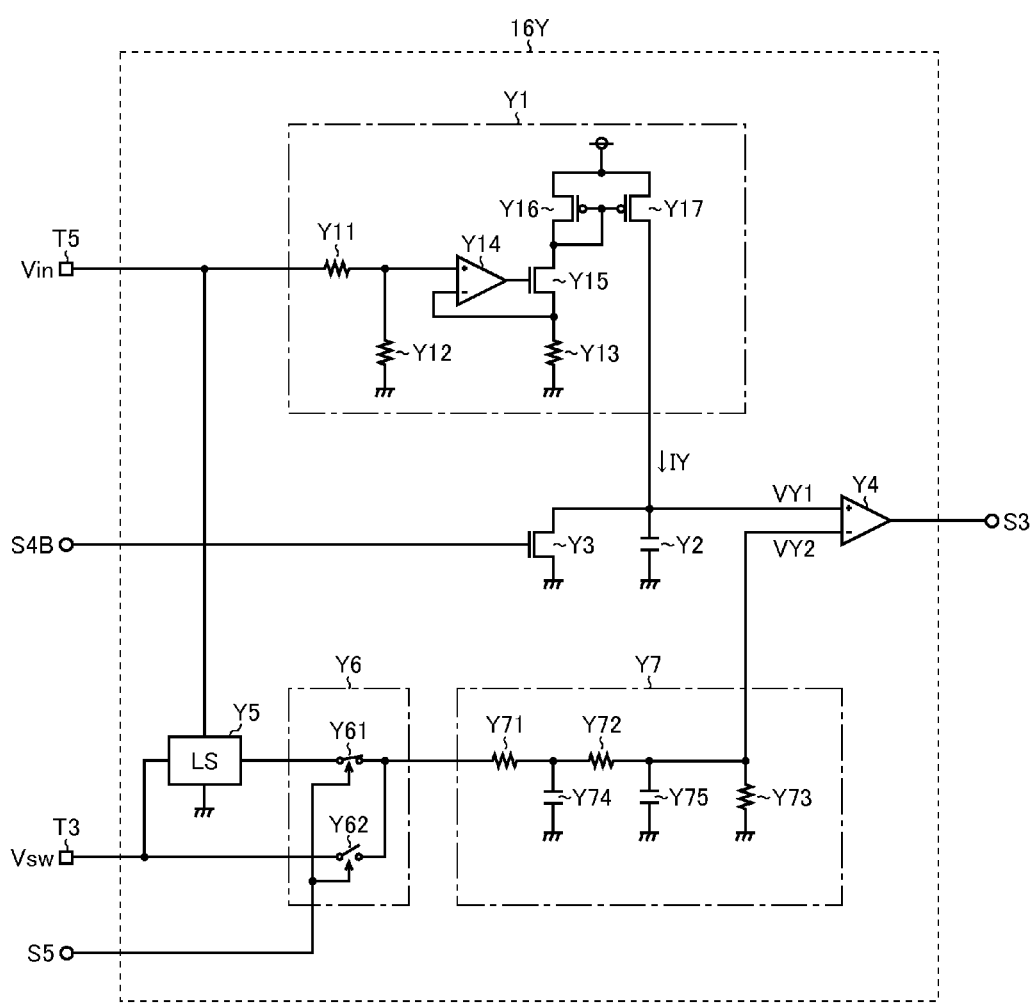
FIG. 5 is a diagram showing one modified example of an on-time setting circuit of the second configuration example.

Although FIG. 4 shows, as an example, a configuration where the gate signal G1 is fed to the level shifter Y5, this is not meant to limit the configuration of the on-period setting circuit 16Y; also possible is a configured where, for example as shown in FIG. 5, the switching voltage Vsw is fed to the level shifter Y5.

Figure 6:
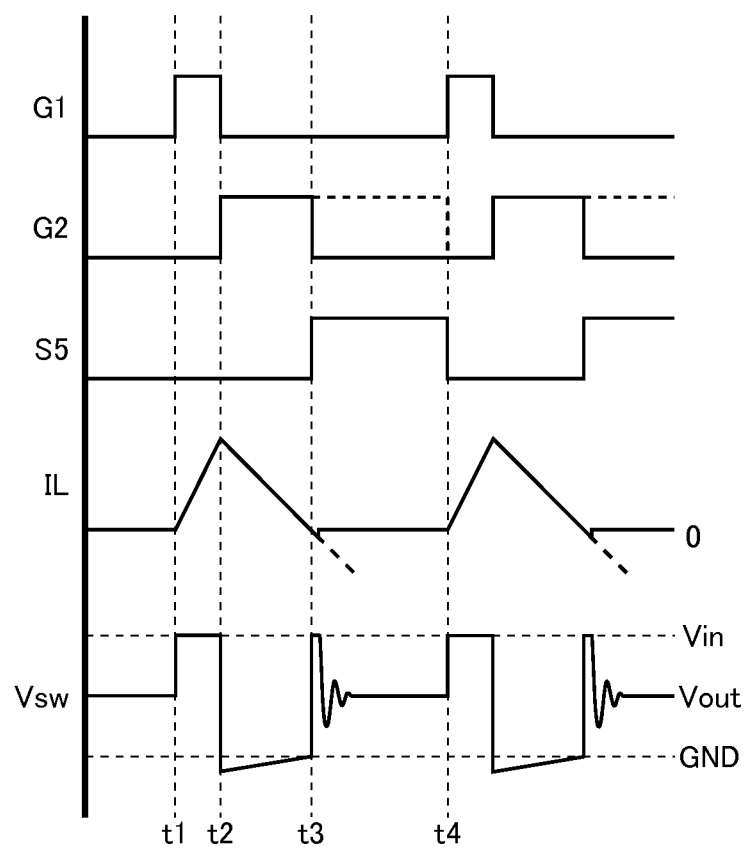
FIG. 6 is a time chart illustrating power-saving operation (reverse current shut-off operation) under a light load.

Reverse Current Detection Circuit:

FIG. 6 is a time chart illustrating the power-saving operation (reverse current shut-out operation) of the reverse current detection circuit 18 under a light load, and depicts, from top down, the gate signals G1 and G2, the reverse current detection signal S5, the coil current IL, and the switching voltage Vsw.

Between time points t1 and t2, the gate signal G1 is at high level, and the gate signal G2 is at low level; thus, the transistor N1 is on, and the transistor N2 is off. Accordingly, between time points t1 and t2, the switching voltage Vsw rises up to approximately the input voltage Vin, and the coil current IL keeps increasing.

At time point t2, the gate signal G1 is lowered to low level and the gate signal G2 is raised to high level; this turns the transistor N1 off and the transistor N2 on. Accordingly, the switching voltage Vsw falls down to a negative voltage (=GND−IL×RON), and the coil current IL starts to decrease.

Here, under a heavy load, i.e., when the output current Iout passing through the load is sufficiently high, the energy stored in the coil L1 is so high that, up to time point t4 when the gate signal G1 is raised back to high level, the coil current IL continues passing toward the load without falling below a zero value, and the switching voltage Vsw is held at the negative voltage. On the other hand, under a light load, i.e., when the output current Iout passing through the load is low, the energy stored in the coil L1 is so low that, at time point t3, the coil current IL falls below a zero value, and a reverse current toward the transistor N2 occurs; this switches the polarity of the switching voltage Vsw from negative to positive. This state is as if dumping the electric charge stored in the capacitor C1 to the ground node, and thus causes diminished efficiency under a light load.

As a solution, in the switching power supply device 1, the reverse current detection circuit 18 is used to detect a reverse current toward the transistor N2 (the reversal of the polarity of the switching voltage Vsw) so that, during the high-level period of the reverse current detection signal S5 (between time points t3 to t4), the transistor N2 is forcibly turned off. With this configuration, a reverse current toward to transistor N2 can be shut off quickly, and this helps overcome diminished efficiency under a light load.

Figure 7:
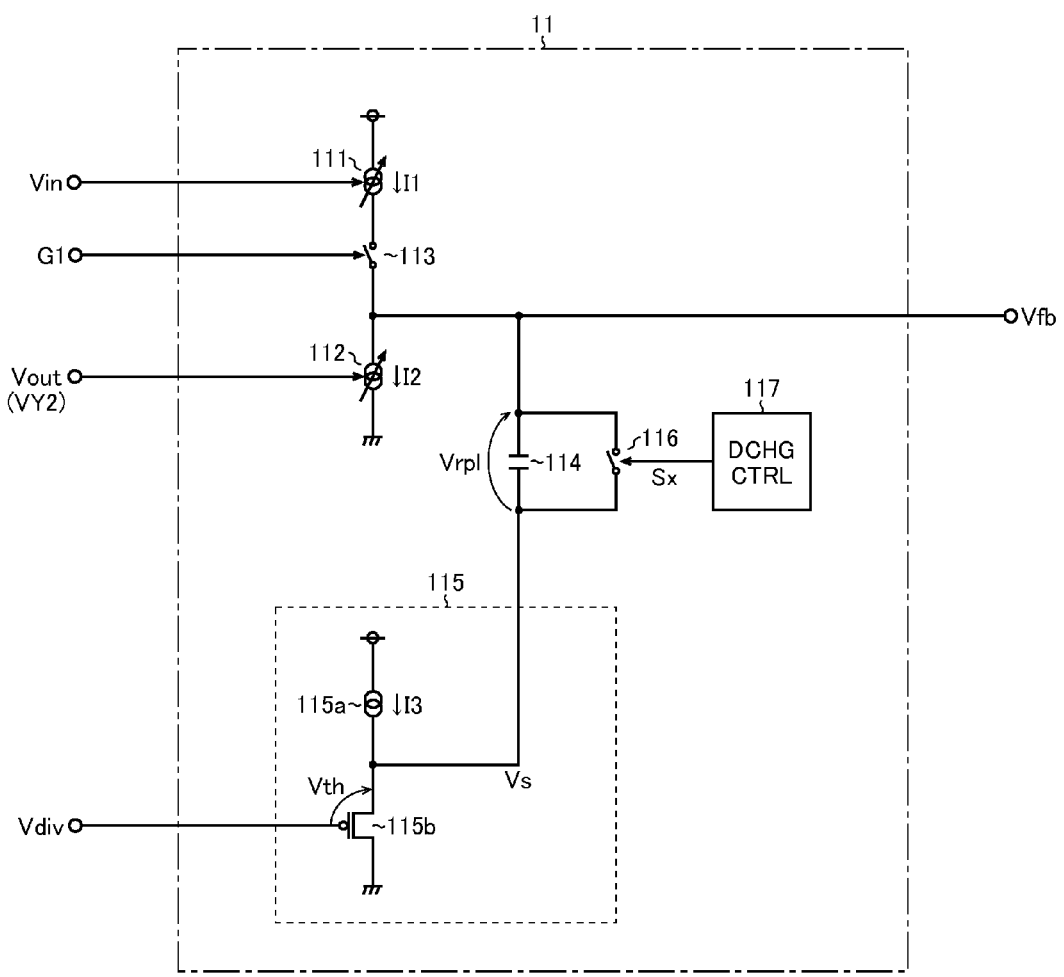
FIG. 7 is a diagram showing one configuration example (on a feedback-voltage side) of a ripple injection circuit.

Ripple Injection Circuit (on Feedback-Voltage Side):

FIG. 7 is a diagram showing one configuration example of the ripple injection circuit 11. The ripple injection circuit 11 of this configuration example includes current sources 111 and 112, a charge/discharge select switch 113, a capacitor 114, a terminal voltage feeder 115, a discharge switch 116, and a discharge controller 117.

The current source 111 is a first current source which generates a first current I1 ($=\alpha \times$Vin, where $\alpha$ is a proportionality constant) commensurate with the input voltage Vin. A first terminal of the current source 111 is connected to a supply power node. A second terminal of the current source 111 is connected via the charge/discharge select switch 113 to a first terminal of the capacitor 114 (an output node of the feedback voltage Vfb).

The current source 112 is a second current source which generates a second current I2 ($=\alpha \times$Vout) commensurate with the output voltage Vout. A first terminal of the current source 112 is connected to the first terminal of the capacitor 114 (the output node of the feedback voltage Vfb). A second terminal of the current source 112 is connected to a ground node. In the step-down (Vin>Vout) switching power supply device 1, in a case where the current sources 111 and 112 have an equal proportionality constant $\alpha$, I1>I2. The current source 112 may be configured so as to generate the second current I2 commensurate with a voltage corresponding to the on-duty of the transistor N1 (e.g., the second voltage VY2 in FIG. 4).

The charge/discharge select switch 113, by being turned on and off according to the gate signal G1, switches the path between the second terminal of the current source 111 and the first terminal of the capacitor (the output node of the feedback voltage Vfb) between a conducting and a shut-off state. More specifically, the charge/discharge select switch 113 is on during the high-level period of the gate signal G1 (the on-period of the transistor N1), and is off during the low-level period of the gate signal G1 (the off-period of the transistor N1).

The first terminal of the capacitor 114 is connected to the output node of the feedback voltage Vfb. A second terminal of the capacitor 114 is connected to the terminal voltage feeder 115. During the on-period of the charge/discharge select switch 113 (the on-period of the transistor N1), a differential current (=I1−I2>0) resulting from subtracting the second current I2 from the first current I1 passes into the capacitor 114, and thus the capacitor 114 is charged (the voltage across the terminals of the capacitor 114 rises). On the other hand, during the off-period of the charge/discharge select switch 113 (the off-period of the transistor N1), the first current I1 is shut off; thus, the second current I2 is extracted from the capacitor 114, and thereby the capacitor 114 is discharged (the voltage across the terminals of the capacitor 114 falls).

The terminal voltage feeder 115 is a circuit block which applies a terminal voltage of the capacitor 114 (in FIG. 7, a source voltage Vs) such that the voltage across the capacitor 114 is, as a ripple voltage Vrpl, added to the division voltage Vdiv, and includes a current source 115a and a P-channel MOS field-effect transistor 115b. The current source 115a is connected between a supply power node and a source of the transistor 115b, and generates a predetermined third current I3 (an operating current of the transistor 115b). A gate of the transistor 115b is connected to an application node of the division voltage Vdiv. A drain of the transistor 115b is connected to the ground node. The source of the transistor 115b is connected to a second terminal of the capacitor 114. Configured as described above, the terminal voltage feeder 115 functions as a source follower which applies to the second terminal of the capacitor 114 a source voltage Vs (=Vdiv+Vth) which is higher than the division voltage Vdiv by the on-threshold voltage Vth of the transistor 115b. Accordingly, the feedback voltage Vfb output from the first terminal of the capacitor 114 has a voltage value (=Vdiv+Vth+Vrpl) that is the sum of the source voltage Vs, which is applied to the second terminal of the capacitor 114, and the ripple voltage Vrpl.

The discharge switch 116 is connected in parallel with the capacitor 114, and is turned on and off according to a discharge control signal Sx fed from the discharge controller 117. Specifically, the discharge switch 116 is on when the discharge control signal Sx is at high level, and is off when the discharge control signal Sx is at low level. When the discharge switch 116 is turned on, the capacitor 114 is short-circuited across its terminals; thus, the capacitor 114 is discharged rapidly, and the ripple voltage Vrpl is reset to a zero value.

The discharge controller 117 generates the discharge control signal Sx such that the discharge switch 116 is turned on every time before the capacitor 114 starts to be charged. That is, the ripple voltage Vrpl is reset every time before the capacitor 114 starts to be charged.

Configured as described above, the ripple injection circuit 11 generates the ripple voltage Vrpl, which imitates the coil current IL, by charging and discharging the capacitor 114 by using the first current I1, which is proportional to the input voltage Vin, and the second current I2, which is proportional to the output voltage Vout, and adds the result to the division voltage Vdiv to generate the feedback voltage Vfb.

Figure 8:
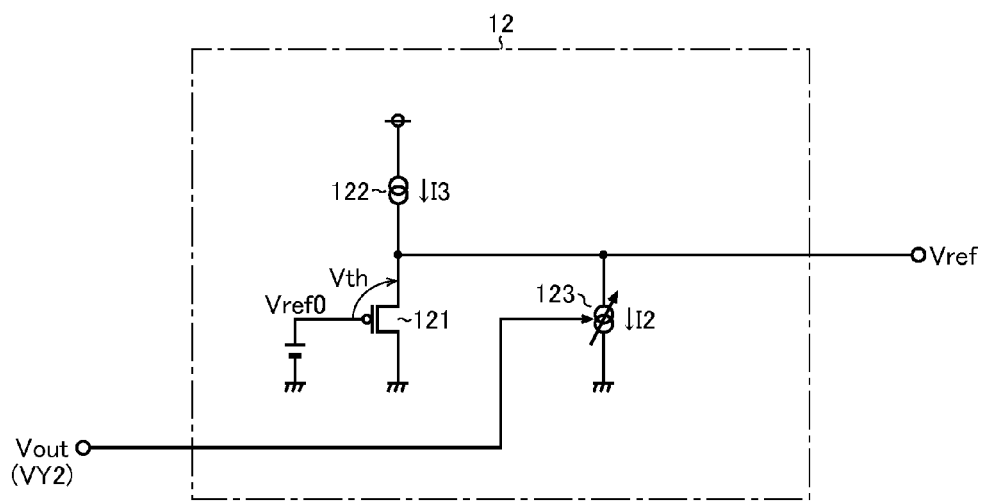
FIG. 8 is a diagram showing one configuration example of a ripple voltage generation circuit.

Reference Voltage Generation Circuit:

FIG. 8 is a diagram showing one configuration example of the reference voltage generation circuit 12. The reference voltage generation circuit 12 of this configuration example includes a P-channel MOS field-effect transistor 121 and current sources 122 and 123.

The current source 122 is connected between a supply power node and a source of the transistor 121, and generates the predetermined third current I3 (the operating current of the transistor 121, having the same value as the operating current of the transistor 115b described previously). A gate of the transistor 121 is connected to an application node of the reference voltage Vref. A drain of the transistor 121 is connected to a ground node. A source of the transistor 121 is connected to an output node of the reference voltage Vref.

The reference voltage generation circuit 12 of this configuration example functions as a source follower which outputs the reference voltage Vref (=Vref0+Vth) which is higher than a reference voltage Vref0 by the on-threshold voltage Vth of the transistor 121. Configuring the reference voltage generation circuit 12 as a source follower similar to the terminal voltage feeder 115 in this way makes it possible to cancel the on-threshold voltage Vth of the transistor 115b which is included in the feedback voltage Vfb.

Moreover, the reference voltage generation circuit 12 of this configuration example includes the current source 123 which generates the second current I2 (having the same value as that in the ripple injection circuit 11) between the output node of the reference voltage Vref and the ground node. With this configuration, it is possible to cancel the temperature dependence and power supply dependence of the current source 112 which affect the feedback voltage Vfb.

Figure 9:
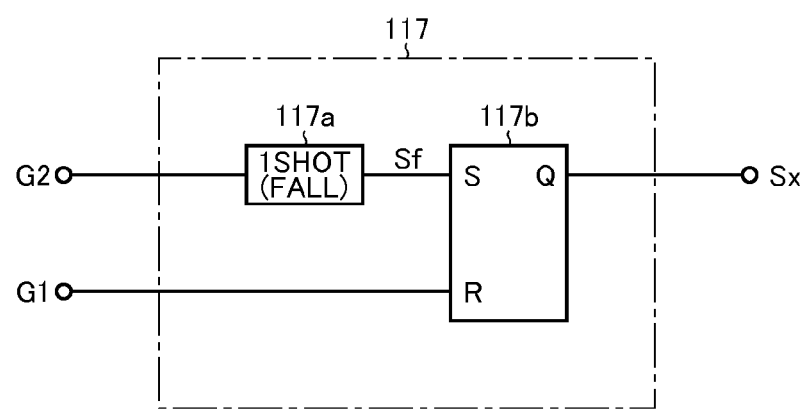
FIG. 9 is a diagram showing a first configuration example of a discharge controller.

Discharge Controller (1st Configuration Example):

FIG. 9 is a diagram showing a first configuration example of the discharge controller 117. The discharge controller 117 of the first configuration example includes a one-shot pulse generator 117a and an RS flip-flop 117b.

The one-shot pulse generator 117a generates a one-shot pulse in a fall detection signal Sf by being triggered by a trailing edge in the gate signal G2.

The RS flip-flop 117b sets the discharge control signal Sx to high level at a rising edge in the fall detection signal Sf, which is fed to a set terminal (S) of the RS flip-flop 117b, and resets the discharge control signal Sx to low level at a rising edge in the gate signal G1, which is fed to a reset terminal (R) of the RS flip-flop 117b.

That is, the discharge controller 117 of the first configuration example turns on the on-period setting circuit 16 every time the transistor N2 is turned off. With this configuration, it is possible to reset the ripple voltage Vrpl to a zero value every time before the capacitor 114 starts to be charged.

Moreover, the discharge controller 117 of the first configuration example holds the discharge switch 116 on after the transistor N2 is turned off until the transistor N1 is turned on. That is, during the dead time in switching operation (during the period in which the transistors N1 and N2 are simultaneously off), the ripple voltage Vrpl is held reset. With this configuration, it is possible to secure the discharge period of the capacitor 114 without unnecessarily prolonging the high-level period of the one-shot pulse generated in the fall detection signal Sf. This makes it possible to more reliably reset the ripple voltage Vrpl to a zero value. Moreover, with this configuration, even during the period in which the transistors N1 and N2 are simultaneously off in power-saving operation (reverse current shut-off operation) under a light load, it is possible to hold the ripple voltage Vrpl reset.

Figure 10:
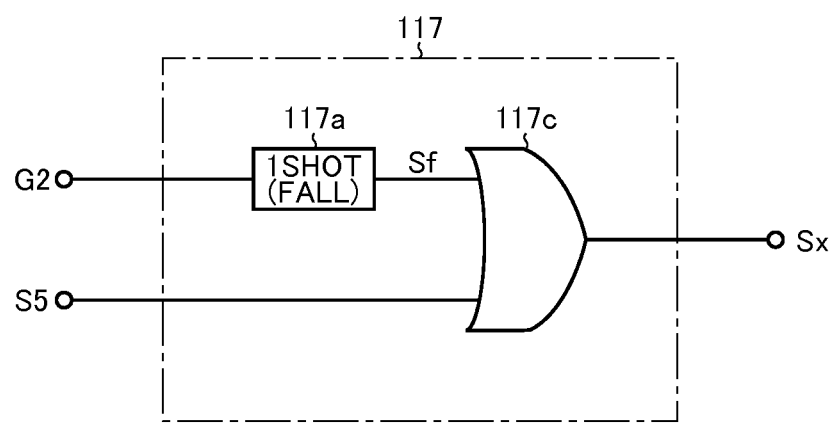
FIG. 10 is a diagram showing a second configuration example of a discharge controller.

Discharge Controller (2nd Configuration Example):

FIG. 10 is a diagram showing a second configuration example of the discharge controller 117. In the second configuration example, in place of the RS flip-flop 117b in the first configuration example, an OR gate 117c is used. The OR gate 117c outputs as the discharge control signal Sx an OR signal (logical addition signal) between the fall detection signal Sf and the reverse current detection signal S5. With this configuration, it is possible to realize largely the same operation as with the first configuration example. In a case where this configuration example is adopted, however, it is preferable that the high-level period of the one-shot pulse generated in the fall detection signal Sf be set to be sufficiently long.

Figure 11:
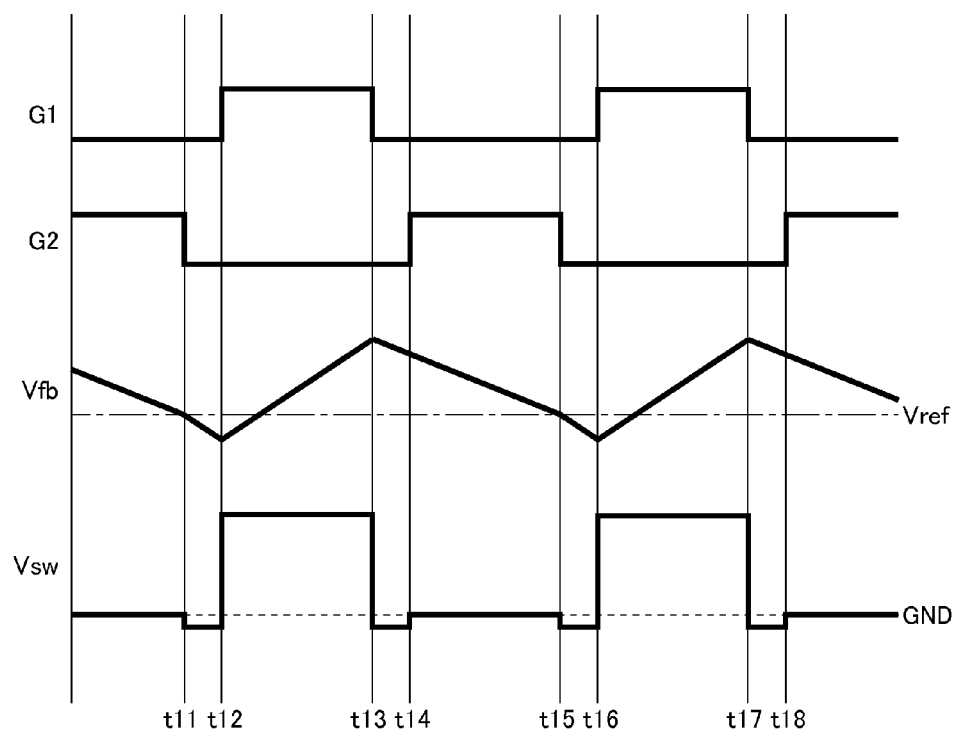
FIG. 11 is a time chart showing one example of ripple injection operation.

Ripple Injection Operation:

FIG. 11 is a time chart showing one example of a ripple injection operation (in continuous-current mode under a steady load), and depicts, from top down, the gate signals G1 and G2, the feedback voltage Vfb, and the switching voltage Vsw.

At time point t11, when the feedback voltage Vfb falls below the reference voltage Vref and the gate signal G2 is lowered to low level, the discharge switch 116 is turned on, and the capacitor 114 is discharged. As a result, the ripple voltage Vrpl is reset to a zero value, and thus the feedback voltage Vfb falls until it has the same value as the division voltage Vdiv.

At time point t12, when the gate signal G1 is raised to high level, the capacitor 114 starts to be charged by the differential current (I1−I2) mentioned previously. As a result, the ripple voltage Vrpl starts to rise, and together the feedback voltage Vfb keeps rising.

When, after time point t12, a predetermined on-period Ton elapses and then, at time point t13, the gate signal G1 is lowered to low level, the capacitor 114 starts to be discharged by the second current I2 mentioned previously. As a result, the ripple voltage Vrpl starts to fall, and together the feedback voltage Vfb keeps falling.

At time point t14, the gate signal G2 is raised to high level and then, at time point t15, the feedback voltage Vfb falls below the reference voltage Vref and the gate signal G2 is lowered to low level, the discharge switch 116 is turned on and the capacitor 114 is discharged. This operation is quite the same as that at time point t11, and in this way, after time point t15, the above-described sequence of operations is repeated.

Thus, by use of the ripple injection circuit 11 of this configuration example, it is possible to add to the feedback voltage Vfb the ripple voltage Vrpl which is reset in every cycle of switching operation, without using any discrete component that is externally fitted to the semiconductor device 10.

Figure 12:
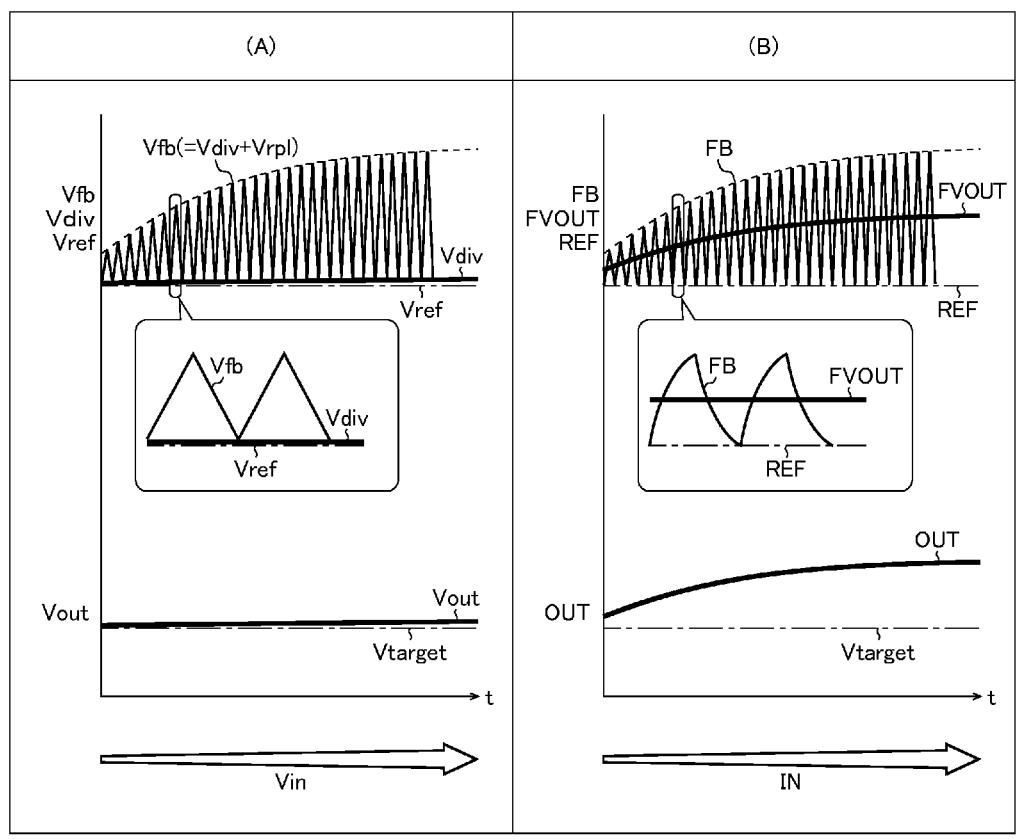
FIG. 12 shows a comparison of output behavior in response to input variation between a new and a conventional configuration.

Output Behavior in Response to Input Variation, with New and Conventional Configurations:

FIG. 12 shows a comparison of output behavior in response to input variation between a new and a conventional configuration. At (A) is shown the behavior observed with the ripple injection circuit 11 shown in FIG. 7, and at (B) is shown the behavior observed with the ripple injection circuit RPL shown in FIG. 41.

Figure 41:
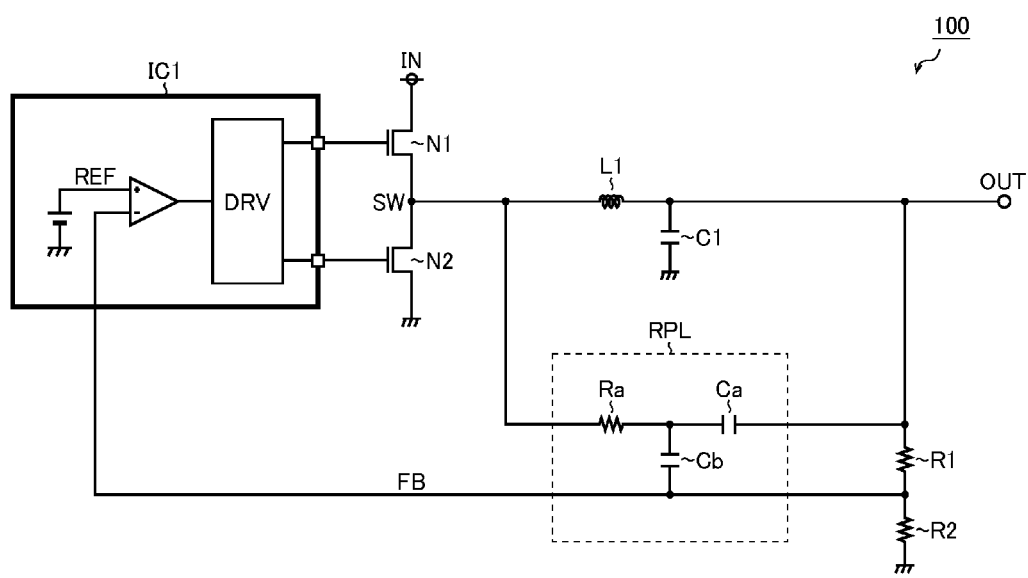
FIG. 41 is a circuit block diagram showing one conventional example of a switching power supply device.

With the ripple injection circuit RPL shown in FIG. 41, the output voltage OUT varies by following the mid-point voltage FVOUT (corresponding to one-half of the amplitude voltage of the pseudo ripple component) of the feedback voltage FB. Moreover, the pseudo ripple component contained in the feedback voltage FB increases and decreases with dependence on the input voltage IN. Accordingly, the output voltage OUT deviates from the target value Vtarget also with dependence on the input voltage IN. Preventing such degradation in output accuracy requires complicated correction operation using an operational amplifiers and the like. Moreover, generated by use of a resistor Ra and capacitors Ca and Cb, the pseudo ripple component inevitably has a blunt waveform. This makes gentle the angle at which the feedback voltage FB and the reference voltage REF cross each other, leading to degraded jitter characteristics.

By contrast, with the ripple injection circuit 11 shown in FIG. 7, the feedback voltage Vfb is a voltage which is the simple sum of the division voltage Vdiv and the ripple voltage Vrpl, and thus output feedback control is achieved such that the division voltage Vdiv, which corresponds to the bottom value of the feedback voltage Vfb, equals to the reference voltage Vref. That is, the output voltage Vout is controlled to be constantly equal to the desired target value Vtarget without depending on the magnitude of the pseudo ripple component, and thus there is no need at all for complicated correction operation. Moreover, the ripple voltage Vrpl generated by use of the first and second currents I1 and I2 is less prone to have a blunt waveform. This makes steep the angle at which the feedback voltage FB and the reference voltage REF cross each other, leading to improved jitter characteristics.

Figure 13:
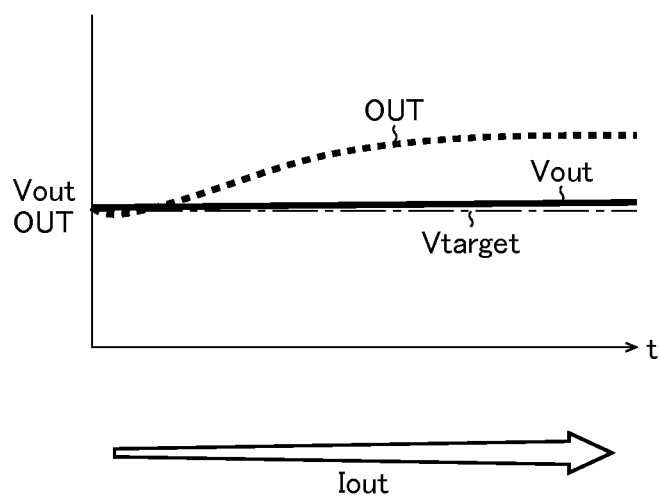
FIG. 13 shows a comparison of output behavior in response to load variation between a new and a conventional configuration.

Output Behavior in Response to Load Variation, with New and Conventional Configurations:

FIG. 13 shows a comparison of output behavior in response to load variation between a new and a conventional configuration. With the ripple injection circuit RPL shown in FIG. 41, the lighter the load is, the lower the output voltage OUT becomes (as indicated by a broken line in FIG. 13). Thus, depending on the target value Vtarget, the output voltage OUT may become insufficient under a light load.

By contrast, with the ripple injection circuit 11 shown in FIG. 7, the output voltage Vout is controlled to be constantly equal to the target value Vtarget, and thus there is no danger of the output voltage Vout becoming insufficient under a light load.

Figure 14:
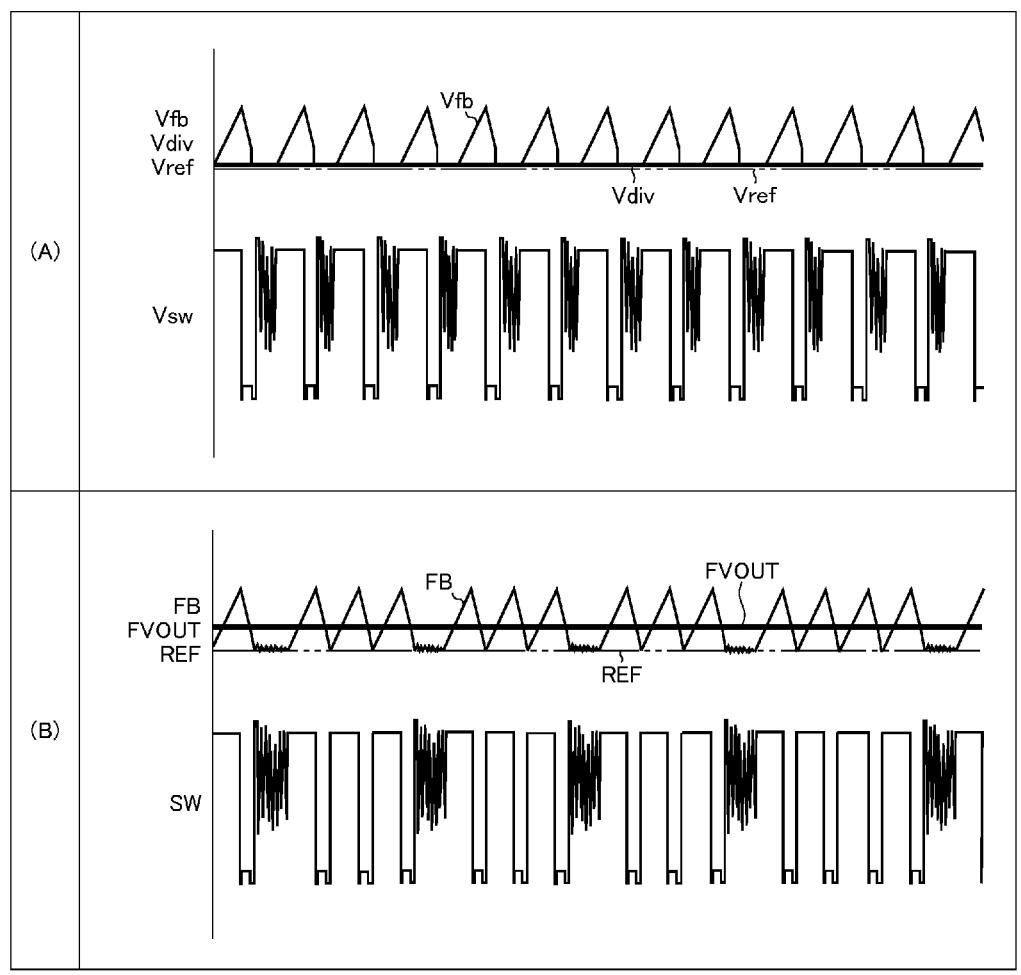
FIG. 14 shows a comparison of behavior during transition from a light load to a heavy load between a new and a conventional configuration.

Behavior of Transition from a Light Load to a Heavy Load, with New and Conventional Configurations:

FIG. 14 shows a comparison of behavior during transition from a light load to a heavy load between a new and a conventional configuration. At (A) is shown the behavior observed with the ripple injection circuit 11 shown in FIG. 7, and at (B) is shown the behavior observed with the ripple injection circuit RPL shown in FIG. 41.

With the ripple injection circuit RPL shown in FIG. 41, during transition from a light load to a heavy load, the continuous-current mode and the discontinuous-current mode are repeated irregularly, and thus the output voltage OUT comes to have an increased ripple component and hence a disturbed waveform. For example, at (B) in FIG. 14, pulse generation proceeds in two to three continuous cycles in continuous-current mode, followed by only one, but comparatively long, cycle in discontinuous-current mode (simultaneous turning-off of the transistors N1 and N2 due to reverse current detection), and similar sequences are repeated. Such sequences result from a pseudo ripple component being contained in the feedback voltage FB even under a light load where no ripple injection operation is needed, and hence the feedback voltage FB not correctly representing the output voltage OUT.

By contrast, with the ripple injection circuit 11 shown in FIG. 7, in discontinuous-current mode, the ripple voltage Vrpl is reset to a zero value, and thus ripple injection operation is stopped automatically. As a result, no irregular repetition of the continuous-current and discontinuous-current modes occurs during transition from a light load to a heavy load. For example, at (A) in FIG. 14, the discontinuous-current mode occurs in every cycle, with one-half to one-third of the length of the discontinuous-current mode at (B). That is, at (A) in FIG. 14, the discontinuous-current mode, which occurs once in two or three cycles at (B), is distributed evenly to each cycle. Incidentally, at (A), the heavier the load is, the shorter the discontinuous-current mode becomes, and when the load is sufficiently heavy, switching to the continuous-current mode occurs in every cycle. With this operation, it is possible to achieve smooth transition from a light load to a heavy load.

Figure 15:
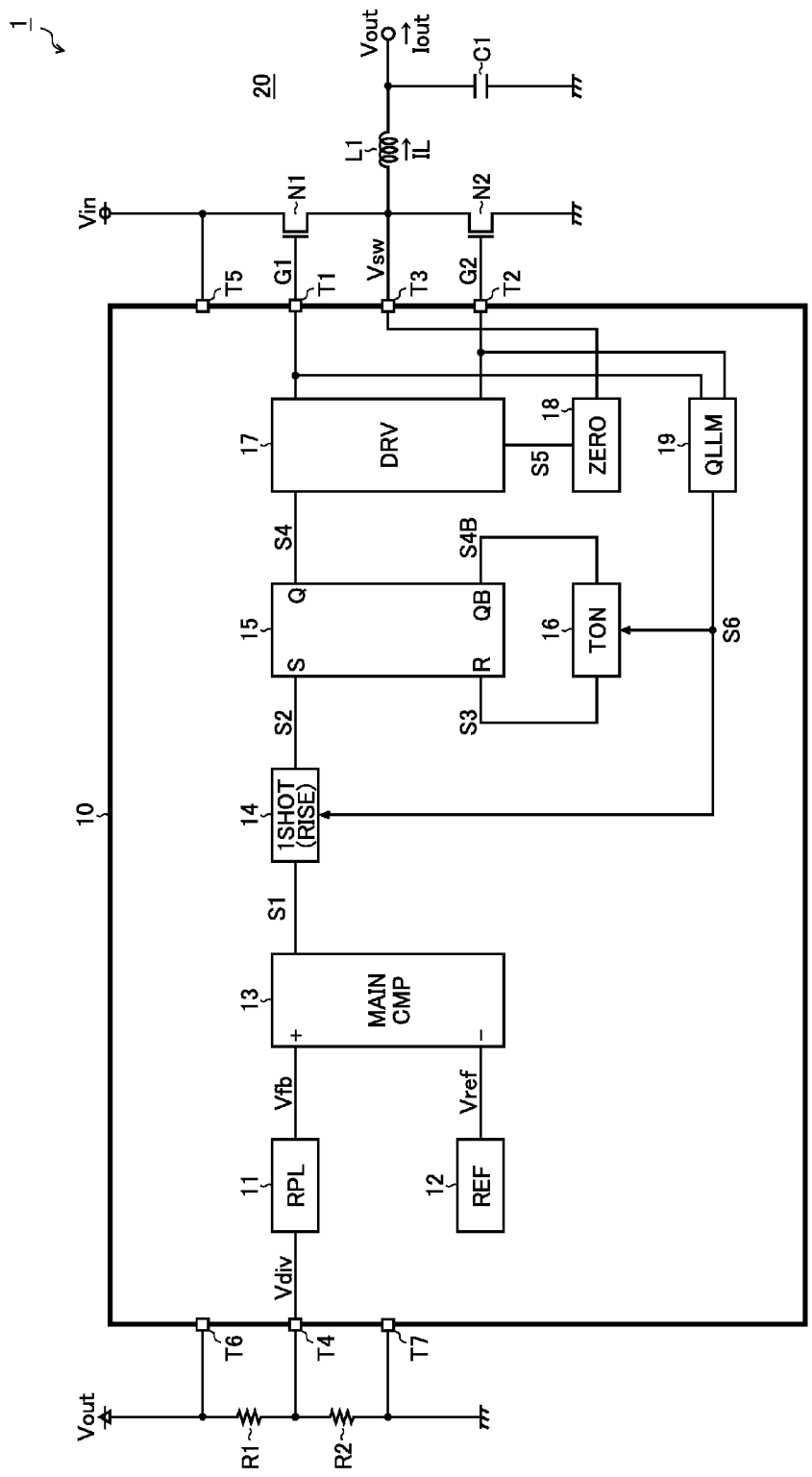
FIG. 15 is a block diagram showing a switching power supply device according to a second embodiment of the present invention.

Quieting Function:

FIG. 15 is a block diagram showing a switching power supply device according to a second embodiment of the present invention (one configuration example of a semiconductor device 10 provided with a quieting function). The semiconductor device 10 of this configuration example includes, in addition to the circuit blocks 11 to 18 shown in FIG. 1, a quieting (QLLM, quiet light load mode) circuit 19. Accordingly, such components and elements as are similar to those described previously are identified by common reference signs, and no overlapping description will be repeated. The following description focuses on the configuration and operation of the quieting circuit 19.

The quieting circuit 19 is a circuit block which suppresses audible noise by keeping the switching frequency Fsw under a light load above the human audible frequency range (e.g., 30 kHz and above), and generates a quieting signal S6 by monitoring the gate signals G1 and G2. The quieting signal S6 basically behaves as follows: when, after an on-timing of the transistor N1 (a rising edge in the gate signal G1), a predetermined threshold time Tth (e.g., 33 μs) elapses without the next on-timing coming, the quieting signal S6 turns to high level; at an off-timing of the transistor N2 (a trailing edge in the gate signal G2), the quieting signal S6 turns to low level.

The one-shot pulse generation circuit 14 receives the comparison signal S1 and the quieting signal S6, and generates a one-shot pulse in the set signal S2 by being triggered by a rising edge in either of the comparison signal S1 and the quieting signal S6. Accordingly, even if the comparison signal S1 does not rise to high level, if the quieting signal S6 rises to high level, the output signal S4 is set to high level, and this turns the transistor N1 on. That is, the quieting signal S6 functions as a forcible on signal for forcibly turning on the transistor N1 regardless of the comparison signal S1.

With this configuration, it is possible to keep the switching frequency Fsw under a light load above the human audible frequency range without unnecessarily discharging the capacitor C1, and thus to achieve higher efficiency than ever in quiet operation.

However, forcibly turning on the transistor N1 without the comparison signal S1 having risen to high level (without the feedback voltage Vfb having fallen below the reference voltage Vref) may result in an unnecessary rise in the output voltage Vout.

To prevent that, the on-period setting circuit 16 receives the quieting signal S6, and is provided with a function whereby, when the transistor N1 is forcibly turned on by the quieting circuit 19, the on-period Ton is made the shorter the higher the output voltage OUT is, so as to suppress a rise in the output voltage Vout.

With this configuration, it is possible to stabilize the output voltage Vout within a range of about +1 to 2% of the target value Vtarget, and thereby to prevent an overvoltage exceeding it.

Figure 16:
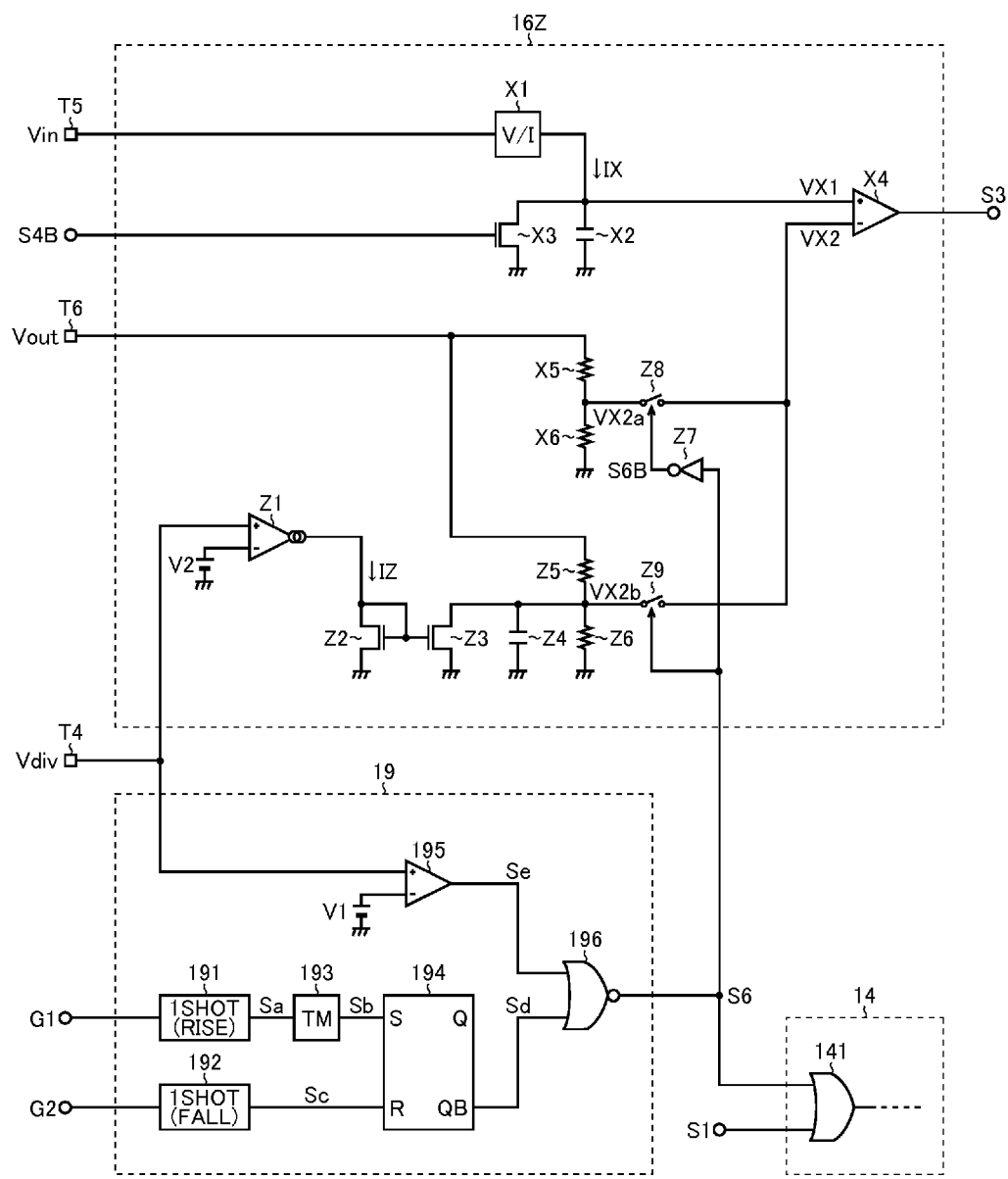
FIG. 16 is a circuit diagram showing one configuration example of a quieting circuit and an on-time setting circuit.

FIG. 16 is a circuit diagram showing one configuration example of the quieting circuit 19 and a third configuration example of the on-period setting circuit 16. The quieting circuit 19 of this configuration example includes one-shot pulse generators 191 and 192, a timer 193, an RS flip-flop 194, a comparator 195, and a NOR gate 196.

The one-shot pulse generator 191 generates a one-shot pulse in a signal Sa by being triggered by a rising edge in the gate signal G1.

The one-shot pulse generator 192 generates a one-shot pulse in a signal Sc by being triggered by a trailing edge in the gate signal G2.

The timer 193 starts to count the threshold time Tth in response to a one-shot pulse in the signal Sa, and generates a one-shot pulse in a signal Sb on completing the counting of the threshold time Tth. That is, the timer 193 generates a signal Sb delayed from the signal Sa by the threshold time Tth. The counting of the threshold time Tth is reset every time a one-shot pulse appears in the signal Sa. Accordingly, so long as the interval at which one-shot pulses are generated in the signal Sa is shorter than the threshold time Tth, no one-shot pulse is generated in the signal Sb. The timer 193 may be an analog timer or a digital timer.

The RS flip-flop 194 sets a signal Sd (inverted output signal) to low level at a rising edge in the signal Sb, which is fed to a set terminal (S) of the RS flip-flop 194, and resets the signal Sd to high level at a rising edge in the signal Sc, which is fed to a reset terminal (R) of the RS flip-flop 194. Thus, the signal Sd turns to low level when, after an on-timing of the transistor N1 (a rising edge in the gate signal G1), the threshold time Tth elapses without the next on-timing coming, and turns to high level at an off-timing of the transistor N2 (a trailing edge in the gate signal G2).

The comparator 195 generates a signal Se by comparing the division voltage Vdiv, which is fed to a non-inverting input terminal (+) of the comparator 195, with a threshold voltage V1 (corresponding to the upper limit value of the output voltage Vout), which is fed to an inverting input terminal (−) of the comparator 195. The signal Se is at high level when the division voltage Vdiv is higher than the threshold voltage V1, and is at low level when the division voltage Vdiv is lower than the threshold voltage V1.

The NOR gate 196 generates the quieting signal S6 by performing a NOR operation (negative logical addition) between the signals Sd and Se. The quieting signal Sd is at low level when at least one of the signals Sd and Se is at high level, and is at high level when the signals Sd and Se are both at low level. That is, when the signal Se is at low level (the logic level indicating that no overvoltage is being detected), the logically inverted signal of the signal Sd is output as the quieting signal S6. On the other hand, when the signal Se is at high level (the logic level indicating that an overvoltage is being detected), the quieting signal S6 is constantly at low level irrespective of the logic level of the signal Sd. Accordingly, while the division voltage Vdiv is higher than the threshold voltage V1, the forcible turning-on of the transistor N1 is suspended.

For example, in a completely no-load state (Iout=0 A), no matter how short the on-period Ton of the transistor N1 may be made, the forcible turning-on of the transistor N1 is repeated, and the output voltage Vout is brought into an overvoltage state, causing the division voltage Vdiv to exceed the threshold voltage V1. In this state, the high-level signal Se masks the signal Sd, and the forcible turning-on of the transistor N1 is suspended; thus, the output voltage Vout is brought out of the overvoltage state.

The quieting signal S6 is fed, along with the comparison signal S1, to the one-shot pulse generation circuit 14. The one-shot pulse generation circuit 14 can be configured to include, in its input stage, an OR gate 141 so as to generate a one-shot pulse in the set signal S2 by being triggered by a rising edge in either of the comparison signal S1 and the quieting signal S6.

The on-period setting circuit 16Z of the third configuration example is based on the on-period setting circuit 16X of the first configuration example (see FIG. 2), and includes, as components of the second voltage generation circuit, not only the resistors X5 and X6 but also a current output amplifier Z1, N-channel MOS field-effect transistors Z2 and Z3, a capacitor Z4, resistors Z5 and Z6, an inverter Z7, and switches Z8 and Z9. Accordingly, such components and elements as find their counterparts in the first configuration example are identified by the same reference signs as in FIG. 2, and no overlapping description will be repeated. The second voltage generation circuit will be described below in detail with focus placed on the additional components Z1 to Z9.

A first terminal of the resistor X5 is connected to the external terminal T6, to which the output voltage Vout is applied. A second terminal of the resistor X5 is connected to a first terminal of the resistor X6. A second terminal of the resistor X6 is connected to a ground node. Connected in this way, the resistors X5 and X6 function as a first resistor ladder which divides the output voltage Vout to output a first division voltage VX2a from the connection node between them. Thus, the higher the output voltage Vout is, the higher the first division voltage VX2a is.

A first terminal of the resistor Z5 is connected to the external terminal T6, to which the output voltage Vout is applied. A second terminal of the resistor Z5 is connected to a first terminal of the resistor Z6 and to a first terminal of the capacitor Z4. Second terminals of the resistor Z6 and the capacitor Z4 are both connected to the ground node. Connected in this way, the resistors Z5 and Z6 function as a second resistor ladder which divides the output voltage Vout to output a second division voltage VX2b from the connection node between them.

The current output amplifier Z1 (a gm amplifier, or a transconductance amplifier) generates an offset current IZ commensurate with the difference between the division voltage Vdiv, which is fed to a non-inverting input terminal (+) of the current output amplifier Z1, and a reference voltage V2 (<V1), which is fed to an inverting input terminal (−) of the current output amplifier Z1. Thus, the higher the division voltage Vdiv (and hence the output voltage Vout) is, the higher the offset current IZ is.

A drain of the transistor Z2 is connected to an output terminal of the current output amplifier Z1. Gates of the transistors Z2 and Z3 are both connected to the drain of the transistor Z2. Sources of the transistors Z2 and Z3 are both connected to the ground node. A drain of the transistor Z3 is connected to the connection node between the resistors Z5 and Z6 (an output node of the second division voltage VX2b). Connected in this way, the transistors Z2 and Z3 function as a current mirror which lowers the second division voltage VX2b by the voltage drop across the resistor Z5 (=IZ×Z5) by passing the offset current IZ through the resistor Z5 in the second resistor ladder. Accordingly, the higher the offset current IZ (and hence the output voltage Vout) is, the more the second division voltage VX2b is lowered.

The switch Z8 is connected between an application node of the first division voltage VX2a and the inverting input terminal (−) of the comparator X4 (an application node of the second voltage VX2), and is turned on and off according to an inverted quieting signal S6B (the logically inverted signal of the quieting signal S6). The switch Z8 is on when the quieting circuit 19 is not in operation (S6B=H), and is off when the quieting circuit 19 is in operation (S6B=L). On the other hand, the switch Z9 is connected between an application node of the second division voltage VX2b and the inverting input terminal (−) of the comparator X4 (the application node of the second voltage VX2), and is turned on and off according to the quieting signal S6. The switch Z9 is off when the quieting circuit 19 is not in operation (S6=L), and is on when the quieting circuit 19 is in operation (S6=H). Connected as described above, the inverter Z7 and the switches Z8 and Z9 function as a selector which selects the first division voltage VX2a as the second voltage VX2 when the quieting circuit 19 is not operating (S6=L, S6B=H) and which selects the second division voltage VX2b as the second voltage VX2 when the quieting circuit 19 is operating (S6=H, S6B=L).

Configured as described above, the second voltage generation circuit operates in the following manner: when the quieting circuit 19 is not operating (S6=L, S6B=H), it selectively outputs the first division voltage VX2a and thus operates to generate the same second voltage VX2 as in the first configuration example (FIG. 2); when the quieting circuit 19 is operating (S6=H, S6B=L), it selectively outputs the second division voltage VX2b and thus operates to lower the second voltage VX2 the more the higher the output voltage Vout is.

Figure 17:
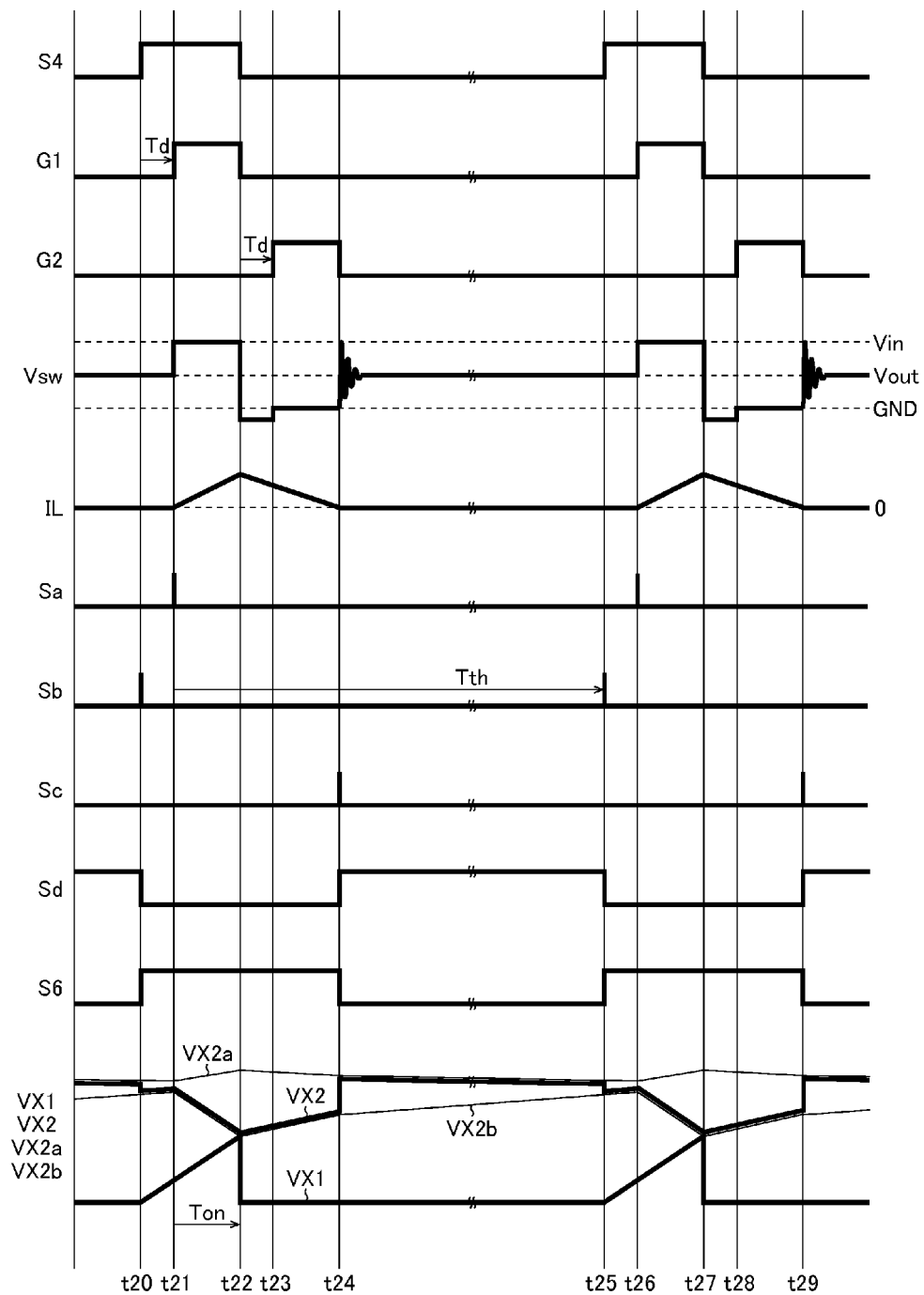
FIG. 17 is a time chart showing one example of quiet operation.

FIG. 17 is a time chart showing one example of quiet operation, and depicts, from top down, the output signal S4, the gate signals G1 and G2, the switching voltage Vsw, the coil current IL, the signals Sa to Sd, and the quieting signal S6, along with interval voltages within the on-period setting circuit 16Z (the first voltage VX1, the second voltage VX2, the first division voltage VX2a, and the second division voltage VX2b). FIG. 17 presupposes that the comparison signal S1 and the signal Se remain at low level all the time.

Before time point t20, due to power-saving operation (reverse current shut-off operation) under a light load, the gate signals G1 and G2 are both at low level, and the transistors N1 and N2 are simultaneously off.

At time point t20, a one-shot pulse is generated in the signal Sb, and the signal Sd is set to low level; this raises the quieting signal S6 to high level. As a result, a one-shot pulse is generated in the set signal S2 (unillustrated), and thus the output signal S4 is set to high level. Incidentally, when the output signal S4 rises to high level, the first voltage VX1 starts to rise. On the other hand, when the quieting signal S6 rises to high level, the second voltage VX2 is switched from the first division voltage VX2a to the second division voltage VX2b.

When, after time point t20, a predetermined simultaneously-off period Td elapses, at time point t21, the gate signal G1 rises to high level. As a result, the transistor N1 turns on; this causes the switching voltage Vsw to rise up to approximately the input voltage Vin, and the coil current IL starts to increase. Now, as the output voltage Vout (unillustrated) rises, the second voltage VX2 (=VX2b) falls. Moreover, when the gate signal G1 rises to high level, a one-shot pulse is generated in the signal Sa, and thus the threshold time Tth starts to be counted.

At time point t22, when the first voltage VX1 becomes higher than the second voltage VX2 (=VX2b), the reset signal S3 (unillustrated) rises to high level; thus, the output signal S4 is reset to low level, and the gate signal G1 falls to low level. As a result, the transistors N1 and N2 are brought into a simultaneously-off state; thus, the switching voltage Vsw falls down to a negative voltage (=GND−Vf, where Vf represents the forward voltage drop across the parasitic diode accompanying the transistor N2), and the coil current IL starts to decrease.

The period between time points t21 and t22 corresponds to the on-period Ton of the transistor N1. As mentioned previously, the higher the output voltage Vout is, the more the second voltage VX2 (=VX2b) is lowered, and the earlier the first voltage VX1 and the second voltage VX2 (=VX2b) cross each other. That is, the higher the output voltage Vout is, the shorter the on-period Ton of the transistor N1 is made. In this way, it is possible to appropriately suppress a rise in the output voltage Vout resulting from the forcible turning-on of the transistor N1.

When, after the time point t22, a predetermined simultaneously-off period Td elapses, at time point t23, the gate signal G2 rises to high level. As a result, the transistor N2 turns on; thus, the switching output stage 20 switches from diode rectification to synchronous rectification, and the switching voltage Vsw rises up to approximately 0 V (=GND−IL×RON).

At time point T24, when the coil current IL falls below a zero value, and a reverse current toward the transistor N2 occurs, switching the polarity of the switching voltage Vsw from negative to positive, the reverse current detection signal S5 rises to high level, and thus the gate signal G2 falls to low level. As a result, the transistors N1 and N2 are brought into a simultaneously-off state, and thus the switching voltage Vsw stabilizes at approximately the output voltage Vout after going through a resonant state. Moreover, when the gate signal G2 falls to low level, a one-shot pulse is generated in the signal Sc; thus the signal Sd is reset to high level, and the quieting signal S6 falls to low level. As a result, the second voltage VX2 is switched from the second division voltage VX2b to the first division voltage VX2a.

Thereafter, when the counting of the threshold time Tth is completed without a high-level timing of the gate signal G1 coming, then at time point t25, a one-shot pulse is generated in the signal Sb. What occurs now is the same as what occurred at time point t20, and after time point t25, so long as a light-load condition continues, the quiet operation described above is repeated.

With the quiet operation described above, it is possible to keep the switching frequency Fsw under a light load above the human audible frequency range while keeping the output voltage Vout close to the target value Vtarget without unnecessarily discharging the capacitor C1, and thus it is possible to achieve higher efficiency than ever in quiet operation. Moreover, as distinct from the conventional method involving the forcible turning-on of the transistor N2, the transistor N1 is not held on continuously throughout a plurality of cycles. Thus, still better efficiency can be expected.

Figure 18:
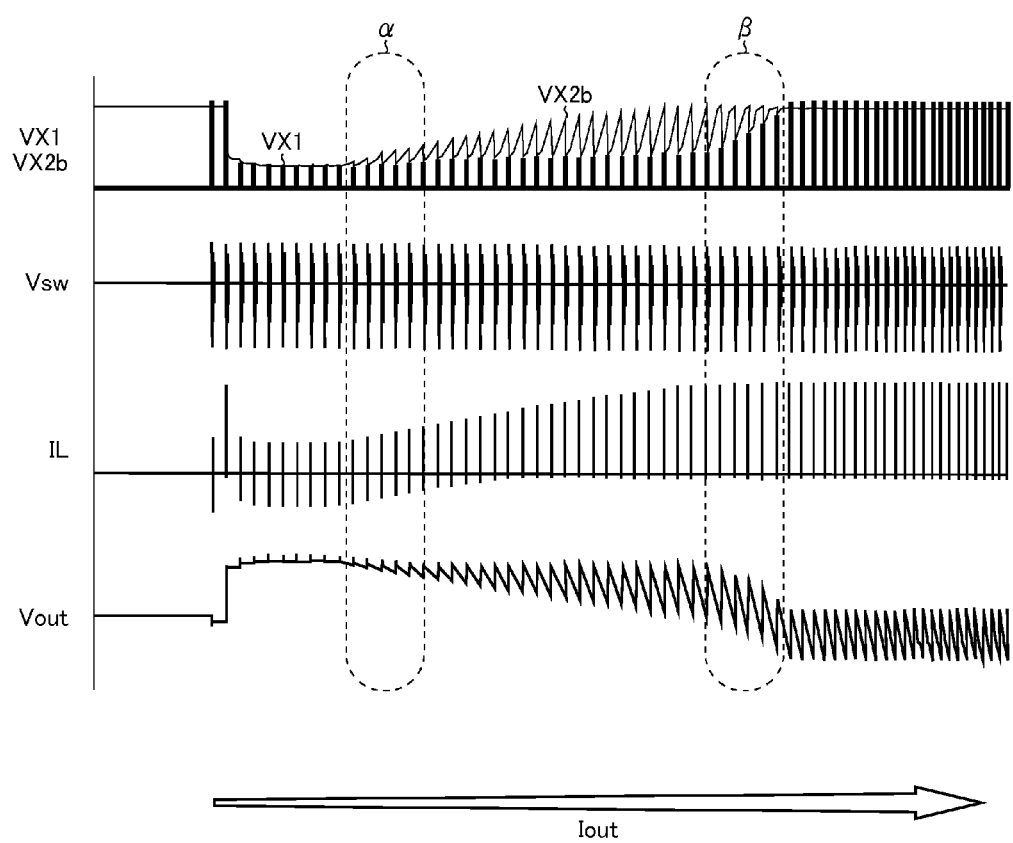
FIG. 18 is a time chart showing one example of quiet operation under a gradually increasing load.
Figure 19:
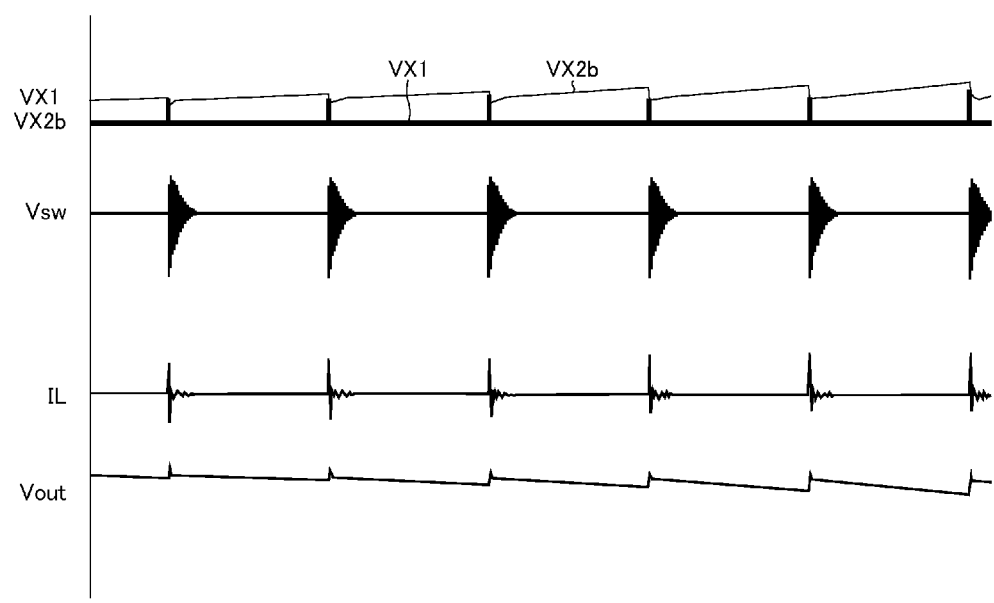
FIG. 19 is an enlarged view of broken-line region α.
Figure 20:
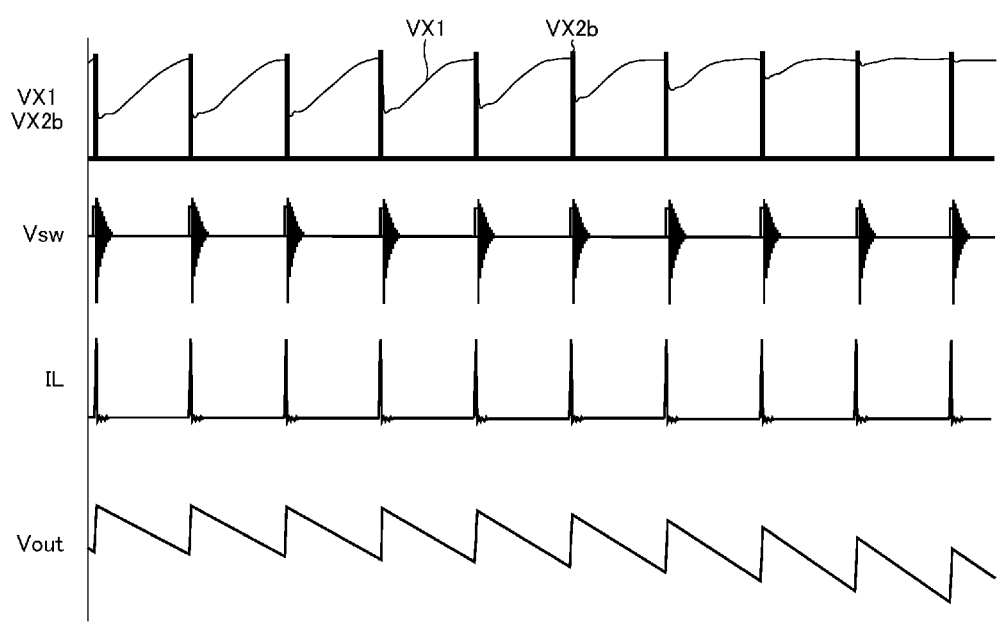
FIG. 20 is an enlarged view of broken-line region β.

FIG. 18 is a time chart showing one example of quiet operation under a gradually increasing load, and depicts, from top down, the first voltage VX1, the second division voltage VX2b, the switching voltage Vsw, the coil current IL, and the output voltage Vout. FIGS. 19 and 20 are enlarged views of regions α and β, respectively, indicated by broken lines in FIG. 18.

Under a light load, where the output current Iout is low, with a view to suppressing a rise in the output voltage Vout, the second division voltage VX2b is lowered greatly to shorten the on-period Ton. On the other hand, as the output current Iout increases and the rate of increase of the output voltage Vout decreases, the rate of decrease of the second division voltage VX2b decreases, and the on-period Ton gradually comes to have its ordinary length.

As for the timing with which, as the output current Iout increases, the switching cycle of the transistor N1 becomes shorter than the threshold time Tth (the timing with which the main comparator 13 starts to respond in an ordinary manner) and the timing with which the overvoltage state of the output voltage Vout is so alleviated that the ordinary on-period Ton is restored (the timing with which the second division voltage VX2b stops being lowered), it is preferable that the two be coincident or the latter be earlier than the former.

Figure 21:
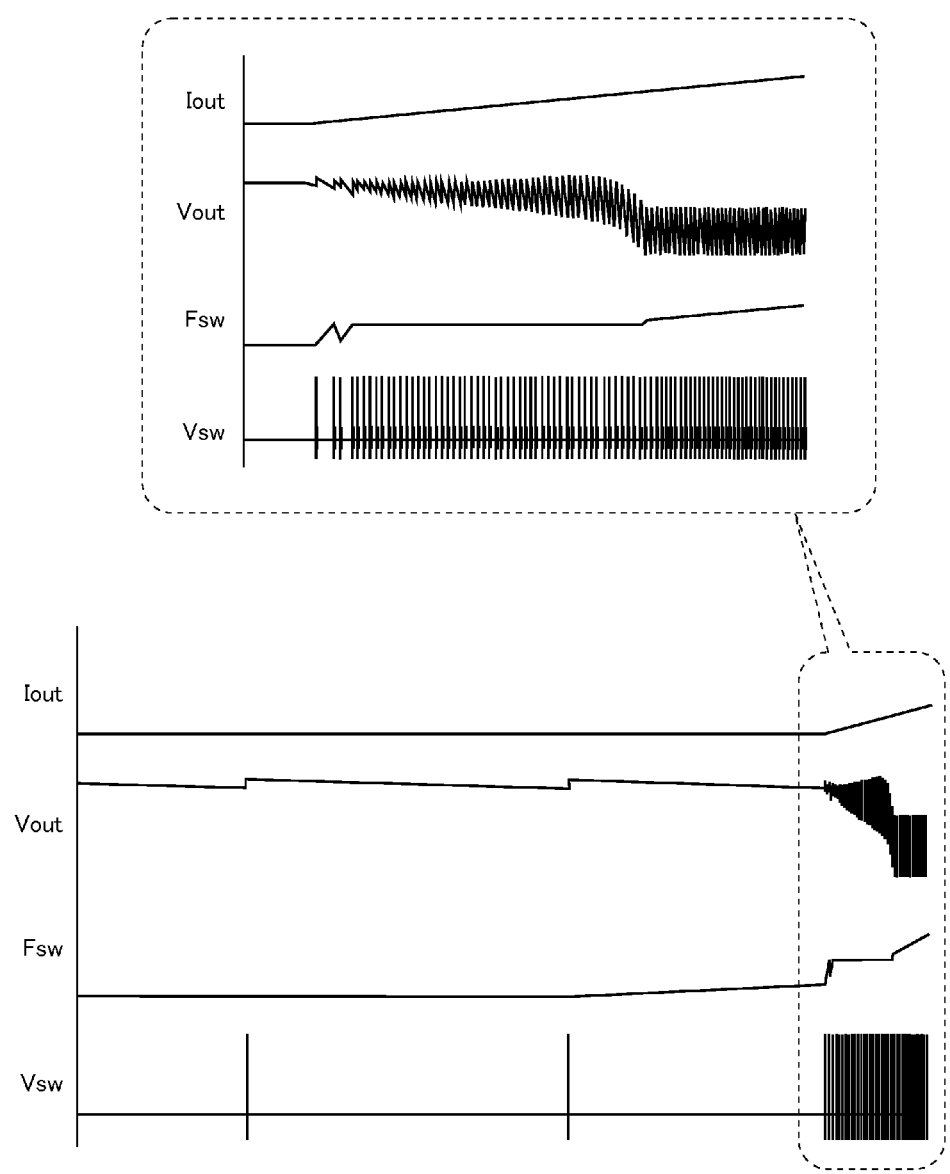
FIG. 21 is a time chart showing an example of cancellation of suspension of quiet operation.

FIG. 21 is a time chart showing an example of cancellation of suspension of quiet operation, and depicts, from top down, the output current Iout, the output voltage Vout, the switching frequency Fsw, and the switching voltage Vsw.

As mentioned previously, in a completely no-load state (Iout=0 A), no matter how short the on-period Ton of the transistor N1 may be made, the forcible turning-on of the transistor N1 is repeated, and the output voltage Vout is brought into an overvoltage state. Thus, the signal Se (unillustrated) generated by the comparator 195 rises to high level, and the quiet operation described above (the forcible turning-on of the transistor N1) is suspended.

However, when the output current Iout starts to increase, and the output voltage Vout is brought out of the overvoltage state, the suspension of quiet operation is canceled with no delay, and the switching frequency Fsw is kept above the human audible frequency range.

Figure 22:
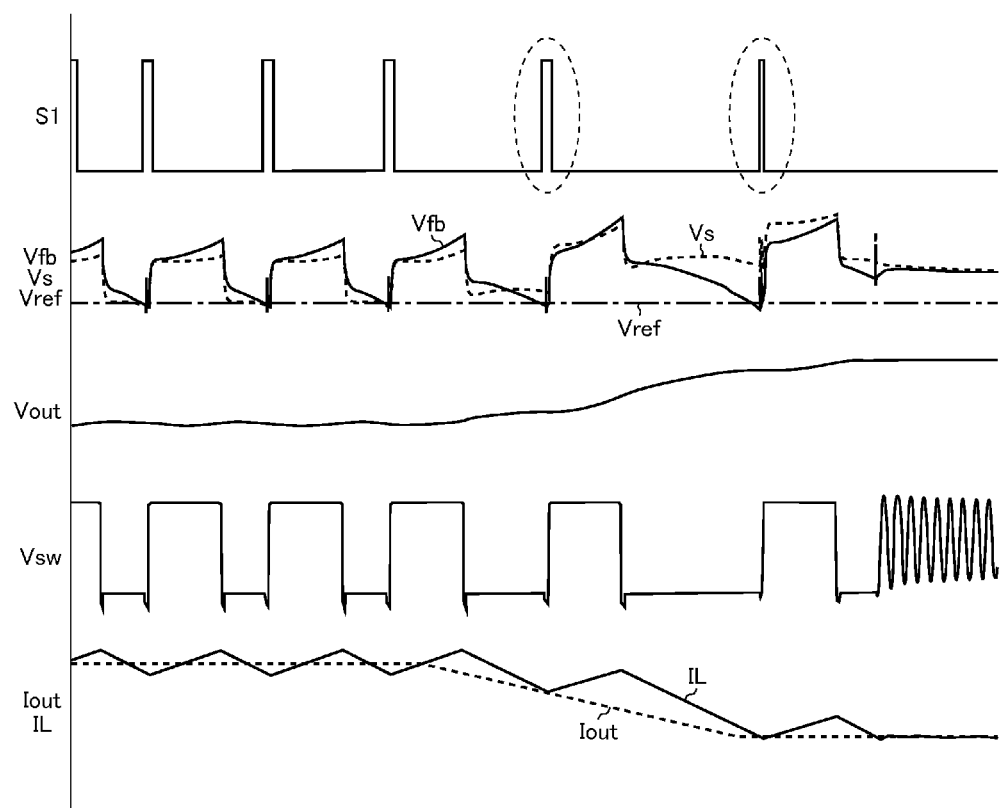
FIG. 22 is a time chart illustrating the principle by which an overshot occurs.

Overshoot in Response to a Sharp Fall in Load:

FIG. 22 is a time chart illustrating the principle by which an overshot occurs in the output voltage Vout in response to a sharp fall in load (e.g., −7 A at 2.5 A/µs), and depicts, from top below, the comparison signal S1, the feedback voltage Vfb. the source voltage Vs, the reference voltage Vref, the output voltage Vout, the switching voltage Vsw, the output current Iout, and the coil current IL.

When the output current Iout falls sharply, a surplus coil current IL raises the output voltage Vout. Especially in a case where the ripple injection circuit 11 shown in FIG. 7 is adopted, its ripple generation operation may promote an overshoot in the output voltage Vout. The reason will be described below with reference to FIG. 7 where necessary.

Under a steady load, the off-period Toff of the transistor N1 (the low-level period of the gate signal G1) is sufficiently short, and thus the discharging of the capacitor 114 by the second current I2 does not continue until the ripple voltage Vrpl becomes negative. Accordingly, after the transistor N1 is turned on and the ripple voltage Vrpl is reset to a zero value, until the transistor N1 is turned on again in the next cycle, the ripple voltage Vrpl is kept positive all the time. Thus, the feedback voltage Vfb is kept higher than the source voltage Vs (corresponding to the division voltage Vdiv before ripple injection) all the while.

On the other hand, when the load falls sharply, the off-period Toff of the output transistor N1 becomes long, and it can occur that the discharging of the capacitor 114 by the second current I2 continues until the ripple voltage Vrpl becomes negative. In this condition, the feedback voltage Vfb becomes lower than the source voltage Vs; thus, the feedback voltage Vfb falls below the reference voltage Vref earlier than it ordinarily does, and the comparison signal S1 rises to high level. As a result, the transistor N1 is unnecessarily turned on (see broken-line ellipses in FIG. 22), and the coil L1 is charged with energy again. Thus, an overshoot in the output voltage Vout is promoted.

Figure 23:
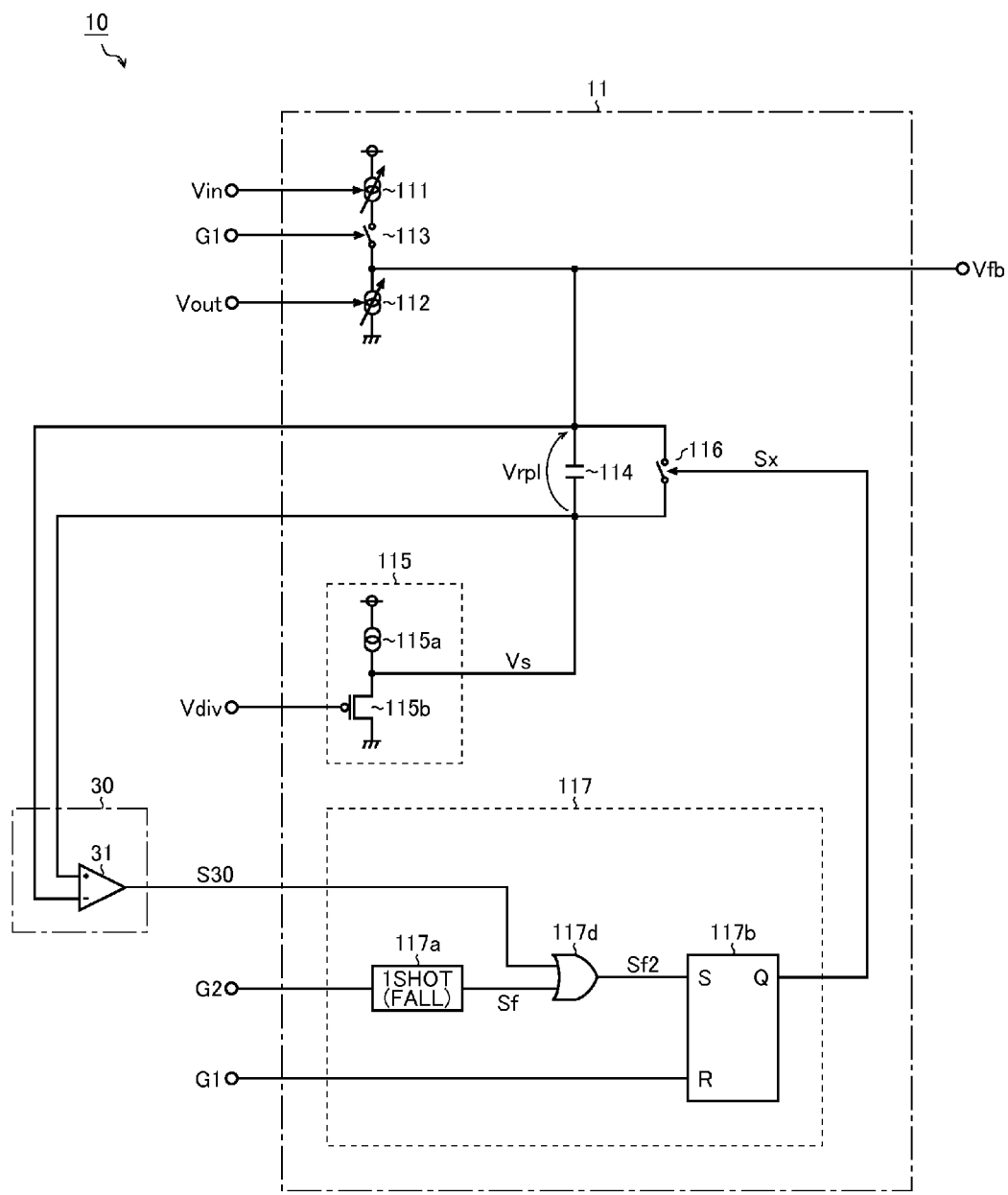
FIG. 23 is a diagram showing one configuration example of an overshoot suppression circuit.

Overshoot Suppression Circuit:

FIG. 23 is a diagram showing one configuration example of an overshoot suppression circuit 30. The overshoot suppression circuit 30 of this configuration example includes a cross comparator 31, and suppresses an overshoot in the output voltage Vout by monitoring the polarity reversal timing (positive-negative reversal timing) of the ripple voltage Vrpl.

The cross comparator 31 generates a polarity reversal detection signal S30 by comparing the feedback voltage Vfb (corresponding to the positive terminal voltage of the capacitor 114), which is fed to an inverting input terminal (−) of the cross comparator 31, with the source voltage Vs (corresponding to the negative terminal voltage of the capacitor 114), which is fed to the non-inverting input terminal (+) of the cross comparator 31. The polarity reversal detection signal S30 is at low level when the feedback voltage Vfb is higher than the source voltage Vs, and is at high level when the feedback voltage Vfb is lower than the source voltage Vs. That is, the polarity reversal detection signal S30 is at low level when the ripple voltage Vrpl is positive, and is at high level when the ripple voltage Vrpl is negative.

Thus, the overshoot suppression circuit 30 of this configuration example raises the polarity reversal detection signal S30 to high level to activate the overshoot suppression function when the switching cycle of the transistor N1 is not completed before a polarity reversal timing of the ripple voltage Vrpl comes, in other words, when, at the time point that the ripple voltage Vrpl turns from positive to negative, the on-timing of the transistor N1 in the next cycle has not yet come.

The discharge controller 117 includes, in addition to its components shown in FIG. 9, an OR gate 117d. The OR gate 117d generates an OR signal (logical addition signal) Sf2 between the fall detection signal Sf fed from the one-shot pulse generator 117a and the polarity reversal detection signal S30 fed from the overshoot suppression circuit 30, and outputs the OR signal Sf2 to a set terminal (S) of the RS flip-flop 117b.

The OR signal Sf2 is at high level when at least one of the fall detection signal Sf and the polarity reversal detection signal S30 is at high level, and is at low level when the fall detection signal Sf and the polarity reversal detection signal S30 are both at low level.

Accordingly, when, due to a sharp fall in load, the discharging of the capacitor 114 continues until the ripple voltage Vrpl turns from positive to negative and the polarity reversal detection signal S30 rises to high level, the OR signal Sf2 rises to high level. As a result, the discharge control signal Sx is set to high level without waiting for a one-shot pulse in the fall detection signal Sf; thus, the discharge switch 116 is turned on, and the ripple voltage Vrpl is reset.

As described above, the discharge controller 117 receives the polarity reversal detection signal S30, and resets the ripple voltage Vrpl to a zero value by turning on the discharge switch 116 not only at an off-timing of the transistor N2 but also when the ripple voltage Vrpl turns from positive to negative.

With the configuration described above, even when the load falls sharply, the ripple voltage Vrpl does not turn negative, and thus it does not occur that the feedback voltage Vfb falls below the reference voltage Vref earlier than it should. Thus, the output transistor N1 is prevented from being turned on unnecessarily. In this way, it is possible to suppress an overshoot in the output voltage Vout, and hence to further reduce the capacitance of the capacitor C1.

For accurate detection of the polarity reversal timing of the ripple voltage Vrpl, it is preferable that the offset of the cross comparator 31 be reduced by trimming. Moreover, to prevent the spike noise occurring on resetting the ripple voltage Vrpl from transferring to the feedback voltage Vfb, it is preferable to use, as the discharge switch 116 for short-circuiting across the terminals of the capacitor 114, an analog switch as used in switched capacitors and the like.

Figure 24:
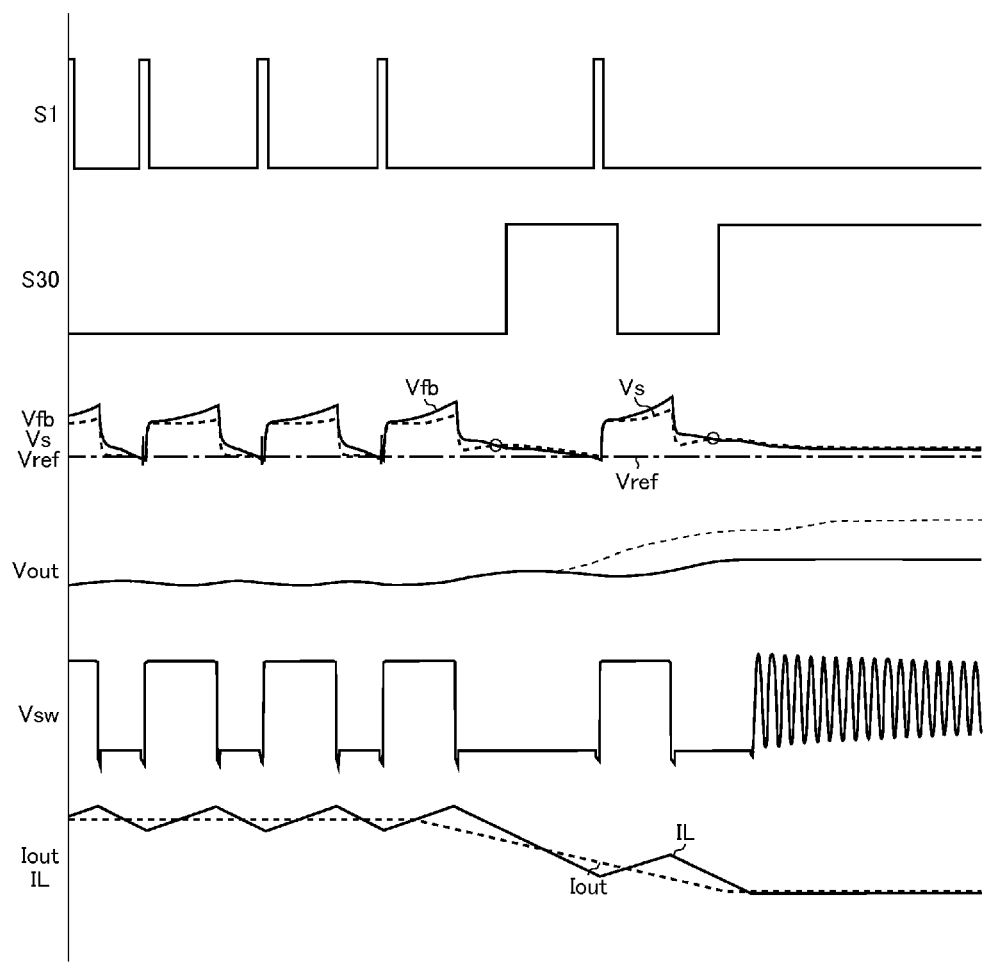
FIG. 24 is a time chart illustrating first overshoot suppression operation.

FIG. 24 is a time chart specifically illustrating first overshoot suppression operation (resetting of the ripple voltage Vrpl), and depicts, from top down, the comparison signal S1, the polarity reversal detection signal S30, the feedback voltage Vfb, the source voltage Vs, the reference voltage Vref, the output voltage Vout, the switching voltage Vsw, the output current Iout, and the coil current IL.

As mentioned previously, when the output current Iout falls sharply, a surplus coil current IL raises the output voltage Vout, and this makes the source voltage Vs (corresponding to the division voltage Vdiv before ripple injection) higher than the reference voltage Vref.

Accordingly, when, in response to a sharp fall in load, the discharging of the capacitor 114 by the second current I2 continues, the feedback voltage Vfb falls below the source voltage Vs (see small circles in FIG. 24) before falling below the reference voltage Vref. At that point, the polarity reversal detection signal S30 generated by the cross comparator 31 rises to high level; thus, the capacitor 114 is short-circuited across its terminals, and this makes the feedback voltage Vfb and the source voltage Vs equal.

In this way, it is possible to delay the timing with which the feedback voltage Vfb falls below the reference voltage Vref. It is thus possible to prevent the output transistor N1 from being unnecessarily turned on, and thereby to suppress an overshoot in the output voltage Vout.

Figure 25:
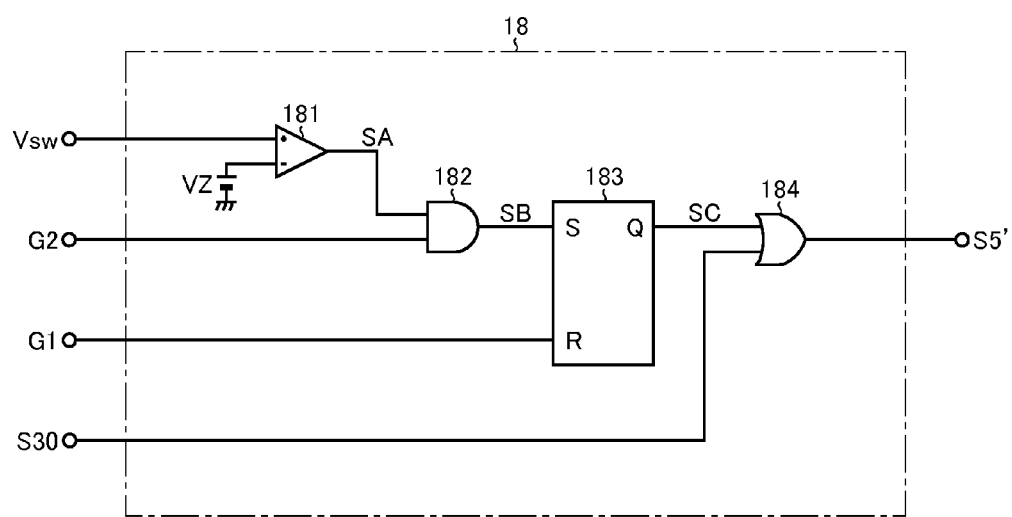
FIG. 25 is a diagram showing one configuration example of a reverse current detection circuit.

FIG. 25 is a diagram showing one configuration example of the reverse current detection circuit 18. The reverse current detection circuit 18 of this configuration example includes a comparator 181, an AND gate 182, an RS flip-flop 183, and an OR gate 184.

The comparator 181 generates a zero-cross detection signal SA by comparing the switching voltage Vsw, which is fed to a non-inverting input terminal (+) of the comparator 181, with a threshold voltage VZ (e.g., −0.001 V), which is fed to an inverting input terminal (−) of the comparator 181. The zero-cross detection signal SA is at low level when the switching voltage Vsw is lower than the threshold voltage VZ, and is at high level when the switching voltage Vsw is higher than the threshold voltage VZ. That is, the zero-cross detection signal SA is at low level when the coil current IL is passing in the positive direction (from the ground node through the transistor N2 toward the coil L1), and is at high level when the coil current IL is passing in the negative direction (from the coil L1 through the transistor N2 to the ground node) (i.e., when a reverse current is passing through the transistor N2).

The AND gate 182 generates an AND signal (logical multiplication signal) SB between the zero-cross detection signal SA and the gate signal G2, and outputs the AND signal SB to a set terminal (S) of the RS flip-flop 183. The AND signal SB is at low level when at least one of the zero-cross detection signal SA and the gate signal G2 is at low level, and is at high level when the zero-cross detection signal SA and the gate signal G2 are both at high level. That is, the zero-cross detection signal SA is valid only during the high-level period of the gate signal G2 (the on-period of the transistor N2), and is invalid during the low-level period of the gate signal G2 (the off-period of the transistor N2).

The RS flip-flop 183 sets a reverse current detection signal SC (corresponding to the reverse current detection signal S5 in FIG. 1) to high level at a rising edge in the AND signal SB, which is fed to a set terminal (S) of the RS flip-flop 183, and resets the reverse current detection signal SC to low level at a rising edge in the gate signal G1, which is fed to a reset terminal (R) of the RS flip-flop 183. That is, the reverse current detection signal SC is latched at high level (the logic level indicating that a reverse current is being detected) at the time point that a reverse current is detected during the on-period of the transistor N2, and is reset to low level (the logic level indicating that a reverse current is not being detected) at the on-timing of the transistor N1 in the next cycle.

The OR gate 184 generates a synchronous rectification stopping signal S5' by performing an OR operation (logical addition operation) between the reverse current detection signal SC fed from the RS flip-flop 183 and the polarity reversal detection signal S30 fed from the overshoot suppression circuit 30. The synchronous rectification stopping signal S5' is at high level when at least one of the reverse current detection signal SC and the polarity reversal detection signal S30 is at high level, and is at low level when the reverse current detection signal SC and the polarity reversal detection signal S30 are both at low level.

The gate driver circuit 17 receives, instead of the reverse current detection signal S5 mentioned previously, the synchronous rectification stopping signal S5', and generates the gate signal G2 such that, when the synchronous rectification stopping signal S5' is at high level, the transistor N2 is forcibly turned off irrespective of the output signal S4. That is, the gate driver circuit 17 forcibly turns off the transistor N2 not only when a reverse current toward the transistor N2 is detected but also when, in response to a sharp fall in load, the ripple voltage Vrpl turns from positive to negative.

Figure 26:
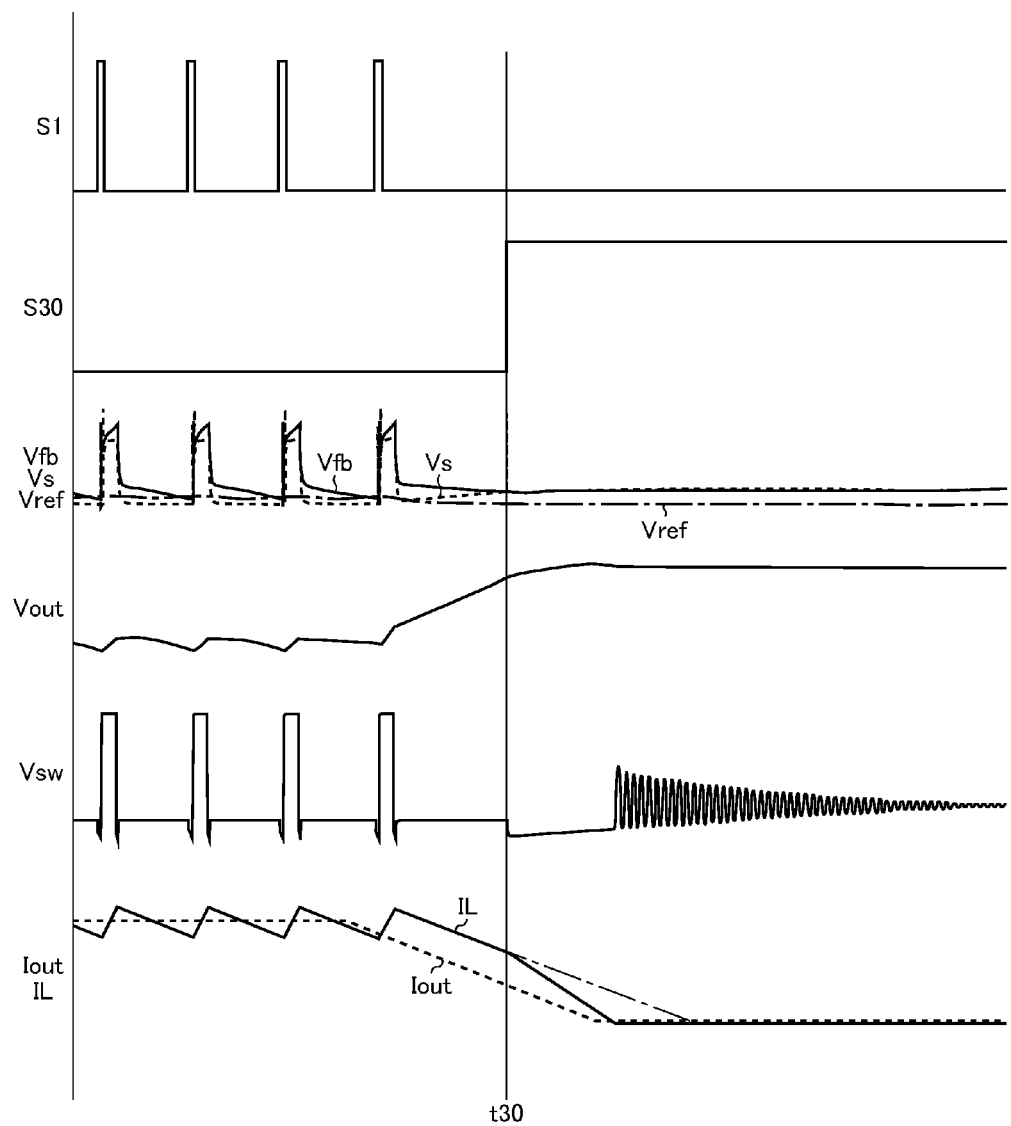
FIG. 26 is a time chart illustrating second overshoot suppression operation.

FIG. 26 is a time chart specifically illustrating second overshoot suppression operation (forcible turning-off of the transistor N2), and depicts, from top down, the comparison signal S1, the polarity reversal detection signal S30, the feedback voltage Vfb, the source voltage Vs, the reference voltage Vref, the output voltage Vout, the switching voltage Vsw, the output current Iout, and the coil current IL.

As a result of a sharp fall in the output current Iout, when, at time point t30, the polarity reversal detection signal S30 rises to high level, the transistor N2 is forcibly turned off, and this brings the transistors N1 and N2 in a simultaneously-on state. That is, in response to a sharp fall in load, the switching power supply device 1 is switched from synchronous rectification to diode rectification, and the switching voltage Vsw is lowered to become negative.

As a result, after time point t30, the voltage across the coil L1 increases, and this promotes the consumption of the coil current IL. In this way, it is possible to suppress an overshoot in the output voltage Vout.

Figure 27:
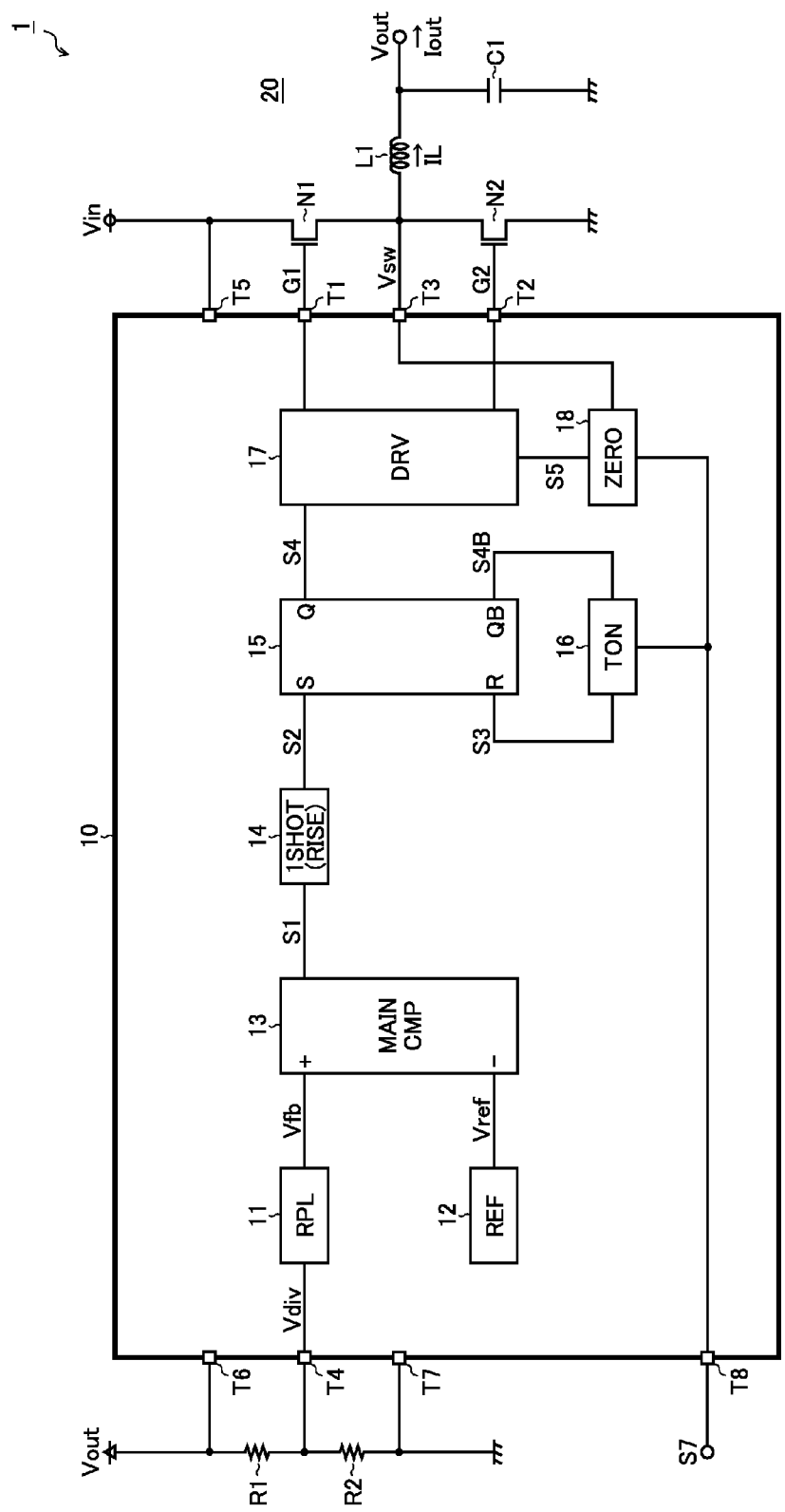
FIG. 27 is a block diagram showing a switching power supply device according to a third embodiment of the present invention.

Sleep Function:

FIG. 27 is a block diagram showing a switching power supply device according to a third embodiment of the present invention (one configuration example of the semiconductor device 10 having a sleep function). The semiconductor device 10 of this configuration example includes, in addition to the external terminals T1 to T7 shown in FIG. 1, an external terminal T8 for receiving a mode change signal S7 fed from outside. Accordingly, such components and elements as are similar to those described previously are identified by the same reference signs as in FIG. 1, and no overlapping description will be repeated. The following description focuses on the sleep function.

The semiconductor device 10 receives from outside a mode change signal S7 for changing the operation mode of a sleep-target circuit (in the illustrated example, the on-period setting circuit 16 and the reverse current detection circuit 18). For example, when the mode change signal S7 is at low level, the sleep-target circuit is operated in a normal mode. On the other hand, when the mode change signal S7 is at high level, the sleep-target circuit is operated in a mode more power-saving than the normal mode, namely in a sleep mode (an operation mode in which electric power is supplied to as few circuit blocks as possible that have to be operated, with a view to reducing the power consumption by the semiconductor device 10).

The mode change signal S7 is fed to the on-period setting circuit 16 and to the reverse current detection circuit 18. When the mode change signal S7 is at low level, priority is given to improved stability of output feedback control by keeping on the on-period setting circuit 16 and the reverse current detection circuit 18 all the time. On the other hand, when the mode change signal S7 is at high level, priority is given to improved efficiency under a light load by turning on and off the on-period setting circuit 16 and the reverse current detection circuit 18 as necessary.

Figure 28:
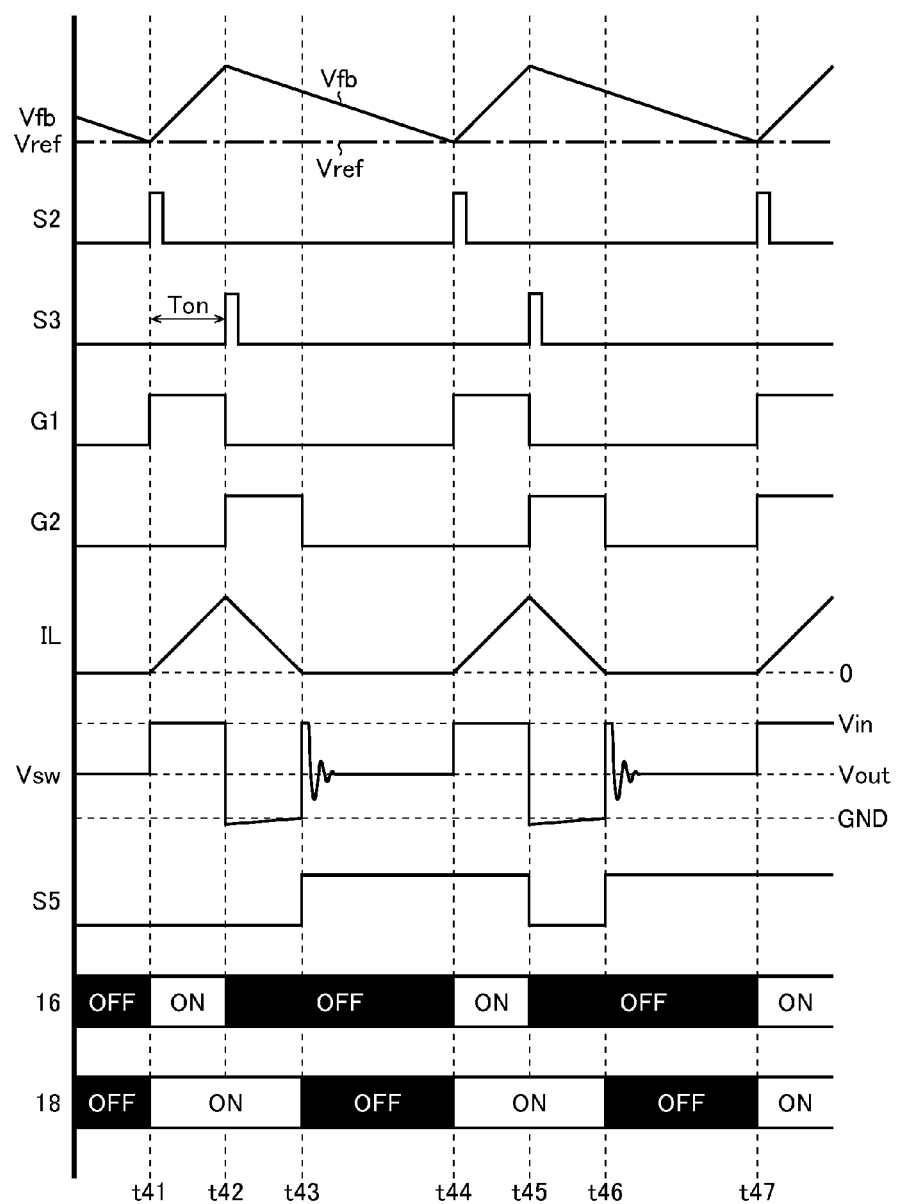
FIG. 28 is a time chart showing sleep operation of an on-time setting circuit and a reverse current detection circuit.

FIG. 28 is a time chart showing the sleep operation of the on-period setting circuit 16 and the reverse current detection circuit 18 (their operation with the mode change signal S7 at high level), and depicts, from top down, the feedback voltage Vfb, the reference voltage Vref, the set signal S2, the reset signal S3, the gate signals G1 and G2, the coil current IL, the switching voltage Vsw, and the reverse current detection signal S5, along with the on/off states of the on-period setting circuit 16 and the reverse current detection circuit 18.

When, at time point t41, the feedback voltage Vfb falls below the reference voltage Vref and a one-shot pulse is generated in the set signal S2, the gate signal G1 is raised to high level, and the transistor N1 is turned on. On the other hand, between time points t41 and t42, the gate signal G2 is held at low level, and the transistor N2 remains off. As a result, between time points t41 and t42, the switching voltage Vsw rises up to approximately the input voltage Vin, and the coil current IL increases.

Moreover, at time point t41, the on-period setting circuit 16 and the reverse current detection circuit 18 are each turned on by being triggered by the one-shot pulse in the set signal S2 (or by a rising edge in the comparison signal S1). Thus, the on-period setting circuit 16 can start to count the on-period Ton immediately after the transistor N1 is turned on.

When, at time point t42, the on-period setting circuit 16 completes its counting of the on-period Ton and a one-shot pulse is generated in the reset signal S3, the gate signal G1 is lowered to low level, and the gate signal G2 is raised to high level. As a result, the transistor N1 turns off, and the transistor N2 turns on. At this point, electric power is induced in the coil L1 that tends to keep the coil current IL passing in the same direction as until then, and thus the coil current IL passes from the ground node through the transistor N2 into the coil L1. Accordingly, the switching voltage Vsw falls to a negative voltage that is lower than the ground voltage GND by the voltage drop across the transistor N2.

Although in FIG. 28 the transistors N1 and N2 are turned on and off with coincident timing, from the viewpoint of preventing a through current, the transistors N1 and N2 may be turned on and off with a delay between them to produce a period in which the transistors N1 and N2 are simultaneously off.

Moreover, on completing the counting of the on-period Ton, the on-period setting circuit 16 turns off with no delay. More specifically, after generating a one-shot pulse in the reset signal S3, the on-period setting circuit 16 cuts off the power supply path to itself. With such on/off control, it is possible to reduce the power consumption by the on-period setting circuit 16, and to improve efficiency under a light load.

Here, under a heavy load, where the output current Iout passing through the load is high, the energy stored in the coil L1 is high. Thus, until time point t44, when the gate signal G1 is raised back to high level, the coil current IL continues passing toward the load without falling below a zero value, and the switching voltage Vsw is held at a negative voltage value. On the other hand, under a light load, where the output current Iout passing through the load is low, the energy stored in the coil L1 is low. Thus, at time point t43, the coil current IL falls below a zero value, a reverse current toward the transistor N2 occurs, and the polarity of the switching voltage Vsw turns from negative to positive. This state is as if dumping the electric charge stored in the capacitor C1 to the ground node, and thus causes diminished efficiency under a light load.

As a solution, the semiconductor device 10 generates, by use of the reverse current detection circuit 18, the reverse current detection signal S5 which reflects whether or not a reverse current (a reversal of the polarity of the switching voltage Vsw) is present, and forcibly turns off the transistor N2 during the high-level period of the reverse current detection signal S5 (between time points t43 and t44). With this configuration, it is possible to quickly shut off a reverse current toward the transistor N2, and thereby to avoid diminished efficiency under a light load.

Incidentally, the reverse current detection circuit 18 turns off with no delay on completing reverse current detection operation. Specifically, after raising the reverse current detection signal S5 to high level, the reverse current detection circuit 18 cuts off the power supply path to itself. With such on/off control, it is possible to reduce the power consumption by the on-period setting circuit 16, and to improve efficiency under a light load.

After time point t45, the suspension of switching on detection of a reverse current and the on/off control of the on-period setting circuit 16 and the reverse current detection circuit 18 are repeated in a similar manner as described above. That is, in the semiconductor device 10 in sleep mode, so long as the output voltage Vout is higher than the reference voltage Vref, the switching operation of the transistors N1 and N2 is suspended, and all the circuit blocks except the main comparator 13 are kept off, so as thereby to minimize the current consumption by the semiconductor device 10 itself. Thereafter, when a drop in the output voltage Vout is detected by the main comparator 13, the circuit blocks that have been kept off are brought back into operation to restart the switching operation of the transistors N1 and N2. With this configuration, it is possible to reduce the average current consumption by the semiconductor device 10, and thus to achieve improved efficiency under a light load.

Figure 29:
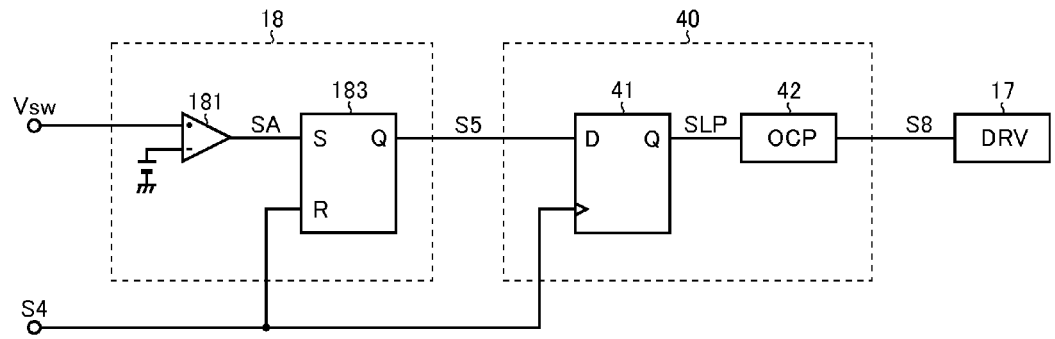
FIG. 29 is a diagram showing one configuration example of an overcurrent protection circuit.

Overcurrent Protection Circuit:

Next, an overcurrent protection circuit provided with a sleep function will be described. FIG. 29 is a diagram showing one configuration example of an overcurrent protection circuit. The overcurrent protection circuit 40 of this configuration example includes a D flip-flop 41 and an overcurrent protector 42.

The D flip-flop 41 latches the reverse current detection signal S5, which is fed to a data terminal (D) of the D flip-flop 41, by being triggered by a rising edge in the reset signal S3, which is fed to a clock terminal of the D flip-flop 41, and outputs the latched output as a sleep signal SLP from an output terminal (Q) of the D flip-flop 41.

The overcurrent protector 42 generates an overcurrent protection signal S8 by monitoring the output current Iout passing through the load, or the coil current IL passing through the coil L1, or the switch current passing through the transistor N1 or N2. The overcurrent protection signal S8 is at high level when the monitored current is higher than a threshold value (when an overcurrent is being detected), and is at low level when the monitored current is lower than the threshold value (when no overcurrent is being detected).

The overcurrent protector 42 is turned on and off according to the sleep signal SLP. When the sleep signal SLP is at high level, the overcurrent protector 42 is off so that less driving current is consumed. On the other hand, when the sleep signal SLP is at low level, the overcurrent protector 42 is on so that the overcurrent protection function is active.

The gate driver circuit 17 receives the overcurrent protection signal S8 and, when the overcurrent protection signal S8 is at high level, forcibly suspends the switching operation of the transistors N1 and N2, thereby effecting the overcurrent protection function.

Figure 30:
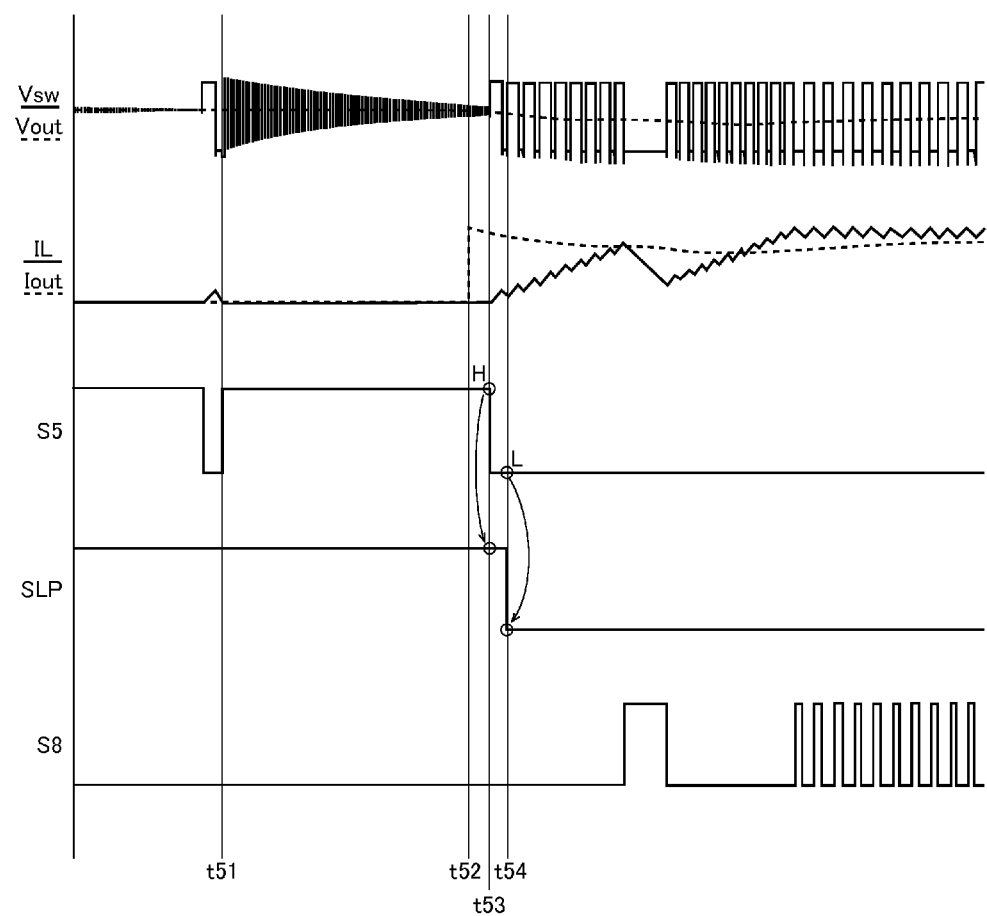
FIG. 30 is a time chart showing sleep operation of an overcurrent protection circuit.

FIG. 30 is a time chart showing the sleep operation of the overcurrent protection circuit 40, and depicts, from top down, the switching voltage Vsw, the output voltage Vout, the coil current IL, the output current Iout, the reverse current detection signal S5, the sleep signal SLP, and the overcurrent protection signal S8.

Under a light load, where the output current Iout is low (before time point t52), even with the transistor N1 on, no sufficient energy is stored in the coil L1; thus, the coil current IL falls below a zero value in every cycle (see time point t51). Accordingly, unless a fault accompanying an overcurrent (e.g., a short circuit across the load) occurs, under a light load, the reverse current detection signal S5 turns to high level before the latch timing of the D flip-flop 41, and thus the sleep signal SLP is held at high level all the time. As a result, under a light load, the overcurrent protector 42 basically remains off, and less driving current is consumed.

Incidentally, a state where the sleep signal SLP is at high level can be said to be a state where the output current Iout is low and the necessity for overcurrent protection operation is low. Accordingly, keeping the overcurrent protector 42 off does not spoil the safety of the switching power supply device 1.

By contrast, when, at time point t52, the output current Iout increases (on recovery from sleep mode to normal mode, or in response to an overcurrent resulting from a short-circuited load), the coil current IL ceases to fall below a zero value, and the reverse current detection signal S5 ceases to rise to high level; thus, the sleep signal SLP is lowered to low level.

A specific description will follow in line with the illustrate example. After a sudden increase in the output current Iout at time point t52, at the first latch timing (time point t53) of the D flip-flop 41, as a result of a reverse current having been detected in the previous switching cycle, the reverse current detection signal S5 is at high level. Thus, the sleep signal SLP, which is the latched result of the reverse current detection signal S5, also remains at high level.

By contrast, after the reverse current detection signal S5 is reset to low level at time point t53, at the next, i.e., second, latch timing (time point t54), the coil current IL no longer falls below a zero value, and the quieting signal S6 is held at low level; thus, the sleep signal SLP, which is the latched result of the reverse current detection signal S5, falls to low level. As a result, the overcurrent protector 42 is turned on, and the overcurrent protection operation is performed. In this way, a rise in the output current Iout is suppressed.

Incidentally, even in response to a sudden increase in the output current Iout, it takes certain time for the coil L1 to be charged with energy. Thus, by bringing the overcurrent protector 42 back into operation with the timing mentioned above, it is possible to achieve sufficiently effective overcurrent protection operation.

While the above description deals with, as an example, recovery from sleep induced by an increase in the output current Iout, on the basis of the same description, it is possible to understand recovery from sleep induced by a decrease in the output current Iout. Specifically, when the load becomes lighter and the coil current IL shifts from continuous mode to discontinuous mode, at the second latch timing after the shift to discontinuous mode, the sleep signal SLP rises from low level to high level, and the overcurrent protector 42 is turned off.

As described above, in the overcurrent protection circuit 40 of this configuration example, in every switching cycle, the reverse current detection signal S5 (the result of detection of a reverse current) is latched, and according to the sleep signal SLP, which is the latched output of the reverse current detection signal S5, the overcurrent protection circuit 40 is turned on and off. Specifically, in response to a reverse current having been detected in the previous switching cycle, the overcurrent protection circuit 40 is turned off, and in response to no reverse current having been detected in the previous switching cycle, the overcurrent protection circuit 40 is turned on.

With this configuration, the overcurrent protection circuit 40 can be turned on and off according to whether the current mode is continuous-current mode or discontinuous-current mode. It is thus possible to achieve high efficiency under a light load without spoiling the effectiveness of the overcurrent protection function.

Like the on-period setting circuit 16 and the reverse current detection circuit 18 mentioned above, the overcurrent protection circuit 40 may also be included in the sleep-target circuit that is fed with the mode change signal S7. In that case, for example, when the mode change signal S7 is at low level, the overcurrent protection circuit 40 can be kept on all the time, and when the mode change signal S7 is at high level, the overcurrent protection circuit 40 can be turned on and off according to the reverse current detection signal S5.

Figure 31:
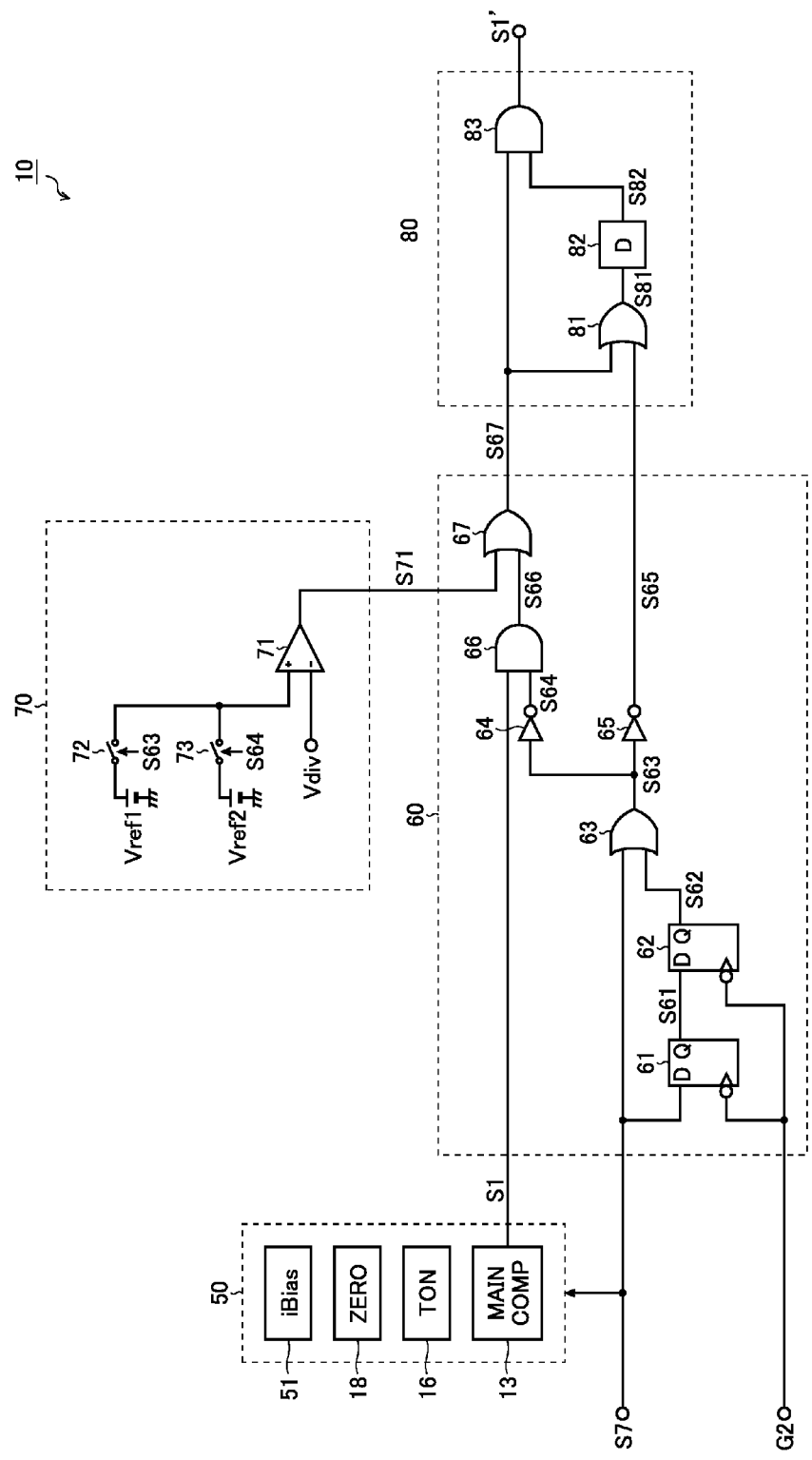
FIG. 31 is a diagram showing one configuration example of a semiconductor device provided with a mode change control circuit.

Mode Change Control Circuit:

FIG. 31 is a diagram showing one configuration example of the semiconductor device 10 provided with a mode change control circuit 60 (and circuits peripheral to it). The semiconductor device 10 of this configuration example includes a sleep-target circuit 50, a mode change control circuit 60, a non-sleep-target circuit 70, and a noise masking circuit 80.

The sleep-target circuit 50 is a circuit block of which the operation mode can be changed selectively between a normal mode and a sleep mode according to the mode change signal S7. In the semiconductor device 10 of this configuration example, in addition to the on-period setting circuit 16 and the reverse current detection circuit 18 mentioned previously, the main comparator 13 and a bias current generation circuit 51 are also included in the sleep-target circuit 50. For example, when the mode change signal S7 is at high level, the main comparator 13 is in sleep mode, and its driving current is zero (or approximately zero).

The mode change control circuit 60 is a circuit block which controls the masking of the output of the main comparator 13 and the switching of an output feedback loop when the operation mode is changed (for transition from normal to sleep mode or recovery from sleep to normal mode), and includes D flip-flops 61 and 62, an OR gate 63, inverters 64 and 65, an AND gate 66, and an OR gate 67.

The D flip-flop 61 latches the mode change signal S7, which is fed to a data terminal (D) of the D flip-flop 61, by being triggered by a trailing edge in the gate signal G2, which is fed to an inverting clock terminal of the D flip-flop 61, and outputs the latched output, as a first latch signal S61, from an output terminal (Q) of the D flip-flop 61.

The D flip-flop 62 latches the first latch signal S61, which is fed to a data terminal (D) of the D flip-flop 62, by being triggered by a trailing edge in the gate signal G2, which is fed to an inverting clock terminal of the D flip-flop 62, and outputs the latched output, as a second latch signal S62, from an output terminal (Q) of the D flip-flop 62.

Thus, after the logic level of the mode change signal S7 is shifted, at the second trailing edge in the gate signal G2, the logic level of the second latch signal S62 is shifted Although the mode change control circuit 60 of this configuration example uses two stages of D flip-flops 61 and 62, the number of stages of D flip-flops 61 may be one, or three or more.

The OR gate 63 generates the OR signal (logical addition signal) S63 between the mode change signal S7 and the second latch signal S62. The OR signal S63 is at high level when at least one of the mode change signal S7 and the second latch signal S62 is at high level, and is at low level when the mode change signal S7 and the second latch signal S62 are both at low level. Accordingly, whereas the rise timing of the OR signal S63 coincides with the rise timing of the mode change signal S7, the fall timing of the mode change signal S7 does not coincide with the fall timing of the mode change signal S7, but is delayed until the fall timing of the second latch signal S62.

The inverter 64 generates an output gate signal S64 by logically inverting the OR signal S63.

The inverter 65 generates a noise masking control signal S65 by logically inverting the OR signal S63.

The AND gate 66 generates an AND signal (logical multiplication signal) S66 between the comparison signal S1 and the output gate signal S64. The AND signal S66 is at low level when at least one of the comparison signal S1 and the output gate signal S64 is at low level, and is at high level when the comparison signal S1 and the output gate signal S64 are both at low level. Accordingly, when the output gate signal S64 is at high level, the comparison signal S1 is output as it is as the AND signal S66, and when the output gate signal S64 is at low level, the AND signal S66 is constantly at low level irrespective of the logic level of the comparison signal S1. That is, when the output gate signal S64 is at low level, the output of the main comparator 13 is masked.

The OR gate 67 generates an OR signal (logical addition signal) S67 between the AND signal S66 and a sub comparison signal S71. The OR signal S67 is at high level when at least one of the AND signal S66 and the sub comparison signal S71 is at high level, and is at low level when the AND signal S66 and the sub comparison signal S71 are both at low level. That is, when the output of the main comparator 13 is being masked (with S66=constantly L), the sub comparison signal S71 is output as it is as the OR signal S67.

Configured as described above, the mode change control circuit 60 operates as follows; during transition from normal mode to sleep mode (S7=L→H), it masks the output of the sleep-target circuit 50 with no delay; during recovery from sleep mode to normal mode (S7=H→L), it stops masking the output of the sleep-target circuit 50 with a predetermined delay. On the latter occasion, the mode change control circuit 60 latches the mode change signal S7 at a trailing edge in the gate signal G2 (an off-timing of the transistor N2), and uses the latched output to stop masking the output of the sleep-target circuit 50.

The non-sleep-target circuit 70 is a circuit block which continues operating by being supplied with a driving current constantly irrespective of the logic level of the mode change signal S7, and includes a sub comparator 71 and switches 72 and 73. Although not expressly shown in FIG. 31, of the circuit blocks that constitute an output feedback loop, the reference voltage generation circuit 12, the one-shot pulse generation circuit 14, the RS flip-flop 15, the gate driver circuit 17, etc. are included in the non-sleep-target circuit 70.

The sub comparator 71 generates the sub comparison signal S71 by comparing the division voltage Vdiv before ripple injection, which is fed to an inverting input terminal (−) of the sub comparator 71, with a reference voltage Vref1 or Vref2, which is fed to a non-inverting input terminal (+) of the sub comparator 71. The sub comparison signal S71 is at low level when division voltage Vdiv is higher than the reference voltage Vref1 or Vref2, and is at high level when division voltage Vdiv is lower than the reference voltage Vref1 or Vref2.

The sub comparator 71 operates in place of the main comparator 13 when the latter is in sleep mode, thereby to maintain the output feedback loop. In a case where the semiconductor device 10 incorporates a max-on comparator for setting the maximum on-period of the transistor N1 in the event of an excessive fall in the output voltage Vout, the max-on comparator can preferably be substituted for the sub comparator 71. By such substitution, it is possible to achieve power saving under a light load without unnecessarily increasing the circuit scale.

Through the substitution described above, the sub comparator 71 not only operates when the main comparator 13 is in sleep mode, but continues to operate as a max-on comparator when the main comparator 13 is in normal mode.

The switch 72 is connected between an application node of a reference voltage Vref1 (e.g., Vref1=Vref) and the non-inverting input terminal (+) of the sub comparator 71, and is turned on and off according to the OR signal S63. Specifically, the switch 72 is on when the OR signal S63 is at high level, and is off when the OR signal S63 is at low level.

The switch 73 is connected between an application node of a reference voltage Vref2 (e.g., Vref2=Vref×0.99) and the non-inverting input terminal (+) of the sub comparator 71, and is turned on and off according to the output gate signal S64 (the logically inverted signal of the OR signal S63). Specifically, the switch 73 is on when the output gate signal S64 is at high level, and is off when the output gate signal S64 is at low level.

Thus, the switches 72 and 73 function as a selector for switching the reference voltage fed to the non-inverting input terminal (+) of the sub comparator 71 between Vref1 and Vref2 according to whether or not the output of the main comparator 13 is being masked.

More specifically, when the output of the main comparator 13 is being masked, to let the sub comparator 71 function as a substitute for the main comparator 13, the reference voltage Vref2, which equals the reference voltage Vref, is selected. On the other hand, when the output of the main comparator 13 is not being masked, to let the sub comparator 71 function as a max-on comparator, the reference voltage Vref2, which is lower than the reference voltage Vref, is selected.

The noise masking circuit 80 is a circuit block which masks output noise of the sub comparator 71 during transition from normal mode to sleep mode (S7=L→H), and includes an OR gate 81, a signal delayer 82, and an AND gate 83.

The OR gate 81 generates an OR signal (logical addition signal) S81 between the noise masking control signal S65 and the OR signal S67. The OR signal S81 is at high level when at least one of the noise masking control signal S65 and the OR signal S67 is at high level, and is at low level when the noise masking control signal S65 and the OR signal S67 are both at high level. That is, when the output of the main comparator 13 is being masked (S65=L), the OR signal S67 is output as it is as the OR signal S81, and when the output of the main comparator 13 is not being masked (S65=H), the OR signal S81 is constantly at high level irrespective of the logic level of the OR signal S67.

The signal delayer 82 generates a delay signal S82 by delaying the OR signal S81 by a predetermined delay time (e.g., 1 μs).

The AND gate 83 generates an AND signal (logical multiplication signal) S1' between the OR signal S67 and the delay signal S82, and outputs the AND signal S1' as a substitute for the comparison signal S1 to the one-shot pulse generation circuit 14. The AND signal S1' is at low level when at least one of the OR signal S67 and the delay signal S82 is at low level, and is at high level when the OR signal S67 and the delay signal S82 are both at high level.

Thus, even if noise is present in the output of the sub comparator 71 during transition from normal mode to sleep mode (S7=L→H), so long as the noise settles within the predetermined delay time (within 1 μs), no noise is transferred to the AND signal S1'. In this way, it is possible to prevent erroneous operation.

As mentioned previously, when the output of the main comparator 13 is not being masked (S65=H), the OR signal S81 is constantly at high level, and hence the delay signal S82 is constantly at high level. Accordingly, the AND gate 83 outputs the OR signal S67 (corresponding to the comparison signal S1) as it is as the AND signal S1'. This helps prevent the comparison signal S1 from being unnecessarily delayed.

Figure 32:
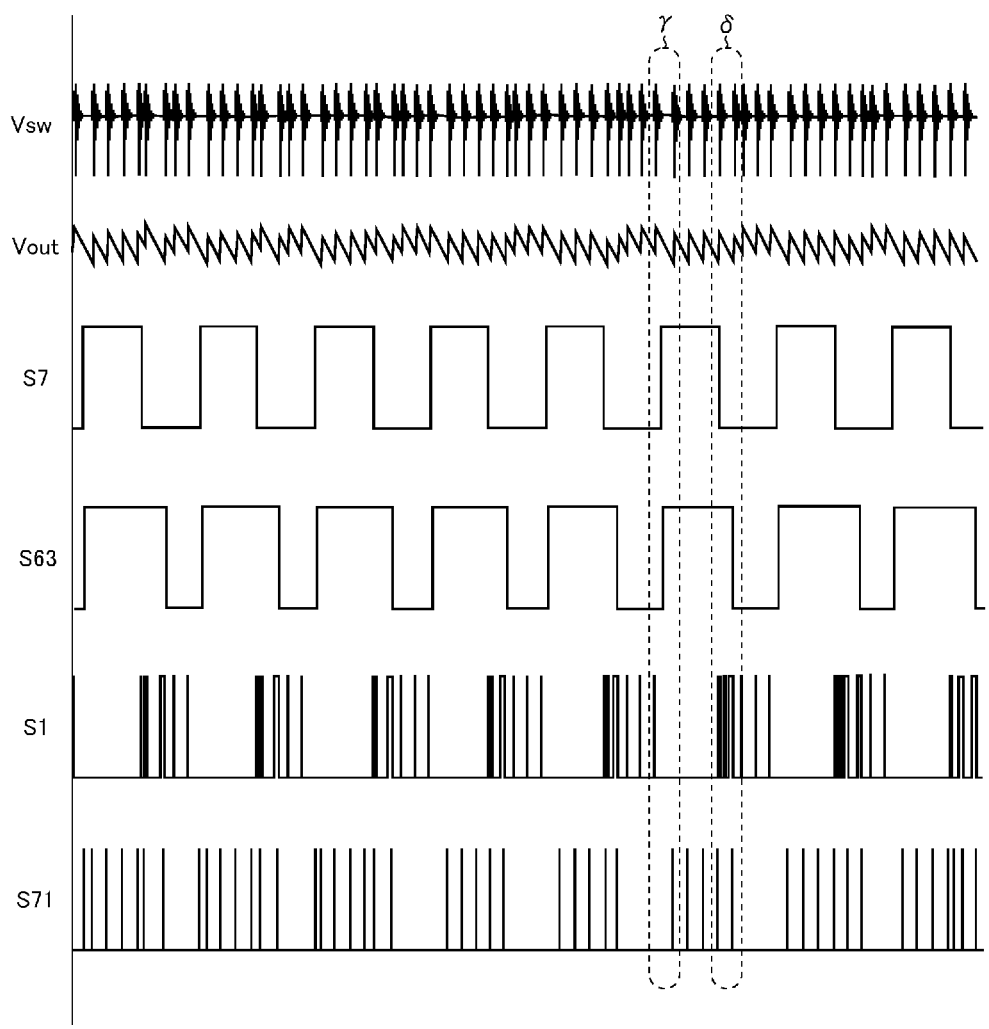
FIG. 32 is a time chart showing one example of mode change control operation.
Figure 33:
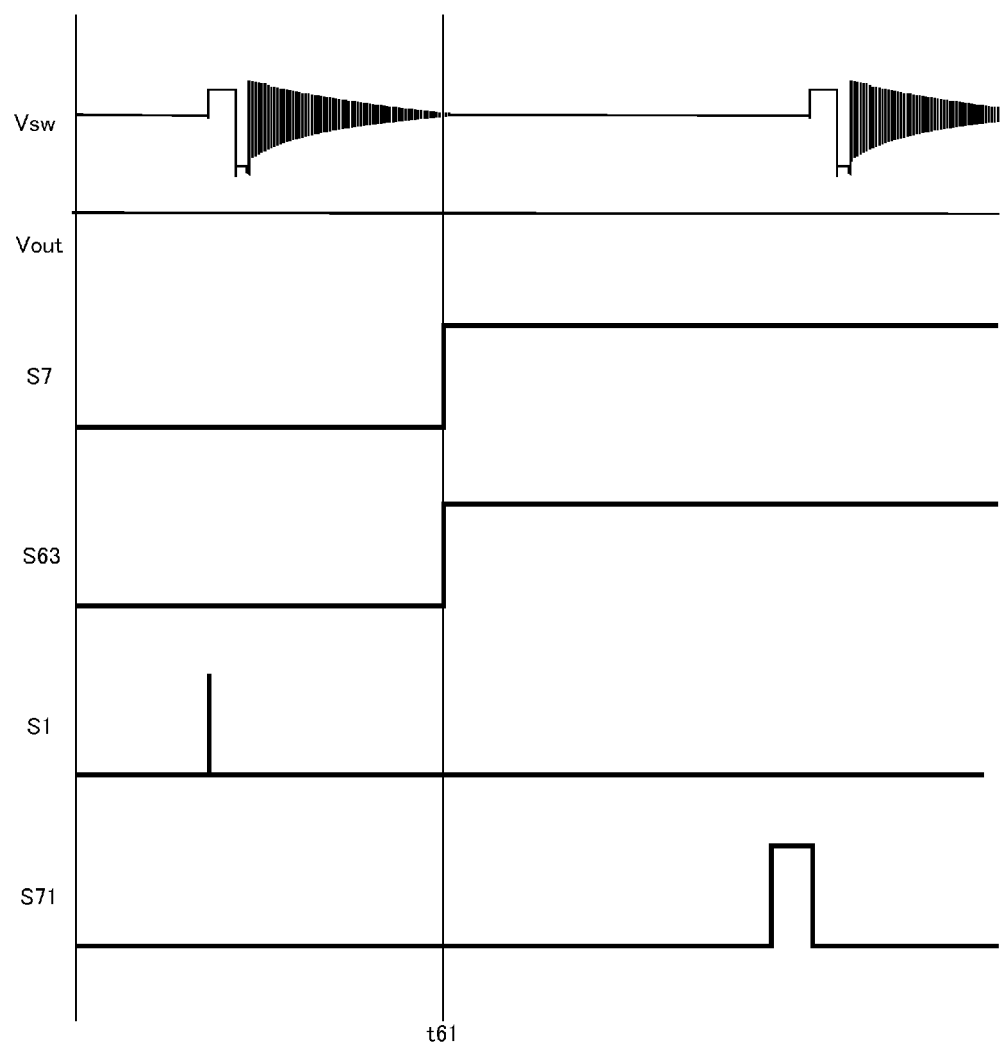
FIG. 33 is an enlarged view of broken-line region γ.
Figure 34:
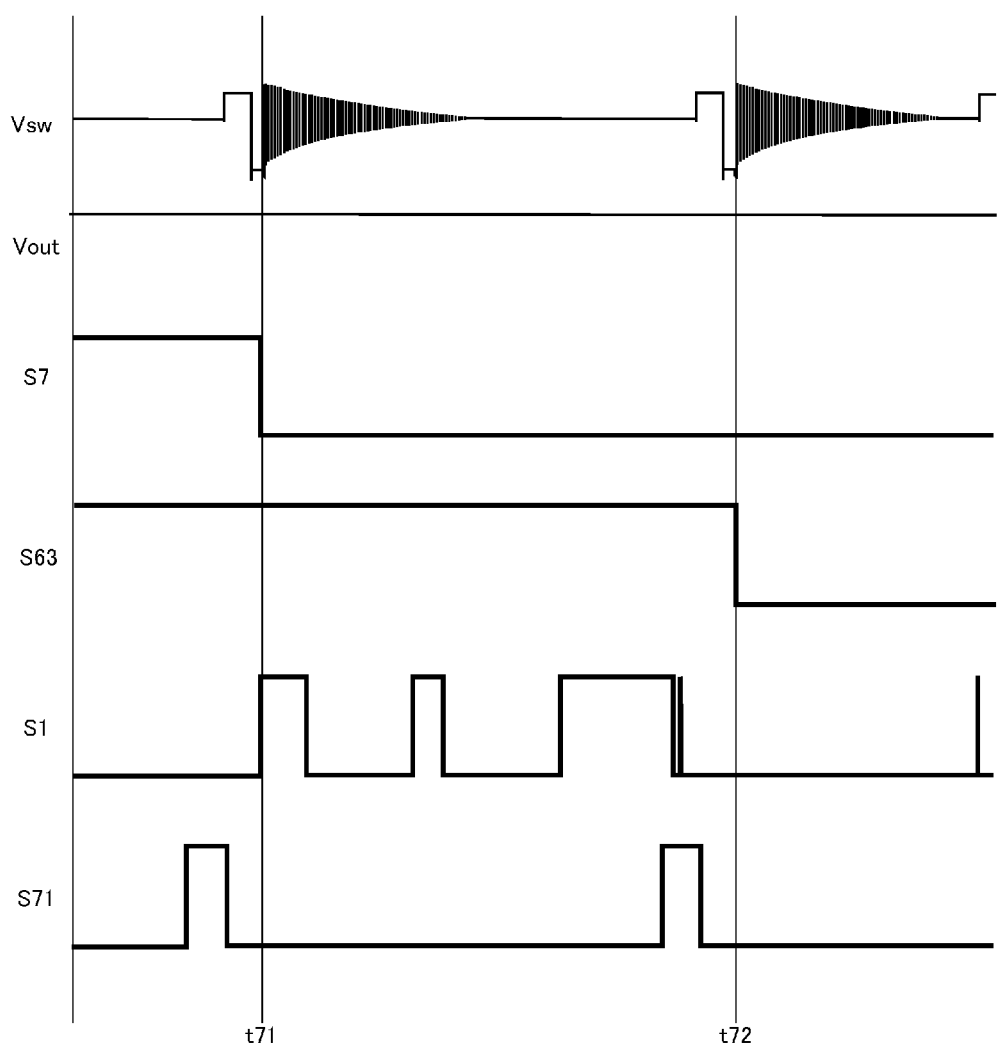
FIG. 34 is an enlarged view of broken-line region δ.

FIG. 32 is a time chart showing one example of mode change control operation, and depicts, from top down, the switching voltage Vsw, the output voltage Vout, the mode change signal S7, the OR signal S63, the comparison signal S1, and the sub comparison signal S71. FIGS. 33 and 34 are enlarged views of parts γ and δ, respectively, indicated by broken limes in FIG. 32.

First, a description will be given of a mode change from normal mode to sleep mode. When, at time point t61 in FIG. 33, the mode change signal S7 is raised to high level, the sleep-target circuit 50 immediately enters sleep mode. At this point, in response to the mode change signal S7 being raised to high level, the mode change control circuit 60 raises the OR signal S63 with no delay to perform the masking of the output of the main comparator 13 and the switching to output feedback operation using the sub comparator 71. That is, at point t61 as a boundary, a mode change takes place from switching operation according to the comparison signal S1 to switching operation according to sub comparison signal S71.

By performing switching operation by use of the sub comparator 71 instead of the main comparator 13 when the sleep-target circuit 50 is in sleep mode as described above, it is possible to keep off most of the circuits (including the main comparator 13) used in normal mode, and thereby to achieve high efficiency under a light load.

Next, a description will be given of a mode change from sleep mode to normal mode. When, at time point t71 in FIG. 34, the mode change signal S7 is lowered to low level, the sleep-target circuit 50 immediately recovers to normal mode. However, immediately after recovery to the normal mode (immediately after the driving current starts to be supplied again), the main comparator 13 may malfunction, and an erroneous pulse may occur in the comparison signal S1 (see the comparison signal S1 between time points t71 and t72).

To prevent that, even after the mode change signal S7 is lowered to low level, the mode change control circuit 60 holds the OR signal S63 at high level for a predetermined current recovery period (between time points t71 and t72) to continue the masking of the output of the main comparator 13 and the output feedback operation using the sub comparator 71. That is, at time point t71, while the supply of a current to the sleep-target circuit 50 is restored, the output feedback operation remains in sleep mode.

After the mode change signal S7 falls to low level, at a second trailing edge in the gate signal G2 at time point t72, the mode change control circuit 60 lowers the OR signal S63 to low level to stop masking the output of the main comparator 13. That is, at time point t72 as a boundary, a mode change takes place from switching operation according to the sub comparison signal S71 to switching operation according to the comparison signal S1. Incidentally, the timing of recovery to output feedback operation using the main comparator 13 always coincides with the off-timing of the transistor N2.

With mode change operation as described above, it is possible to prevent unintended switching operation resulting from an erroneous pulse in the comparison signal S1 during recovery from sleep mode to normal mode, and thus to prevent an increase in output ripples.

Figure 35:
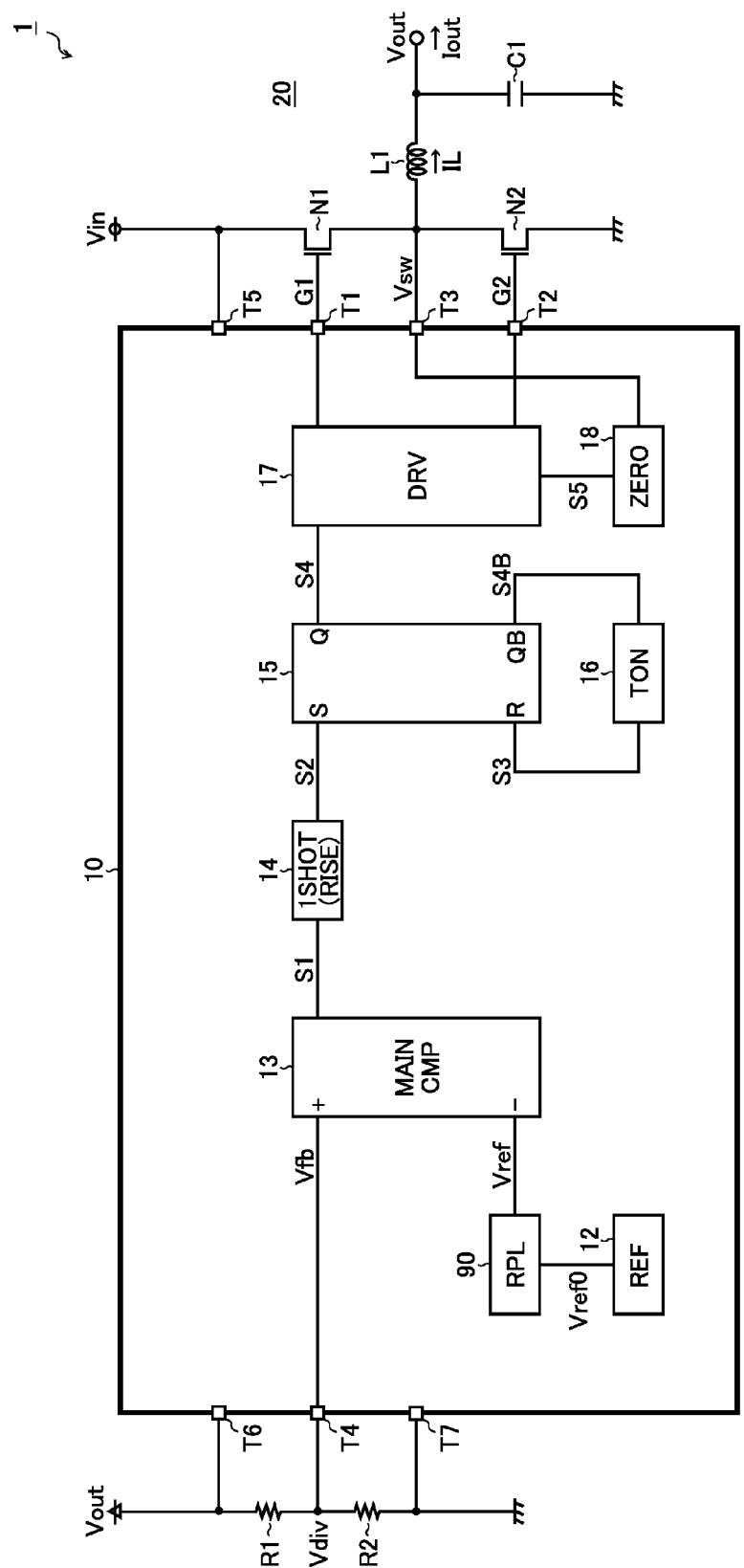
FIG. 35 is a block diagram showing a switching power supply device according to a fourth embodiment of the present invention.

Ripple Injection Circuit (on Reference Voltage Side):

FIG. 35 is a block diagram showing a switching power supply device according to a fourth embodiment of the present invention (one configuration example of the semiconductor device 10 provided with a ripple injection circuit on the reference voltage side). The semiconductor device 10 of this configuration example has basically the same configuration as in FIG. 1, but has, in place of the ripple injection circuit 11 in FIG. 1, a ripple injection circuit 90 which generates a reference voltage Vref by subtracting the ripple voltage Vrpl, which imitates the coil current IL, from a predetermined reference voltage Vref0 (corresponding to the reference voltage Vref in FIG. 1).

Figure 36:
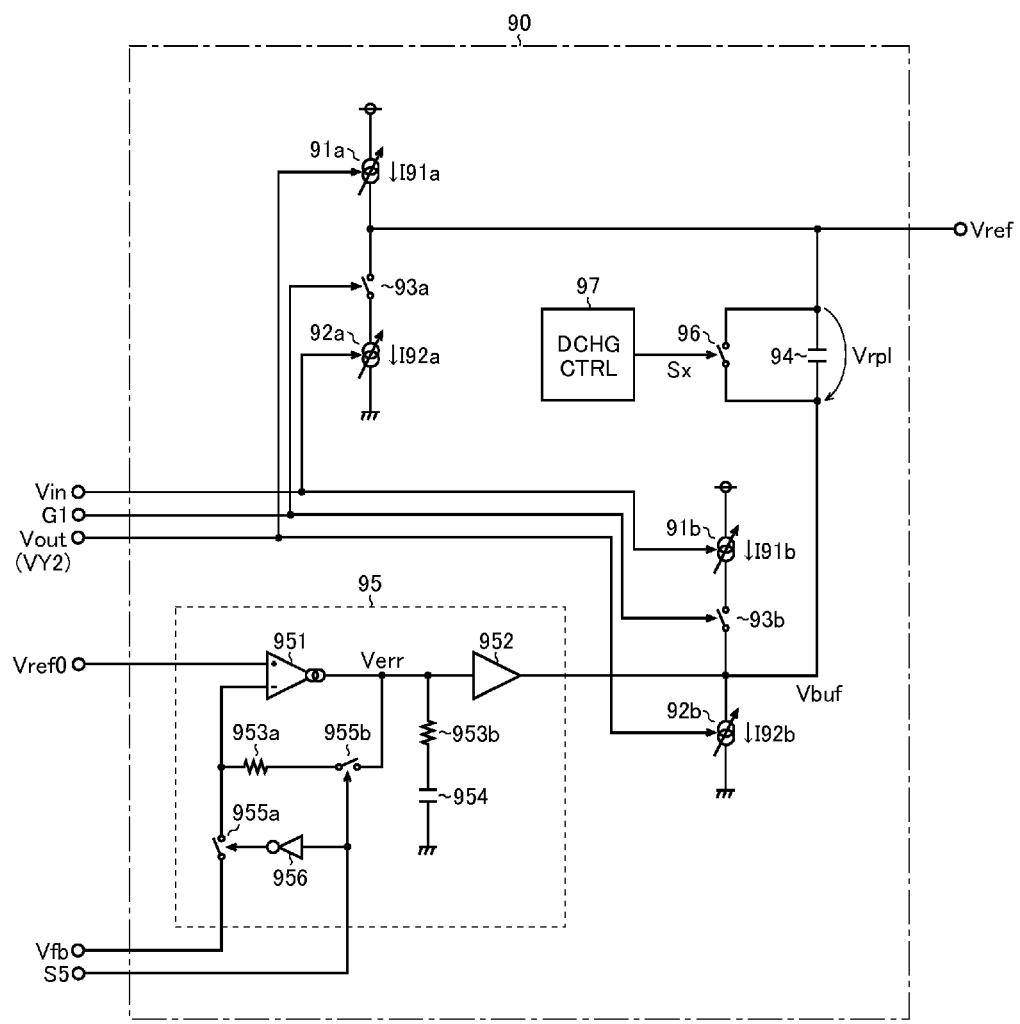
FIG. 36 is a diagram showing one configuration example (on a reference-voltage side) of a ripple injection circuit.

FIG. 36 is a diagram showing one configuration example of the ripple injection circuit 90. The ripple injection circuit 90 of this configuration example includes current sources 91*a* and 91*b*, current sources 92*a* and 92*b*, charge/discharge select switches 93*a* and 93*b*, a capacitor 94, a terminal voltage feeder 95, a discharge switch 96, and a discharge controller 97.

The current source 91*a* generates a current I91*a* ($=\alpha \times$ Vout) commensurate with the output voltage Vout (or the second voltage VY2 corresponding to the on-duty of the transistor N1). A first terminal of the current source 91*a* is connected to a supply power node. A second terminal of the current source 91*a* is connected to a first terminal of the capacitor 94 (an output node of the reference voltage Vref).

The current source 92*a* generates a current I92*a* ($=\alpha \times$ Vin) commensurate with the input voltage Vin. A first terminal of the current source 92*a* is connected via the charge/discharge select switch 93*a* to the first terminal of the capacitor 94 (the output node of the reference voltage Vref). A second terminal of the current source 92*a* is connected to a ground node. In the step-down (Vin>Vout) switching power supply device 1, in a case where the current sources 91*a* and 92*a* have an equal proportionality constant, I91*a*<I92*a*.

The charge/discharge select switch 93*a* switches the path between the first terminal of the current source 92*a* and the first terminal of the capacitor 94 (the output node of the reference voltage Vref) between a conducting and a cut-off state by being turned on and off according to the gate signal G1. More specifically, the charge/discharge select switch 93*a* is on during the high-level period of the gate signal G1 (the on-period of the transistor N1), and is off during the low-level period of the gate signal G1 (the off-period of the transistor N1).

The current source 91*b* generates a current I91*b* ($=\alpha \times$ Vin) commensurate with the input voltage Vin. A first terminal of the current source 91*b* is connected to the supply power node. A second terminal of the current source 91*b* is connected via the charge/discharge select switch 93*b* to a second terminal of the capacitor 94 (an application node of a buffer voltage Vbuf).

The current source 92*b* generates a current I92*b* ($=\alpha \times$ Vout) commensurate with the output voltage Vout (or the second voltage VY2 corresponding to the on-duty of the transistor N1). A first terminal of the current source 92*b* is connected to the second terminal of the capacitor 94 (the application node of the buffer voltage Vbuf). A second terminal of the current source 92*b* is connected to the ground node. In the step-down (Vin>Vout) switching power supply device 1, in a case where the current sources 91*b* and 91*b* have an equal proportionality constant, I91*b*>I92*b*.

The charge/discharge select switch 93*b* switches the path between the second terminal of the current source 91*b* and the second terminal of the capacitor 94 (the application node of the buffer voltage Vbuf) between a conducting and a cut-off state by being turned on and off according to the gate signal G1. More specifically, the charge/discharge select switch 93*b* is on during the high-level period of the gate signal G1 (the on-period of the transistor N1), and is off during the low-level period of the gate signal G1 (the off-period of the transistor N1).

The first terminal of the capacitor 94 is connected to the output node of the reference voltage Vref. The second terminal of the capacitor 94 is connected to the terminal voltage feeder 95. During the on-period of the charge/discharge select switches 93*a* and 93*b* (during the on-period of the transistor N1), a differential current ($=I92a-I91a>0$) resulting from subtracting the current I91*a* from the current I92*a* is extracted from the capacitor 94 via its first terminal, and a differential current ($=I91b-I92b>0$) resulting from subtracting the current I92*b* from the current I91*b* flows into the capacitor 94 via its second terminal; thus, the capacitor 94 is charged (the voltage across the capacitor 94 increases). On the other hand, during the off-period of the charge/discharge select switches 93*a* and 93*b* (during the off-period of the transistor N1), the currents I92*a* and I91*b* are both shut off; accordingly, the current I91*a* flows into the capacitor 94 via its first terminal, and the current I92*b* is extracted from the capacitor 94 via its second terminal; thus, the capacitor 94 is discharged (the voltage across the capacitor 94 decreases).

The terminal voltage feeder 95 is a circuit block which applies the terminal voltage of the capacitor 94 (in FIG. 36, the buffer voltage Vbuf) such that the voltage across the capacitor 94 is as the ripple voltage Vrpl subtracted from the reference voltage Vref0, and includes an error amplifier 951, a buffer amplifier 952, resistors 953*a* and 953*b*, a capacitor 954, switches 955*a* and 955*b*, and an inverter 956.

A non-inverting input terminal (+) of the error amplifier 951 is connected to an application node of the reference voltage Vref0. An inverting input terminal (−) of the error amplifier 951 is connected via the switch 955*a* to an application node of the feedback voltage Vfb, and is also connected, via a negative feedback loop composed of resistors 953*a* and 953*b*, to an output terminal of the error amplifier 951. The output terminal of the error amplifier 951 is connected to an input terminal of the buffer amplifier 952.

Between the output terminal and a ground terminal of the error amplifier 951, the resistor 953b and the capacitor 954 are connected in series for phase compensation. An output terminal of the buffer amplifier 952 is connected to the second terminal of the capacitor 94. A control terminal of the switch 955a is connected to an output terminal of the inverter 956. A control terminal of the switch 955b and an input terminal of the inverter 956 are connected to an application node of the reverse current detection signal S5.

The switches 955a and 955b are turned on and off in a complementary fashion according to the reverse current detection signal S5. Specifically, when the reverse current detection signal S5 is at low level (the logic level indicating that no reverse current is being detected), the switch 955a is on and the switch 955b is off. Accordingly, in continuous-current mode, an error voltage Verr is generated such that the reference voltage Vref0 equals the feedback voltage Vfb. On the other hand, when the reverse current detection signal S5 is at high level (the logic level indicating that a reverse current is being detected), the switch 955a is off and the switch 955b is on. Accordingly, in discontinuous-current mode, the error amplifier 951 functions as a buffer, and the error voltage Verr is held at a constant value irrespective of the feedback voltage Vfb.

The discharge switch 96 is connected in parallel with the capacitor 94, and is turned on and off according to the discharge control signal Sx fed from the discharge controller 97. Specifically, the discharge switch 96 is on when the discharge control signal Sx is at high level, and is off when the discharge control signal Sx is at low level. When the discharge switch 96 is turned on, the capacitor 94 is short-circuited across its terminals; thus, the capacitor 94 is rapidly discharged, and the ripple voltage Vrpl is reset to a zero value.

The discharge controller 97 has a circuit configuration similar to that of the discharge controller 117 described previously, and generates the discharge control signal Sx such that the discharge switch 96 is turned on every time before the capacitor 94 starts to be charged. That is, the ripple voltage Vrpl is reset every time before the capacitor 94 starts to be charged. Though not expressly shown in FIG. 36, the overshoot suppression circuit 30 (see FIG. 23) described previously can preferably be introduced so that resetting is performed also when the polarity of the ripple voltage Vrpl is reversed.

In the ripple injection circuit 90 described above, the capacitor 94 is charged and discharged by use of the currents I91a and I91b and the currents I92a and I92b, and thereby the ripple voltage Vrpl which imitates the coil current IL is generated; this is then subtracted from the buffer voltage Vbuf (=error voltage Verr), and thereby the reference voltage Vref (=Verr−Vrpl) is generated.

Figure 37:
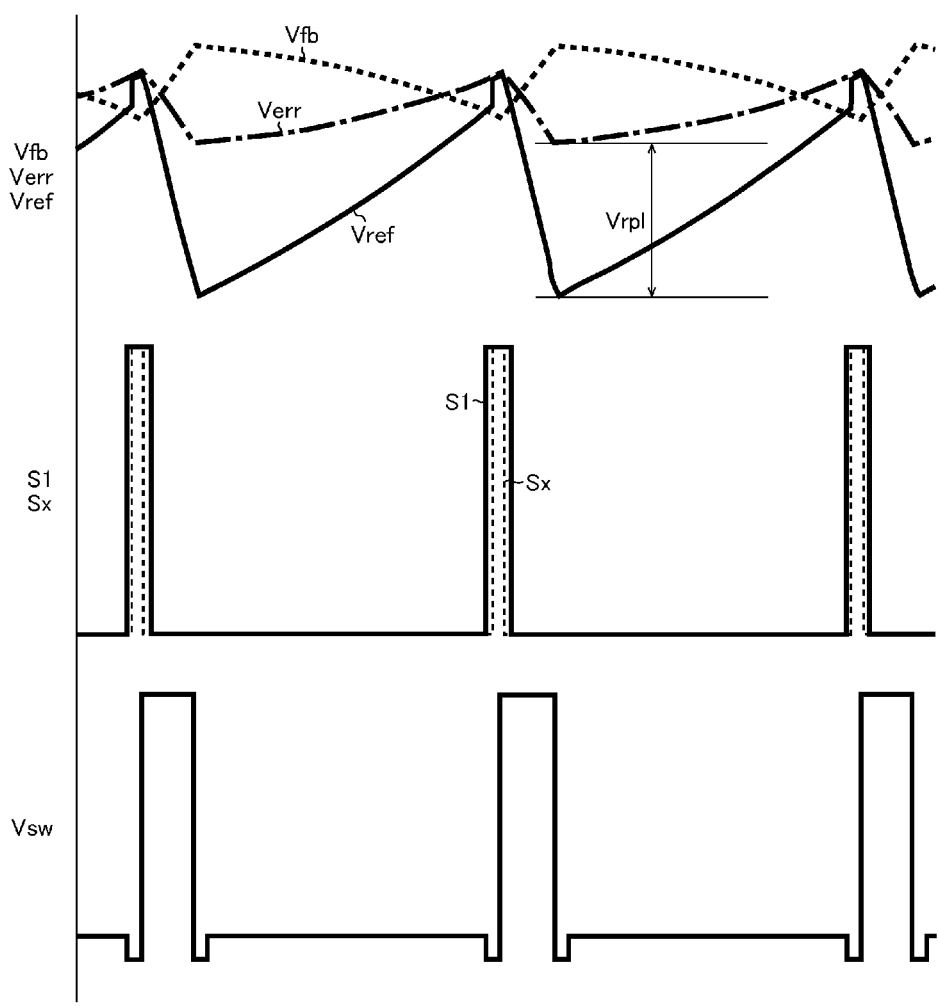
FIG. 37 is a time chart showing a first example of ripple injection operation.
Figure 38:
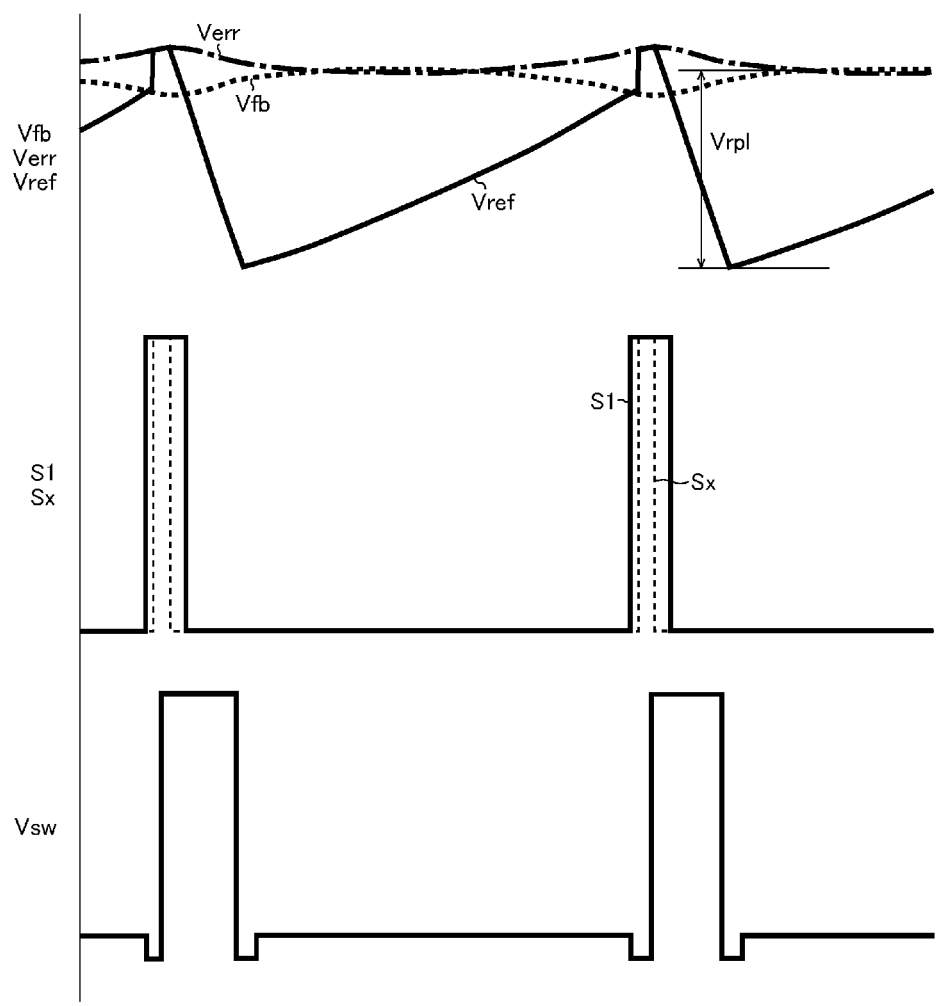
FIG. 38 is a time chart showing a second example of ripple injection operation.

FIGS. 37 and 38 are time charts showing a first example (with a conductive polymer capacitor as C1) and a second example (with a ceramic capacitor as C1), respectively, of ripple injection operation, and depicts, from top down, the feedback voltage Vfb, the error voltage Verr, the reference voltage Vref, the comparison signal S1, the discharge control signal Sx, and the switching voltage Vsw.

As shown in those time charts, irrespective of whether a conductive polymer capacitor or a ceramic capacitor is used as the capacitor C1, it is possible to inject a sufficiently large pseudo ripple component (ripple voltage Vrpl) into the reference voltage Vref.

Figure 39:
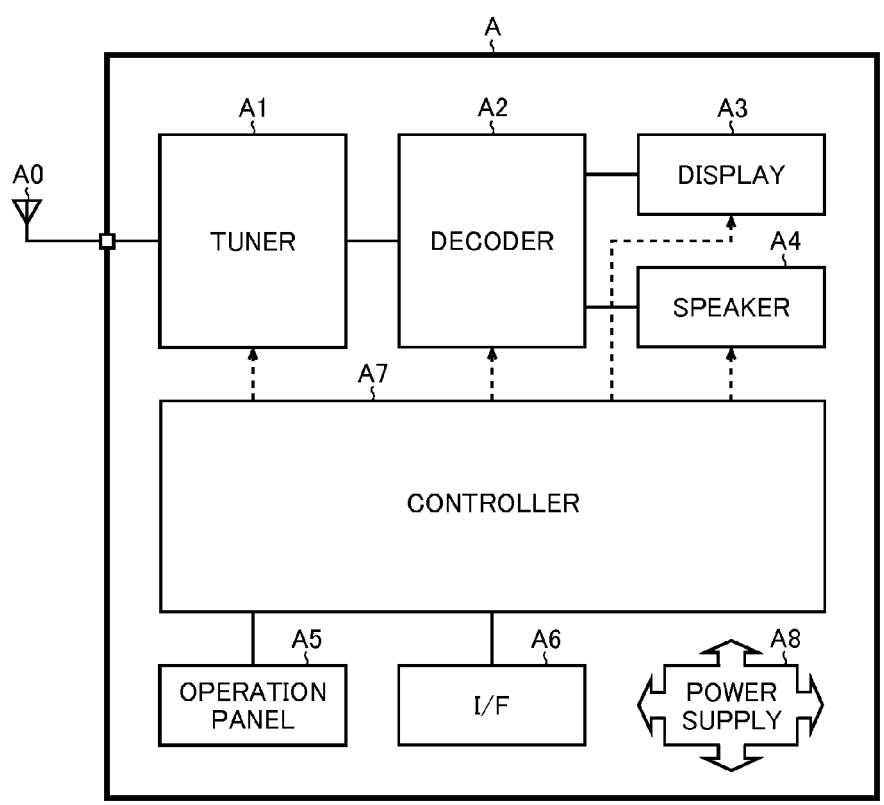
FIG. 39 is a block diagram showing one configuration example of a television receiver incorporating a switching power supply device.
Figure 40A:
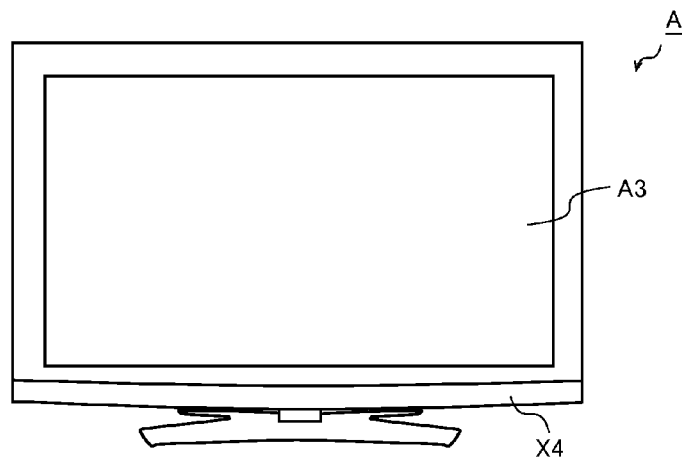
FIG. 40A is a front view of a television receiver incorporating a switching power supply device.
Figure 40B:
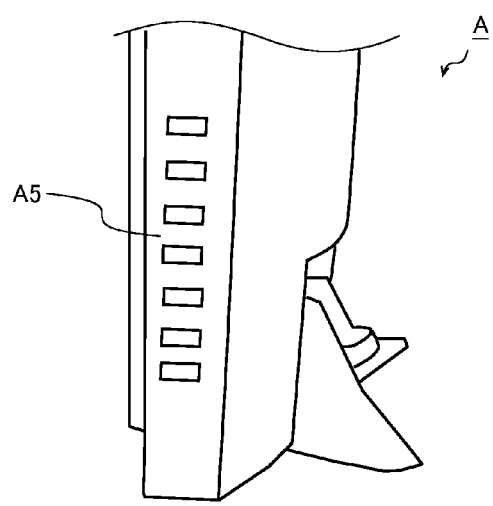
FIG. 40B is a side view of a television receiver incorporating a switching power supply device.
Figure 40C:
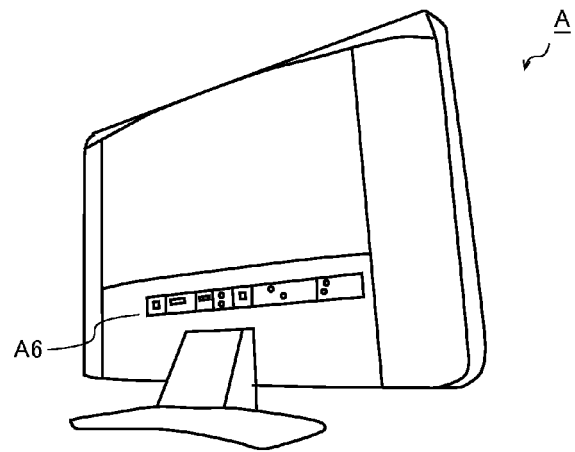
FIG. 40C is a rear view of a television receiver incorporating a switching power supply device.

Application to a Television:

FIG. 39 is a block diagram showing one configuration example of a television receiver incorporating the switching power supply device described above. FIGS. 40A to 40C are a front view, a side view, and a rear view, respectively, of the television receiver incorporating the switching power supply device described above. The television receiver A of this configuration example includes a tuner A1, a decoder A2, a display A3, a speaker A4, an operation panel A5, an interface (I/F) A6, a controller A7, and a power supply A8.

The tuner A1 selects the broadcast signal of a desired channel from the reception signals received via an antenna A0 externally connected to the television receiver A.

The decoder A2 generates video and audio signals from the broadcast signal selected by the tuner A1. The decoder A2 also has the function of generating video and audio signals based on an external input signal from the interface A6.

The display A3 outputs an image based on the video signal generated by the decoder A2.

The speaker A4 outputs sounds based on the audio signal generated by the decoder A2.

The operation panel A5 is a kind of human interface which accepts user operation. The operation panel A5 can comprise buttons, switches, a remote controller, etc.

The interface A6 is a front-end which receives an external input signal from an external device (such as an optical disc player or hard disc drive).

The controller A7 controls the operation of the circuit blocks A1 to A6 mentioned above in a centralized fashion. The controller A7 can comprise a CPU (central processing unit) or the like.

The power supply A8 supplies electric power to the circuit blocks A1 to A7 mentioned above. The power supply A8 can suitably comprise the switching power supply device 1 described previously.

Modified Examples:

Although the embodiments described above deal with examples where the present invention is applied to a step-down switching power supply device adopting synchronous rectification, this is not meant to limit the application of the present invention; asynchronous rectification may instead be adopted as a switching driving method, or the output stage of the switching power supply device may be configured to be of a step-up type or a step-up/step-down type.

The present invention can be implemented in any other manners than specifically described above by way of embodiments, and allows for many modifications within the spirit of the invention. That is, the embodiments described above should be considered to be in every aspect simply illustrative and not restrictive, and it should be understood that the technical scope of the present invention is defined not by the description of embodiments given above but by the appended claims and encompasses any modifications in the sense and scope equivalent to those of the appended claims Industrial Applicability:

Switching power supply devices according to the present invention find applications as power supplies (e.g., power supplies for SOCs (system-on-chips) requiring fast response, and for devices peripheral to them) incorporated in various electronic appliances such as liquid crystal displays, plasma displays, BD recorders/players, set-top boxes, and personal computers.

What is claimed is:

1. A power control integrated circuit (IC) comprising:
 a switching control circuit of a fixed on-period type, the switching control circuit being operable to generate an output voltage from an input voltage by driving a coil by turning on and off an output transistor according to a result of comparison between a feedback voltage and a reference voltage; and a quieting circuit operable to forcibly turn on the output transistor that is off by ignoring the result of comparison when, after an on-timing of the output transistor, a predetermined threshold time elapses without a next on-timing coming, the power control IC being operable such that, when the quieting circuit forcibly turns on the output transistor, the switching control circuit makes an on-period of the output transistor increasingly short as the output voltage becomes increasingly high.

2. The power control IC of claim 1, wherein while the output voltage is higher than a predetermined threshold voltage, the quieting circuit ceases to forcibly turn on the output transistor.

3. The power control IC of claim 1, wherein the switching control circuit includes a reverse current detection circuit, the reverse current detection circuit being operable to monitor a reverse current toward a synchronous rectification transistor that is turned on and off complementarily with the output transistor, so as to forcibly turn off the synchronous rectification transistor.

4. The power control IC of claim 1, wherein the switching control circuit includes: a reference voltage generation circuit operable to generate the reference voltage; a main comparator operable to generate a comparison signal by comparing the feedback voltage with the reference voltage; a one-shot pulse generation circuit operable to generate a one-shot pulse in a set signal according to the comparison signal; an RS flip-flop operable to set an output signal to a first logic level according to the set signal and reset the output signal to a second logic level according to a reset signal; an on-period setting circuit operable to generate a one-shot pulse in the reset signal when, after the output signal is set to the first logic level, a predetermined on-period elapses; and a gate driver circuit operable to drive the output transistor according to the output signal.

5. The power control IC of claim 4, wherein the on-period setting circuit includes: a first voltage generation circuit operable to generate a first voltage by charging and discharging a capacitor by using a charge current commensurate with the input voltage; a second voltage generation circuit operable to generate a second voltage commensurate with the output voltage; and a comparator operable to generate the reset signal by comparing the first voltage with the second voltage, and when the quieting circuit is operating, the second voltage generation circuit makes the second voltage increasingly short as the output voltage becomes increasingly high.

6. The power control IC of claim 5, wherein the second voltage generation circuit includes: a first resistor ladder operable to generate a first division voltage by dividing the output voltage; a second resistor ladder operable to generate a second division voltage by dividing the output voltage; a current output amplifier operable to generate an offset current commensurate with the output voltage; a current mirror operable to lower the second division voltage by passing the offset current through the second resistor ladder; and a selector operable to select the first division voltage as the second voltage when the quieting circuit is not operating and select the second division voltage as the second voltage when the quieting circuit is operating.

7. The power control IC of claim 1, further comprising: a ripple injection circuit operable to generate the feedback voltage by injecting a pseudo ripple component into a division voltage of the output voltage or to generate the reference voltage by injecting the pseudo ripple component into a predetermined constant voltage.

8. A switching power supply device comprising: the power control IC of claim 1; and a switching output stage of which a part or whole is externally fitted to the power control IC, the switching output stage being operable to generate the output voltage from the input voltage.

9. An electronic appliance comprising the switching power supply device of claim 8.

10. A power control integrated circuit (IC) comprising:
a switching control circuit of a fixed on-period type, the switching control circuit being operable to generate an output voltage from an input voltage by driving a coil by turning on and off an output transistor according to a result of comparison between a feedback voltage and a reference voltage; and a quieting circuit operable to forcibly turn on the output transistor that is off by ignoring the result of comparison when, after an on-timing of the output transistor, a predetermined threshold time elapses without a next on-timing coming, wherein the switching control circuit includes:
a reference voltage generation circuit operable to generate the reference voltage;
a main comparator operable to generate a comparison signal by comparing the feedback voltage with the reference voltage;
a one-shot pulse generation circuit operable to generate a one-shot pulse in a set signal according to the comparison signal;
an RS flip-flop operable to set an output signal to a first logic level according to the set signal and reset the output signal to a second logic level according to a reset signal;
an on-period setting circuit operable to generate a one-shot pulse in the reset signal when, after the output signal is set to the first logic level, a predetermined on-period elapses; and
a gate driver circuit operable to drive the output transistor according to the output signal.

11. The power control IC of claim 10, wherein the on-period setting circuit includes:
a first voltage generation circuit operable to generate a first voltage by charging and discharging a capacitor by using a charge current commensurate with the input voltage;
a second voltage generation circuit operable to generate a second voltage commensurate with the output voltage; and
a comparator operable to generate the reset signal by comparing the first voltage with the second voltage, wherein, when the quieting circuit is operating, the second voltage generation circuit makes the second voltage increasingly short as the output voltage becomes increasingly high.

12. The power control IC of claim 11, wherein the second voltage generation circuit includes:
a first resistor ladder operable to generate a first division voltage by dividing the output voltage;
a second resistor ladder operable to generate a second division voltage by dividing the output voltage;
a current output amplifier operable to generate an offset current commensurate with the output voltage; a current mirror operable to lower the second division voltage by passing the offset current through the second resistor ladder; and a selector operable to select the first division voltage as the second voltage when the quieting circuit is not operating and to select the second division voltage as the second voltage when the quieting circuit is operating.

* * * * *